US009486920B2

(12) United States Patent
Fudaba et al.

(10) Patent No.: US 9,486,920 B2
(45) Date of Patent: Nov. 8, 2016

(54) CONTROL APPARATUS AND CONTROL METHOD FOR ROBOT ARM, ROBOT, CONTROL PROGRAM FOR ROBOT ARM, AND INTEGRATED ELECTRONIC CIRCUIT

(71) Applicant: Panasonic Corporation, Osaka (JP)

(72) Inventors: Yudai Fudaba, Osaka (JP); Yuko Tsusaka, Osaka (JP); Taichi Sato, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 345 days.

(21) Appl. No.: 14/186,230

(22) Filed: Feb. 21, 2014

(65) Prior Publication Data

US 2014/0172143 A1    Jun. 19, 2014

Related U.S. Application Data

(63) Continuation of application No. PCT/JP2012/003257, filed on May 18, 2012.

(30) Foreign Application Priority Data

Aug. 24, 2011    (JP) ................................ 2011-182906

(51) Int. Cl.
*G06F 19/00*    (2011.01)
*B25J 9/16*    (2006.01)

(52) U.S. Cl.
CPC ............. *B25J 9/1656* (2013.01); *B25J 9/1697* (2013.01); *G05B 2219/34406* (2013.01);
(Continued)

(58) Field of Classification Search
CPC ................ B25J 9/1956; B25J 9/1697; G05B 2219/34406; G05B 2219/36433; G05B 2219/39469; G05B 2219/40032
See application file for complete search history.

(56) References Cited

U.S. PATENT DOCUMENTS

| 2011/0015787 A1* | 1/2011 | Tsusaka ................ B25J 9/0003 700/264 |
| 2011/0208355 A1* | 8/2011 | Tsusaka ................ B25J 9/1664 700/246 |
| 2012/0173021 A1 | 7/2012 | Tsusaka |

FOREIGN PATENT DOCUMENTS

| JP | 06-23682 | 2/1994 |
| JP | 2006-192548 | 7/2006 |

(Continued)

OTHER PUBLICATIONS

International Preliminary Report on Patentability issued Feb. 27, 2014 in International (PCT) Application No. PCT/JP2012/003257.
(Continued)

*Primary Examiner* — Ian Jen
(74) *Attorney, Agent, or Firm* — Wenderoth, Lind & Ponack, L.L.P.

(57) ABSTRACT

In a control apparatus for a robot arm, the feedback rule generating section generates a feedback rule in accordance with relationship between a time point of generation of a stimulus and variation in behavior after elapse of a reaction time in taught data as detected by the information variation point detecting section and the behavior variation point detecting section. The motion generating section generates a motion of the robot arm based on motion information, an information variation point, a behavior variation point, and the feedback rule. The controller controls the motion of the robot arm.

16 Claims, 86 Drawing Sheets

(52) U.S. Cl.
CPC .............. *G05B 2219/36433* (2013.01); *G05B 2219/39469* (2013.01); *G05B 2219/40032* (2013.01); *G05B 2219/40059* (2013.01); *G05B 2219/40116* (2013.01); *G05B 2219/40391* (2013.01); *Y10S 901/03* (2013.01)

(56) References Cited

FOREIGN PATENT DOCUMENTS

| | | |
|---|---|---|
| JP | 2008-134903 | 6/2008 |
| JP | 2010-234521 | 10/2010 |
| JP | 2011-88273 | 5/2011 |

OTHER PUBLICATIONS

International Search Report issued Jul. 3, 2012 in International (PCT) Application No. PCT/JP2012/003257.

Tanaka, Kihara, and Yokokohji, "Desired Trajectory and Sensory Feedback Control Law Synthesis for an Origami-Folding Robot Based on the Statistical Feature of Direct Teaching by a Human", Journal of the Robotics Society of Japan, vol. 27, No. 6, pp. 685-695, Jul. 2009.

\* cited by examiner

| TIME (ms) | POSITION (mm) (x, y, z) | ORIENTATION (rad) ($r_x$, $r_y$, $r_z$) | VELOCITY (mm/ms) ($v_x$, $v_y$, $v_z$) | ANGULAR VELOCITY (rad/ms) ($\omega_x$, $\omega_y$, $\omega_z$) |
|---|---|---|---|---|
| . . | . . | . . | . . | . . |
| 1821 | 112.2, 65.5, -8.5 | 0.07, -0.87, 1.22 | 0.1, -0.2, 0.3 | 0.01, 0.01, -0.01 |
| 1822 | 113.1, 64.8, -8.5 | 0.06, -0.85, 1.27 | 0.9, -0.7, 0.0 | -0.01, 0.02, 0.05 |
| 1823 | 113.5, 64.0, -8.0 | 0.05, -0.82, 1.28 | 0.4, -0.8, -0.5 | -0.01, 0.02, 0.01 |
| . . | . . | . . | . . | . . |

| TIME (ms) | FORCE (N or Nm) ($F_x$, $F_y$, $F_z$, $M_x$, $M_y$, $M_z$) | SOUND VOLUME (dB) | TARGET OBJECT POSITION (mm) (x, y, z) |
|---|---|---|---|
| ⋮ | ⋮ | ⋮ | ⋮ |
| 2005 | 0.55, 1.22, -2.11, 0.012, 0.021, 0.031 | 1.20 | 10.1, 21.5, -0.1 |
| 2006 | 0.57, 1.25, -2.20, 0.012, 0.022, 0.034 | 1.27 | 10.5, 21.0, -0.5 |
| 2007 | 0.55, 1.27, -2.30, 0.013, 0.021, 0.033 | 1.30 | 10.8, 21.5, -0.9 |
| ⋮ | ⋮ | ⋮ | ⋮ |

Fig.4

| | | TARGET TASK | | |
|---|---|---|---|---|
| | | PRESS FITTING | SCREWING | INSERTION OF FLEXIBLE BOARD |
| TASK EXPERIENCE | 0 TO 1 YEAR | 200ms | 230ms | 250ms |
| | 1 TO 3 YEARS | 180ms | 220ms | 220ms |
| | 3 YEARS OR MORE | 150ms | 210ms | 200ms |

Fig.5

| TIME (ms) | INFORMATION VARIATION POINT |
|---|---|
| ⋮ | ⋮ |
| 2552 | 0 |
| 2553 | 1 |
| 2554 | 0 |
| ⋮ | ⋮ |

Fig.6

| TIME (ms) | BEHAVIOR VARIATION POINT |
|---|---|
| ⋮ | ⋮ |
| 2822 | 0 |
| 2823 | 1 |
| 2824 | 0 |
| ⋮ | ⋮ |

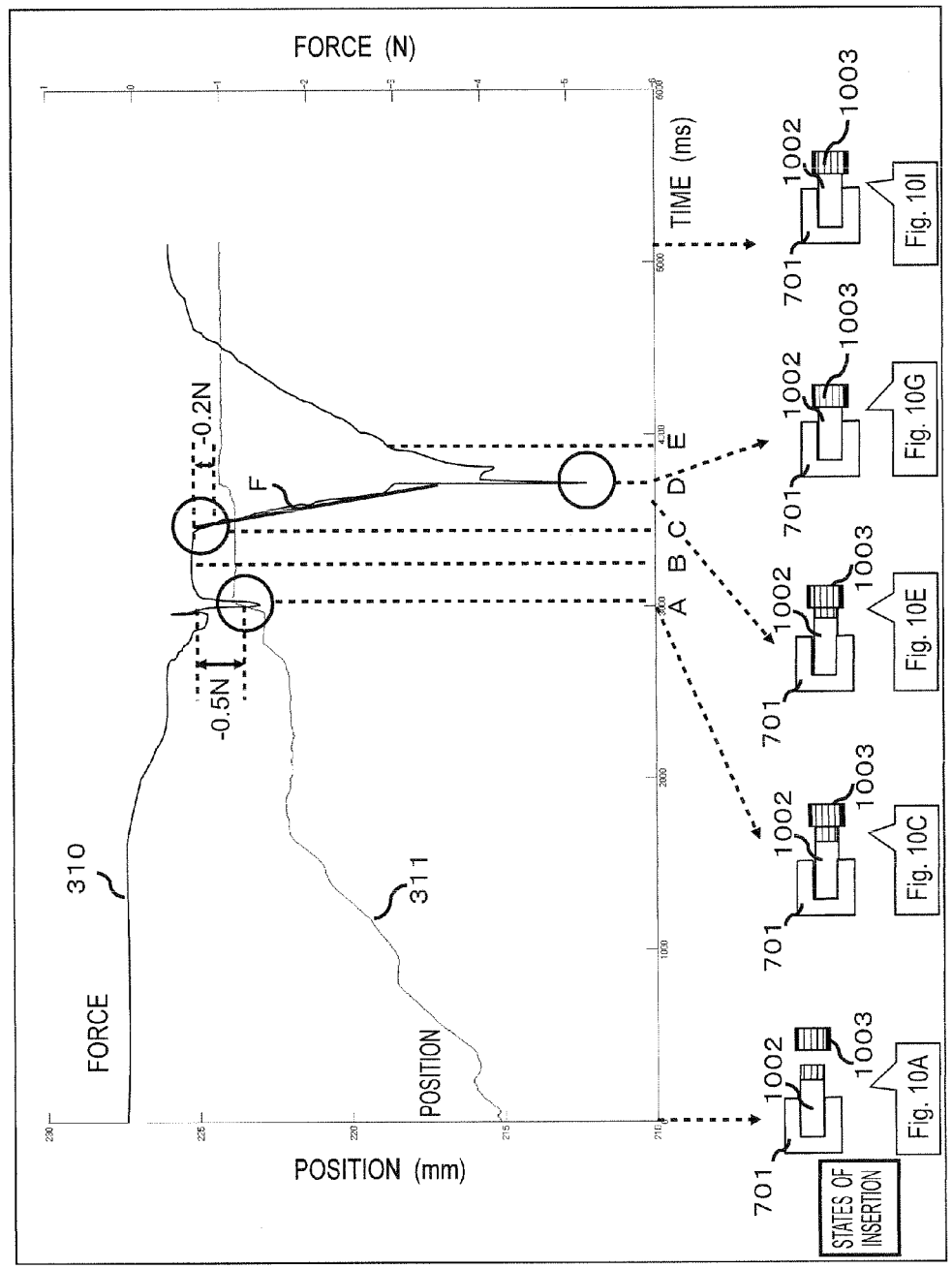

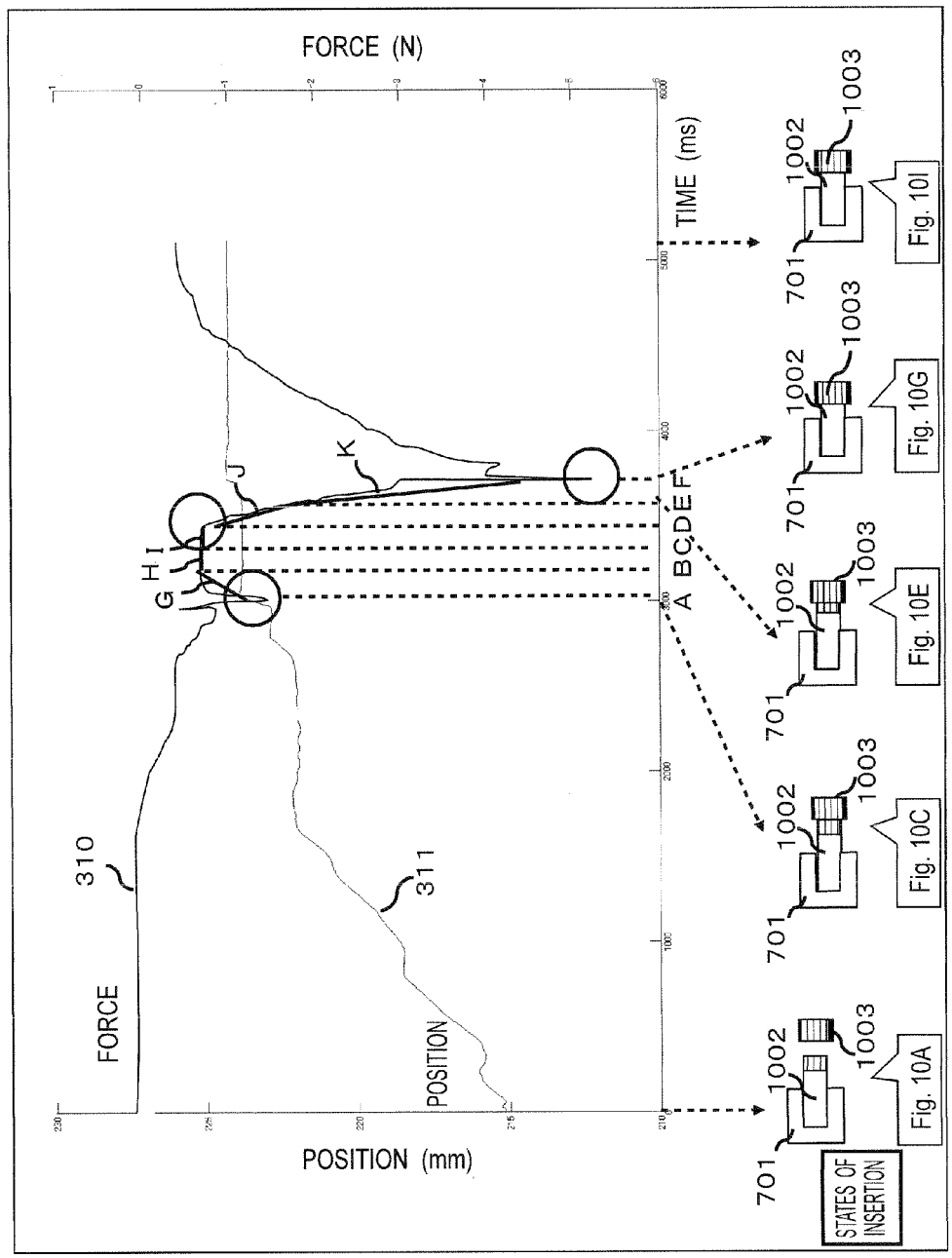

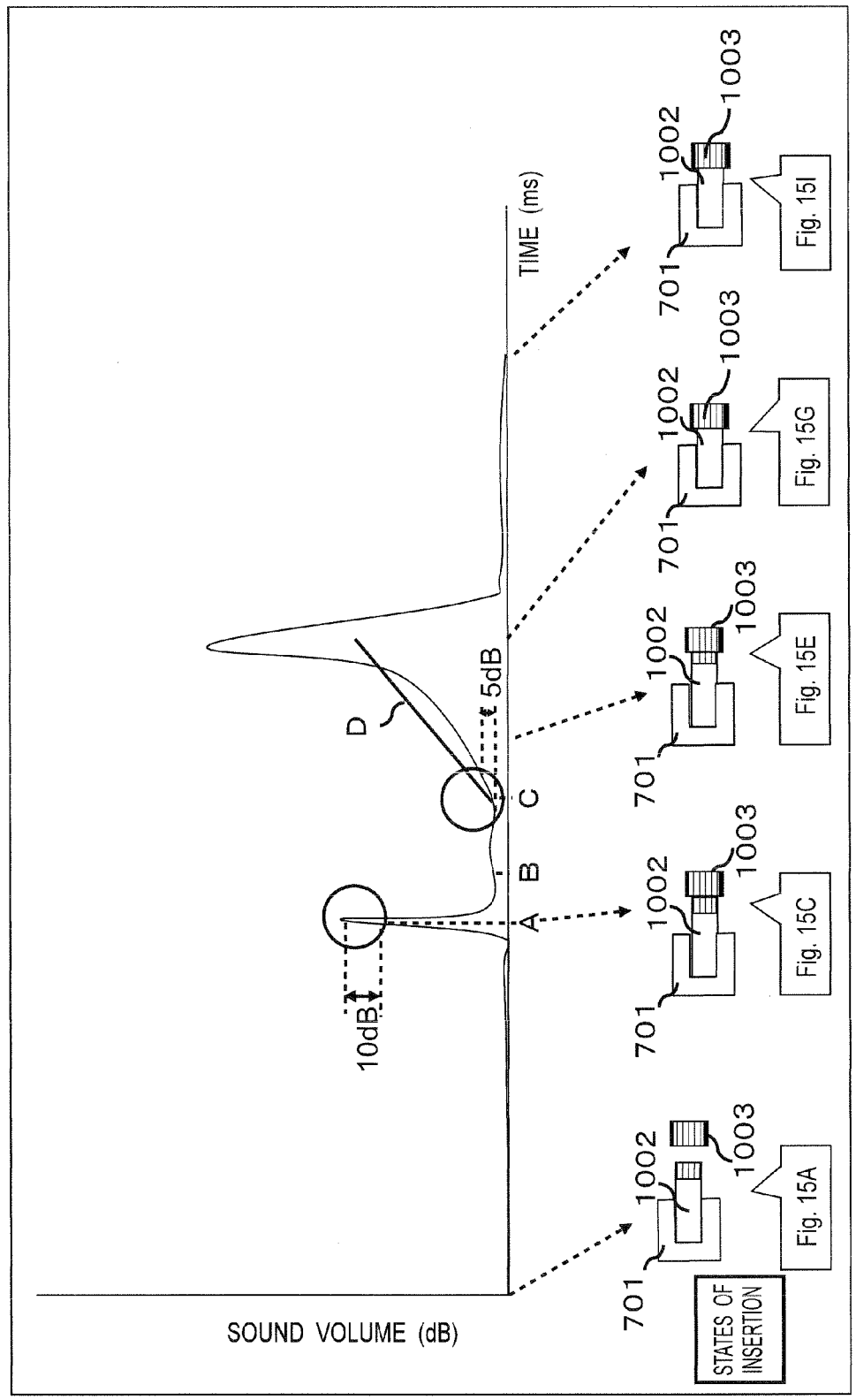

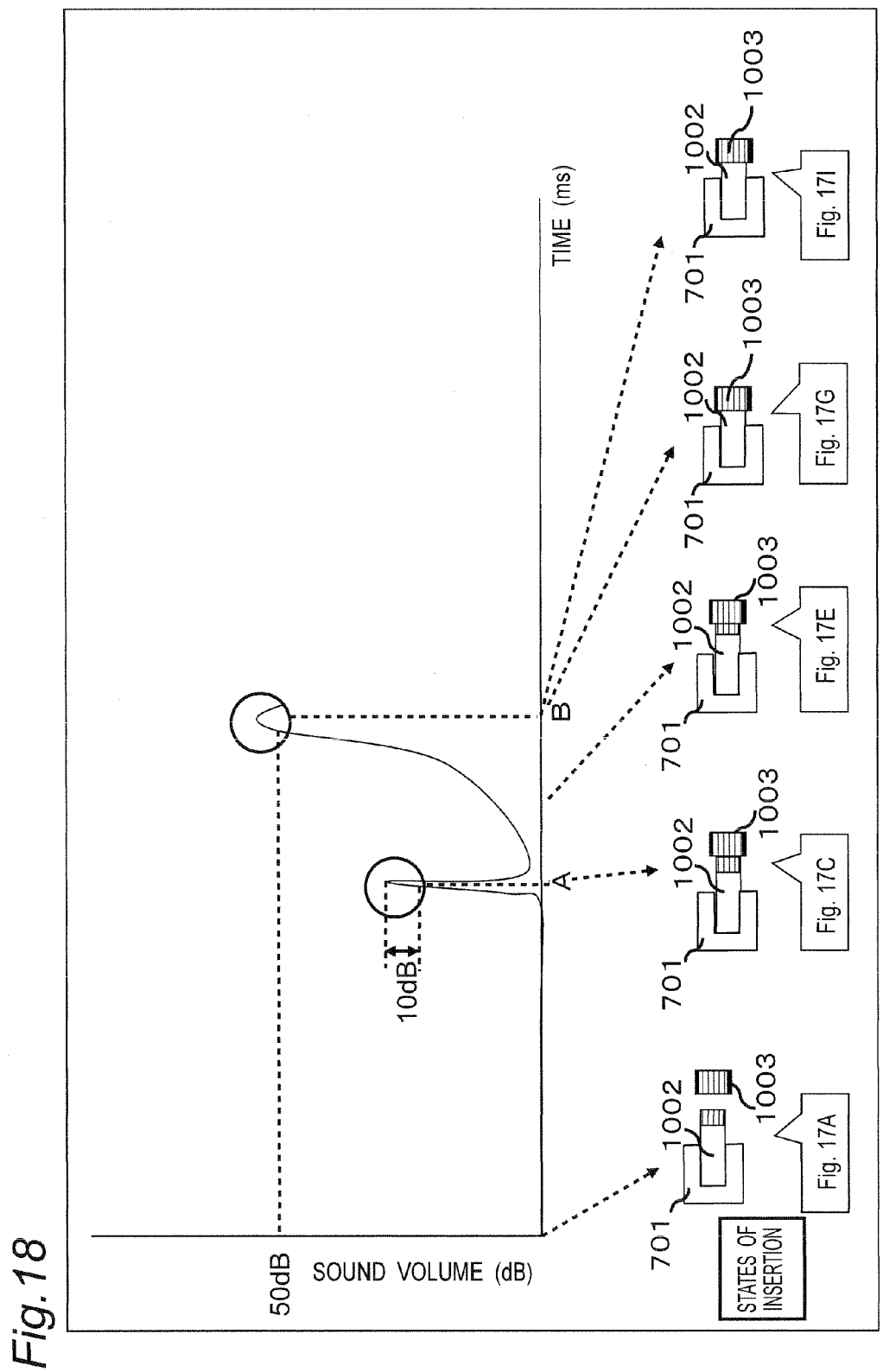

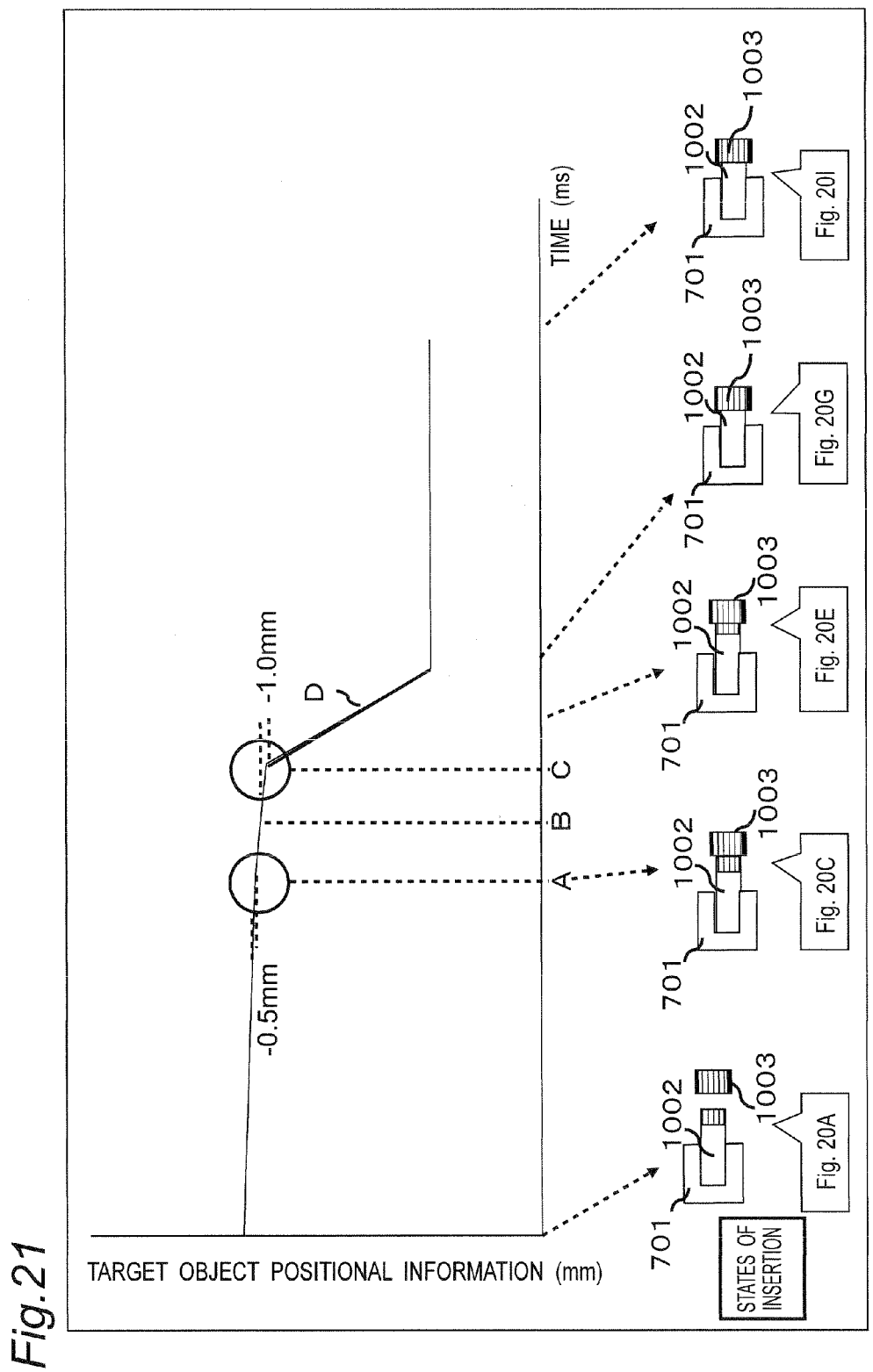

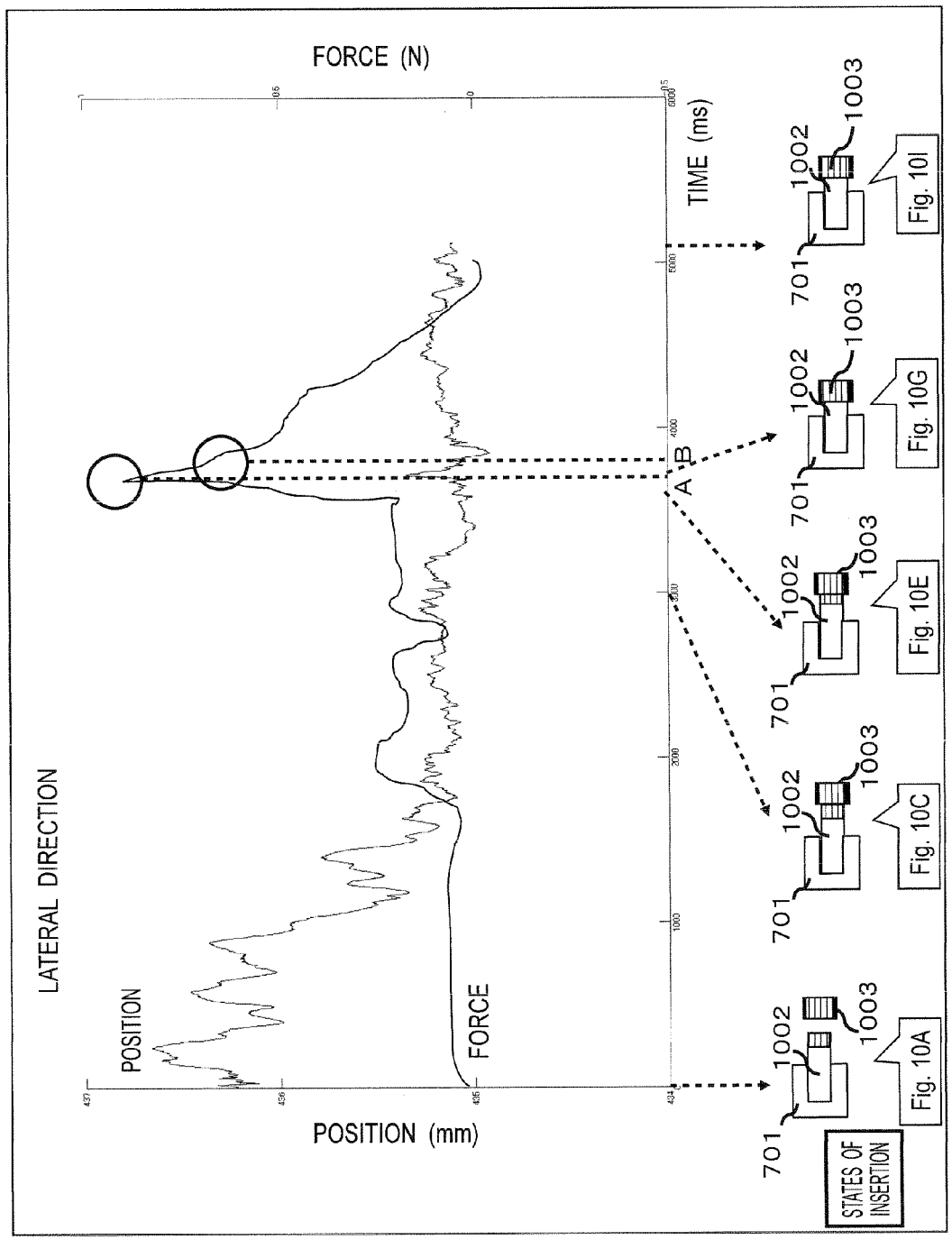

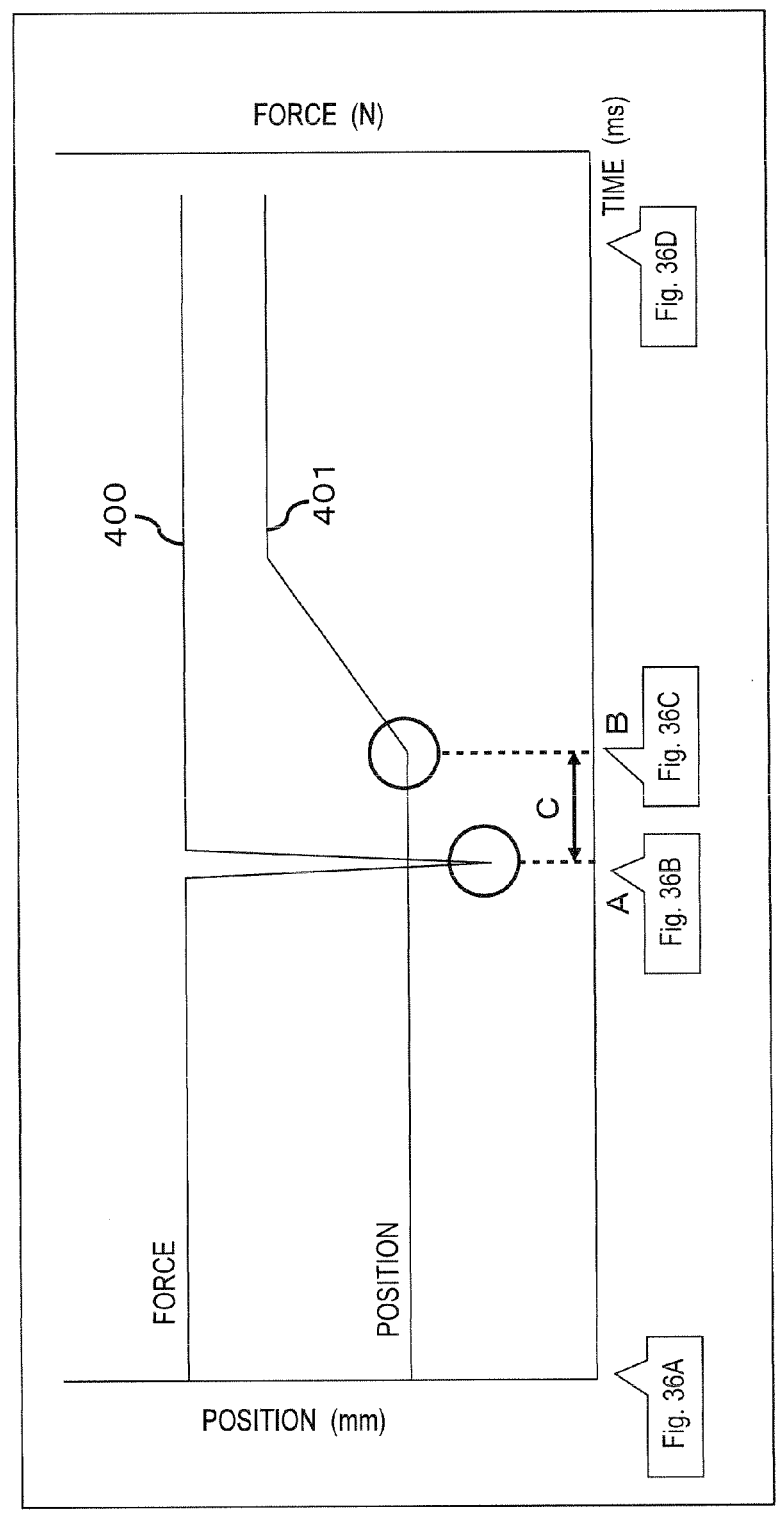

Fig.38

| OPERATOR | TARGET TASK | | |
|---|---|---|---|
| | PRESS FITTING | SCREWING | INSERTION OF FLEXIBLE BOARD |
| PERSON A | 184ms | 202ms | 242ms |
| PERSON B | 176ms | 187ms | 233ms |
| PERSON C | 160ms | 175ms | 207ms |

Fig.42

| TIME (ms) | POSITION (mm) (x, y, z) | ORIENTATION (rad) ($r_x$, $r_y$, $r_z$) | VELOCITY (mm/ms) ($v_x$, $v_y$, $v_z$) | ANGULAR VELOCITY (rad/ms) ($\omega_x$, $\omega_y$, $\omega_z$) | FORCE (N or Nm) ($F_x$, $F_y$, $F_z$, $M_x$, $M_y$, $M_z$) |
|---|---|---|---|---|---|
| .. | .. | .. | .. | .. | .. |
| 2321 | 151.2, 72.5, -8.5 | 0.17, -0.07, 1.52 | 0.1, -0.2, 0.3 | 0.01, 0.01, -0.01 | 0.25, 1.42, -2.21, 0.002, 0.021, 0.051 |
| 2322 | 152.1, 71.8, -8.5 | 0.16, -0.05, 1.57 | 0.9, -0.7, 0.0 | -0.01, 0.02, 0.05 | 0.27, 1.45, -2.30, 0.002, 0.022, 0.054 |
| 2323 | 152.5, 71.0, -8.0 | 0.15, -0.02, 1.58 | 0.4, -0.8, -0.5 | -0.01, 0.02, 0.01 | 0.25, 1.47, -2.50, 0.003, 0.021, 0.053 |
| .. | .. | .. | .. | .. | .. |

US 9,486,920 B2

CONTROL APPARATUS AND CONTROL METHOD FOR ROBOT ARM, ROBOT, CONTROL PROGRAM FOR ROBOT ARM, AND INTEGRATED ELECTRONIC CIRCUIT

CROSS-REFERENCE TO RELATED APPLICATIONS

This is a continuation application of International Application No. PCT/JP2012/003257, with an international filing date of May 18, 2012, which claims priority of Japanese Patent Application No.: 2011-182906 filed on Aug. 24, 2011, the content of which is incorporated herein by reference.

TECHNICAL FIELD

The technical field relates to a control apparatus and a control method for a robot arm, a robot including the control apparatus for a robot arm, a control program for a robot arm, and an integrated electronic circuit, which are used for generating and teaching motions of the robot.

BACKGROUND ART

Model changes at manufacturing sites have been frequently observed in recent years, so as to realize small lot production in great varieties. At manufacturing sites of cell production, in order to automate, with use of robots, screwing, fitting and attaching components, inserting flexible boards and the like, polishing, etc., such robots need to be flexibly adaptable to various types of components and to various task steps. Every time components to be handled are replaced, assembling positions, directions, or the like are changed, and the task process is also changed. Accordingly, the robots need to be adapted to these changes.

Those tasks of handling soft articles, such as insertion of a flexible board, are complicated, so that such tasks are still performed manually. A person is capable of performing a complicated task by estimating the degree of warp or the position of such a soft article on the basis of reactive force that can be felt with a hand when the soft article is in contact with a target object and is thus warped.

To the contrary, a robot is incapable of formulating force information or positional information on a soft article that is warped in a different manner or at a different portion in each trial. Accordingly, it is quite difficult for such a robot to perform a complicated task in accordance with acquired reactive force. There are strong demands for solving this problem to achieve automation, by means of robots, of those tasks that have been primarily performed manually.

There has been adopted, as a method of teaching a robot a task, direct teaching of touching to teach the robot. There is also an example of dealing with variation in environment or in work by extracting the relationship (referred to as a sensory feedback rule) between information on the environment and information on manipulation by a person of a robot from obtained taught data and applying the data upon automatically replaying the robot (see Patent Literatures 1 and 2). The direct teaching is applied, for example, to an origami-folding task that requires a sensory feedback rule based on variation in minute force information (see Non-Patent Literature 1).

CITATION LIST

Patent Literatures

Patent Literature 1: JP 06-23682 A
Patent Literature 2: JP 2006-192548 A

Non-Patent Literature

Non-Patent Literature 1: Tanaka, Kihara, and Yokokohji, "Desired Trajectory and Sensory Feedback Control Law Synthesis for an Origami-Folding Robot based on the Statistical Feature of Direct Teaching by a Human", Journal of the Robotics Society of Japan, Vol. 27, No. 6, pp. 685-695, July 2009

SUMMARY OF THE INVENTION

It is important to take reaction time into consideration upon performing a task that requires flexibility and delicate, such as insertion task of a flexible board. For example, there may be caused an unstable motion against intention of a person, as a reaction of contact between the flexible board and a connector, leading to damage to the flexible board or the connector. In order to automate a robot, it is quite important to extract a sensory feedback rule with no influence of such a human unstable motion. A phenomenon of such an unstable motion is described with reference to FIGS. 54A to 54H and 55. FIGS. 54A to 54H show the process performed by a person's hand 1001 manipulating and teaching a robot arm 1102. The process performed by the person's hand 1001 teaching the robot arm 1102 is illustrated in the order of FIGS. 54A, 54C, 54E, and 54G. States of a flexible board 1002 and a connector 1003 at the respective time points are illustrated in the order of FIGS. 54B, 54D, 54F, and 54H.

FIG. 54A illustrates the state where the person's hand 1001 grips the robot arm 1102 and starts teaching the robot. In this state, the flexible board 1002 and the connector 1003 have not yet come into contact with each other. The person's hand 1001 receives no reactive force to be generated upon contact between the flexible board 1002 and the connector 1003.

FIG. 54C illustrates the state where the flexible board 1002 is in contact with an inlet port of the connector 1003. Force upon the contact is generated at this time point, and the person's hand 1001 has not yet received the force in this state.

FIG. 54E illustrates the state immediately after the contact between the flexible board 1002 and the inlet port of the connector 1003. The person's hand 1001 has not yet received the force generated upon the contact in this state. The person's hand 1001, however, causes an unstable motion as a reaction of the contact, and the robot arm 1102 is shifted.

FIG. 54G illustrates the state after a reaction time from the contact between the flexible board 1002 and the inlet port of the connector 1003. The person's hand 1001 has received the force generated upon the contact in this state. This figure illustrates the state where the flexible board 1002 is pressed to be inserted into the connector 1003. The reactive force in this state is sensed with the person's hand 1001, so that the person adjusts the degree of insertion of the flexible board 1002 into the connector 1003.

FIG. 55 indicates a value of a force sensor 1716 and positional information on the robot arm 1102 during the teaching motion illustrated in FIGS. 54A to 54H. The value of the force sensor 1716 is magnitude of the reactive force that is generated upon the contact between the flexible board 1002 and the connector 1003 and is received by the person's hand 1001. A first solid line 550 indicates the value detected by the force sensor 1716. A second solid line 551 indicates the position of the robot arm 1102. The transverse axis in FIG. 55 denotes time (ms) from start of the inserting task (0 ms) to end of the inserting task. The left ordinate axis in FIG. 55 denotes the position (mm) of the robot arm 1102. The right ordinate axis in FIG. 55 denotes the value (N) detected by the force sensor 1716. Illustrated under the graph in FIG. 55 are the states of insertion (FIGS. 55A, 55C, 55E, and 55G) of the flexible board 1002 into the connector 1003 during the inserting task.

The flexible board 1002 comes into contact with the connector 1003 at a time point A in FIG. 55. In the time zone C in FIG. 55, the unstable motion is caused during the reaction time. As apparent from the positional information in this time zone, it is confirmed that the robot arm 1102 is suddenly shifted forward and backward against intention of the person.

One non-limiting and exemplary embodiment provides a control apparatus and a control method for a robot arm, a robot, a control program for a robot arm, and an integrated electronic circuit, which enable accurate extraction of skills of a person from taught data of direct teaching or the like, with no influence of an unstable motion caused during human reaction time.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A control apparatus for controlling a motion of a robot arm, the control apparatus comprising:

a motion information acquiring section that acquires motion information including at least one of a position, orientation, and velocity of the robot arm in motion;

an environment information acquiring section that acquires environment information including at least one of force information, sound volume information, and positional information related to peripheral environment and generated by the robot arm in motion;

a predetermined reaction time information acquiring section that acquires information of predetermined reaction time as predetermined time information from receipt of the environment information by a person to manipulation of the robot arm by the person;

an information variation point detecting section that detects, as an information variation point, a time point where at least one of the motion information acquired by the motion information acquiring section and the environment information acquired by the environment information acquiring section varies;

a behavior variation point detecting section that searches time from a time point after elapse of the predetermined reaction time from the information variation point, for the time point where at least one of the motion information acquired by the motion information acquiring section and the environment information acquired by the environment information acquiring section varies, to detect an initially detected time point as a behavior variation point;

a feedback rule generating section that generates, as a feedback rule, at least one of the motion information acquired by the motion information acquiring section and the environment information acquired by the environment information acquiring section in time from the behavior variation point;

a motion generating section that generates a motion of the robot arm based on the motion information, the information variation point, the behavior variation point, and the feedback rule; and a controller that controls the motion of the robot arm in accordance with the motion generating section.

According to the aspect of the present disclosure, there is generated the feedback rule for the manipulation by a person at the time point after elapse of the reaction time from the time point of generation of a stimulus. It is thus possible to generate the feedback rule as intended by the person. It is also possible to prevent an unstable motion during the reaction time, which enhances safety.

These general and specific aspects may be implemented using a system, a method, and a computer program, and any combination of systems, methods, and computer programs.

BRIEF DESCRIPTION OF THE DRAWINGS

These and other aspects and features of the present disclosure will become clear from the following description taken in conjunction with the embodiments thereof with reference to the accompanying drawings, in which:

FIG. 2 is a data chart of motion information on the robot according to the first embodiment of the present disclosure;

FIG. 3 is a data chart of environment information on the robot according to the first embodiment of the present disclosure;

FIG. 4 is a data chart of predetermined reaction time information on the robot according to the first embodiment of the present disclosure;

FIG. 5 is a data chart of an information variation point in the robot according to the first embodiment of the present disclosure;

FIG. 6 is a data chart of a behavior variation point in the robot according to the first embodiment of the present disclosure;

FIG. 11A is a view of force information and positional information during the motion of teaching the task of inserting a flexible board, of the robot arm in the robot according to the first embodiment of the present disclosure;

FIG. 11B is a view of force information and positional information during the motion of teaching the task of inserting a flexible board, of the robot arm in the robot according to the first embodiment of the present disclosure, the view illustrating a different example from FIG. 11A, of a method of detecting a behavior variation point;

FIG. 16 is a view of sound volume information during the motion of teaching the task of inserting a flexible board, of the robot arm in the robot according to the first embodiment of the present disclosure;

FIG. 18 is a view of sound volume information during the motion of replaying the task of inserting a flexible board, of the robot arm in the robot according to the first embodiment of the present disclosure;

FIG. 21 is a view of target object positional information during the motion of teaching the task of inserting a flexible board, of the robot arm in the robot according to the first embodiment of the present disclosure;

FIG. 29B is a view of force information and positional information in a lateral direction, during the motion of replaying the task of inserting a flexible board, of the robot arm in the robot according to the second embodiment of the present disclosure;

FIG. 37 is a graph of force information and positional information during the preliminary experiment on the robot arm in the robot according to the fourth embodiment of the present disclosure;

FIG. 38 is a data chart of predetermined reaction time information on the robot according to the fourth embodiment of the present disclosure;

FIG. 42 is a data chart of taught data on the robot according to the fifth embodiment of the present disclosure;

FIG. 46A is a graph of force information and positional information during the motion of replaying the task of inserting a flexible board, of the robot arm in the robot according to the sixth embodiment of the present disclosure (in a case of correcting preliminary motion information);

FIG. 46B is a graph of force information and positional information during the motion of replaying the task of inserting a flexible board, of the robot arm in the robot according to the sixth embodiment of the present disclosure (in a case of not correcting preliminary motion information);

FIG. 47 is a flowchart of the robot according to the sixth embodiment of the present disclosure;

FIG. 48 is a block diagram of a robot arm in a robot according to a seventh embodiment of the present disclosure;

FIG. 49 is a view of force information during the teaching motion of the robot arm in the robot according to the seventh embodiment of the present disclosure;

FIG. 50 is a flowchart of the robot according to the seventh embodiment of the present disclosure;

FIG. 51A is a block diagram of a robot arm in a robot according to an eighth embodiment of the present disclosure;

FIG. 51B is a block diagram of an information variation point detecting section in the robot according to the eighth embodiment of the present disclosure;

FIG. 51C is a block diagram of a behavior variation point detecting section in the robot according to the eighth embodiment of the present disclosure;

FIG. 52 is an explanatory view of variation point detection by the robot arm in the robot according to the eighth embodiment of the present disclosure;

FIG. 53 is a flowchart of the robot according to the eighth embodiment of the present disclosure;

FIG. 54A is an explanatory view of the motion of teaching the task of inserting a flexible board, of a robot arm in a conventional robot;

Figure 54A:
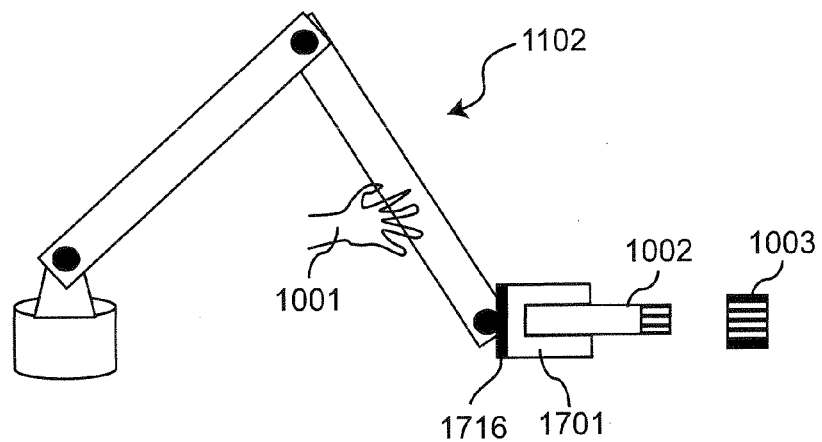
Figure 54B:
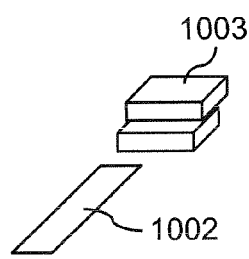
Figure 54C:
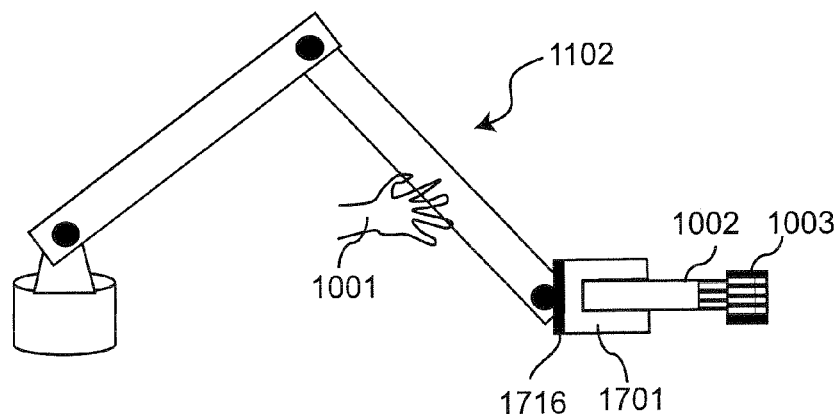
Figure 54D:
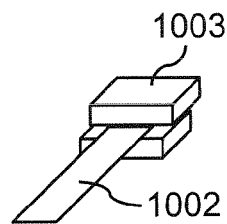
Figure 54E:
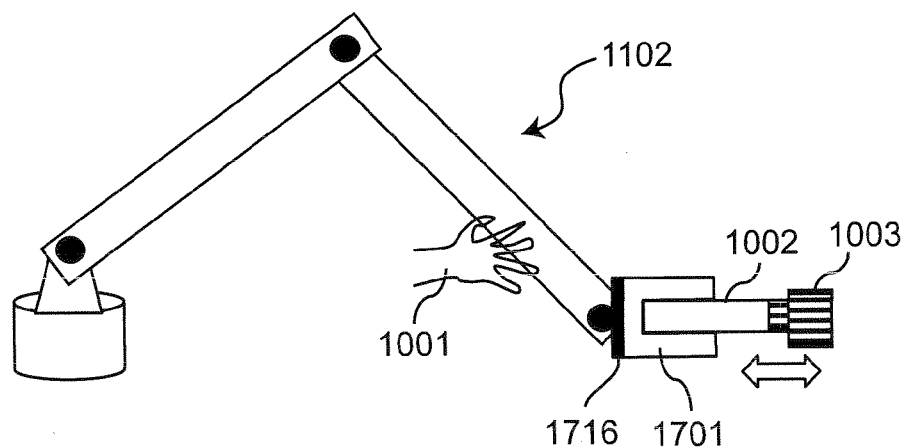
Figure 54F:
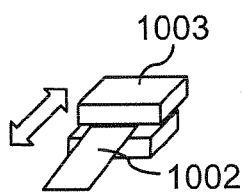
Figure 54G:
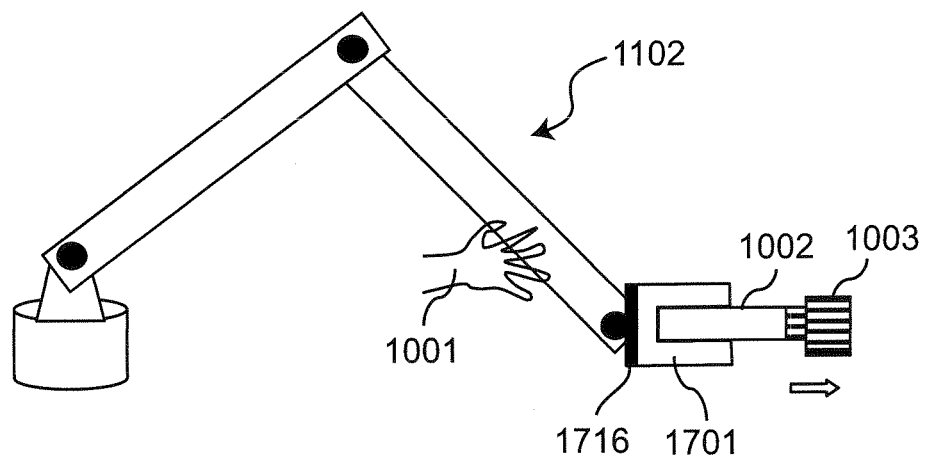
Figure 54H:
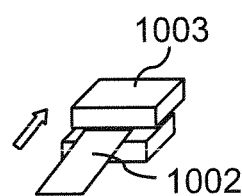
Figure 55:
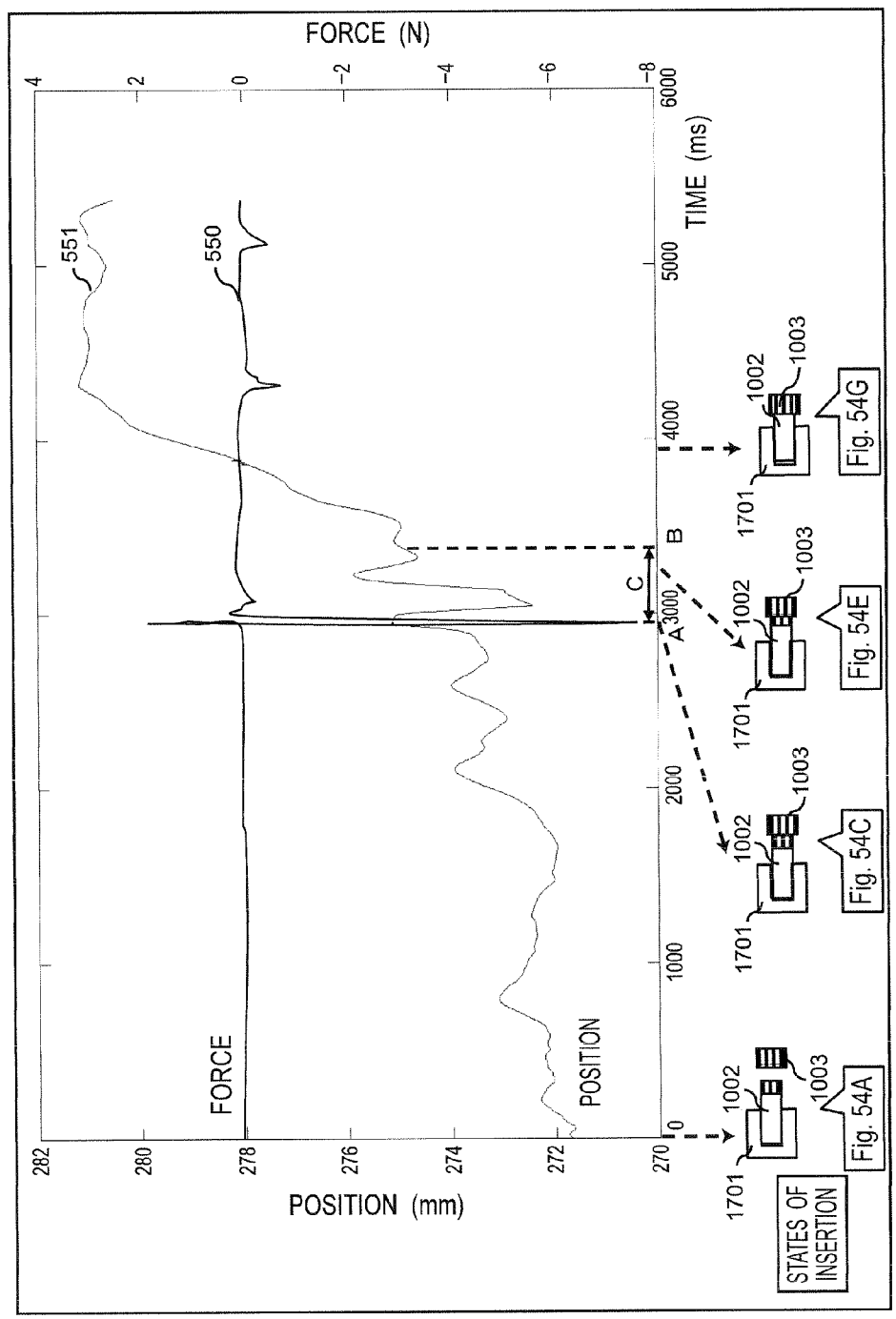

FIG. 54B is an explanatory view of the motion of teaching the task of inserting a flexible board, of the robot arm in the conventional robot;

FIG. 54C is an explanatory view of the motion of teaching the task of inserting a flexible board, of the robot arm in the conventional robot;

FIG. 54D is an explanatory view of the motion of teaching the task of inserting a flexible board, of the robot arm in the conventional robot;

FIG. 54E is an explanatory view of the motion of teaching the task of inserting a flexible board, of the robot arm in the conventional robot;

FIG. 54F is an explanatory view of the motion of teaching the task of inserting a flexible board, of the robot arm in the conventional robot;

FIG. 54G is an explanatory view of the motion of teaching the task of inserting a flexible board, of the robot arm in the conventional robot;

FIG. 54H is an explanatory view of the motion of teaching the task of inserting a flexible board, of the robot arm in the conventional robot; and FIG. 55 is a view of force information and positional information during the motion of teaching the task of inserting a flexible board, of the robot arm in the conventional robot.

DETAILED DESCRIPTION

Before the description of the present disclosure proceeds, it is to be noted that like parts are designated by like reference numerals throughout the accompanying drawings.

Before the description of the various embodiments proceeds, various approaches made by the inventors to accomplish the embodiments are explained.

First, the basic concept of the present disclosure is explained.

Examples of the disclosed technique are as follows.

1st aspect: A control apparatus for controlling a motion of a robot arm, the control apparatus comprising:

a motion information acquiring section that acquires motion information including at least one of a position, orientation, and velocity of the robot arm in motion;

an environment information acquiring section that acquires environment information including at least one of force information, sound volume information, and positional information related to peripheral environment and generated by the robot arm in motion;

a predetermined reaction time information acquiring section that acquires information of predetermined reaction time as predetermined time information from receipt of the environment information by a person to manipulation of the robot arm by the person;

an information variation point detecting section that detects, as an information variation point, a time point where at least one of the motion information acquired by the motion information acquiring section and the environment information acquired by the environment information acquiring section varies;

a behavior variation point detecting section that searches time from a time point after elapse of the predetermined reaction time from the information variation point, for the time point where at least one of the motion information acquired by the motion information acquiring section and the environment information acquired by the environment information acquiring section varies, to detect an initially detected time point as a behavior variation point;

a feedback rule generating section that generates, as a feedback rule, at least one of the motion information acquired by the motion information acquiring section and the environment information acquired by the environment information acquiring section in time from the behavior variation point;

a motion generating section that generates a motion of the robot arm based on the motion information, the information variation point, the behavior variation point, and the feedback rule; and a controller that controls the motion of the robot arm in accordance with the motion generating section.

According to the first aspect of the present disclosure, there is generated the feedback rule for the manipulation by a person at the time point after elapse of the reaction time from the time point of generation of a stimulus. It is thus possible to generate the feedback rule as intended by the person. It is also possible to prevent an unstable motion during the reaction time, which enhances safety.

2nd aspect: The control apparatus for a robot arm according to the 1st aspect, wherein, when the behavior variation point detecting section determines that the behavior variation point is not detected in the time from the time point after elapse of the predetermined reaction time from the information variation point, the behavior variation point detecting section searches in a time until the information variation point in a time until the time point after elapse of the predetermined reaction time and detects an initially detected time point as the behavior variation point.

According to the second aspect, for example, even in a case where reaction time of a person is short (where a task is well experienced, where a task having great concentration is performed, or the like), variation in behavior of the person can be indicated accurately and a behavior variation point can be detected, so that skills of the person can be transferred to the robot arm. This enables a task similar to that performed by the person regardless of variation in environment.

3rd aspect: The control apparatus for a robot arm according to the 2nd aspect, further comprising:

an actual reaction time information detecting section that detects, as actual reaction time information, a time difference between the information variation point detected by the information variation point detecting section and the behavior variation point detected by the behavior variation point detecting section;

wherein the motion generating section corrects the motion information acquired by the motion information acquiring section while the person manipulates the robot arm in accordance with the feedback rule generated by the feedback rule generating section, when the information variation point detecting section detects an information variation point upon controlling a motion of the robot arm.

According to the third aspect, the controller is capable of applying a feedback rule corresponding to a target task on the basis of the motion information from the motion generating section, depending on selection whether or not the motion related to actual reaction time information is corrected (e.g. deleted). It is also possible to correct (e.g. delete) an unstable motion of a working person to be generated during a reaction time, so that a motion as intended by the person can be replayed.

4th aspect: The control apparatus for a robot arm according to the 3rd aspect, further comprising:

a predetermined reaction time information measurement section that measures the predetermined reaction time information;

wherein the motion of the robot arm controlled by the control apparatus for the robot arm is an assembling task, the robot arm preliminarily performs the assembling task as an experiment, the predetermined reaction time information measurement section measures the predetermined reaction time information as information of a predetermined time from receipt of the environment information by the person in manipulation of the robot arm by the person to carrying out the manipulation of the robot arm by the person, and the predetermined reaction time information is used for teaching the assembling task.

According to the fourth aspect, the predetermined reaction time information measurement section preliminarily measures the predetermined reaction time information. It is thus possible to deal with a difference in reaction time due to a person, a target task, environment information, or the like. The behavior variation point detecting section is thus capable of accurately detecting the behavior variation point, thereby achieving accuracy in performing a task regardless of change in person, target task, environment information, or the like.

5th aspect: The control apparatus for a robot arm according to the 3rd aspect, wherein the motion generating section generates a motion of the robot arm based on the motion information, the information variation point, the behavior variation point, and the feedback rule, the motion having shortest actual reaction time information.

According to the fifth aspect, the motion generating section is capable of generating a motion of the robot arm related to the shortest actual reaction time information. Even in a case where there are plural pieces of taught data, the motion generating section is capable of selecting and replaying the best taught data (in other words, the taught data having the shortest actual reaction time information), thereby achieving an efficient task.

6th aspect: The control apparatus for a robot arm according to the 3rd aspect, wherein when the behavior variation point detecting section detects the motion information as the behavior variation point, if there are two time points, inclusive of the behavior variation point, where the motion information varies during elapse of a time of a preliminary motion detection threshold from the behavior variation point and the motion information has same values at the two time points, the behavior variation point detecting section searches in a time from a second time point for the behavior variation point, and the motion generating section corrects the motion information in a time between a first time point and the second time point so as to have values same as those of the motion information at the two time points.

According to the sixth aspect, the behavior variation point detecting section detects and corrects the motion information (preliminary motion information) for the time between the first time point and the second time point, so that taught data not intended by a person can be corrected. It is thus possible to generate accurate motion information, thereby achieving an accurate task even with remarkable variation in environment. If a preliminary motion is replayed without correction, the robot arm rapidly shifts. This may lead to damage to a target object, for example. In this case, such damage to the target object can be prevented by deleting the preliminary motion information using the motion generating section in accordance with a selection by a person.

7th aspect: The control apparatus for a robot arm according to the 3rd aspect, wherein, when the environment information includes plural pieces of information as the information variation point at a same time point with respect to a single behavior variation point, the information variation point detecting section uses, as the information variation point, the force information if any, uses the sound volume information if there is not the force information, and uses the positional information if there is not the sound volume information.

According to the seventh aspect, even in a case where there are plural pieces of environment information as information variation points, the environment information determined by a person can be selected in accordance with the determination described above, and the information variation point detecting section is thus capable of detecting the selected environment information as the information variation point. Skills of the person can be thus extracted accurately, and the robot is capable of performing an accurate task.

8th aspect: The control apparatus for a robot arm according to the 2nd aspect, wherein the information variation point detecting section detects, as an information variation point, a time point where a displacement in at least one of the motion information acquired by the motion information acquiring section and the environment information acquired by the environment information acquiring section is larger than an information variation point detection threshold, and the behavior variation point detecting section detects, as a behavior variation point, a time point where a displacement in at least one of the motion information acquired by the motion information acquiring section and the environment information acquired by the environment information acquiring section is larger than a behavior variation point detection threshold.

9th aspect: The control apparatus for a robot arm according to the 2nd aspect, wherein the information variation point detecting section or the behavior variation point detecting section smoothes at least one of the motion information and the environment information, obtains a difference between smoothed information and unsmoothed original information, and detects as a variation point, a time point where the difference is larger than a variation point detection threshold.

According to the ninth aspect, the information variation point detecting section or the behavior variation point detecting section detects an information variation point or a behavior variation point using smoothed information. This leads to reduction in influence of noise and accurate detection of the variation point. Skills of a person can be thus extracted accurately, and the robot is capable of performing an accurate task.

10th aspect: The control apparatus for a robot arm according to the 3rd aspect, wherein the motion generating section corrects by deleting a motion of the robot arm in a time detected as the actual reaction time information.

According to the tenth aspect, in the case of deleting a motion related to actual reaction time information, a motion during reaction time of the person can be deleted and an unstable motion can be thus deleted.

11th aspect: The control apparatus for a robot arm according to the 3rd aspect, wherein the motion generating section corrects by interpolating a motion of the robot arm in a time detected as the actual reaction time information, based on a motion at the information variation point and a motion at the behavior variation point.

12th aspect: The control apparatus for a robot arm according to the 10th or 11th aspect, wherein the motion generating section corrects, the motion of the robot arm in the time detected as the actual reaction time information, by interpolating the motion of the robot arm when an absolute value of a difference between information at the information variation point and information at the behavior variation point is equal to or more than a motion correction switching threshold, and by deleting the motion of the robot arm when the absolute value is less than the motion correction switching threshold.

13th aspect: A robot comprising:
a robot arm; and
the control apparatus according to any one of claims 1 to 11, for controlling the robot arm.

According to the thirteenth aspect of the present disclosure, there is generated the feedback rule for the manipulation by a person at the time point after elapse of the reaction time from the time point of generation of a stimulus. It is thus possible to generate the feedback rule as intended by the person. It is also possible to prevent an unstable motion during the reaction time, which enhances safety.

14th aspect: A control method for controlling a motion of a robot arm, the control method comprising:

acquiring, by a motion information acquiring section, motion information including at least one of a position, orientation, and velocity of the robot arm in motion;

acquiring, by an environment information acquiring section, environment information including at least one of force information, sound volume information, and positional information related to peripheral environment and generated by the robot arm in motion;

acquiring, by a predetermined reaction time information acquiring section, predetermined reaction time information as information of a predetermined time from receipt of the environment information by a person in manipulation of the robot arm by the person to carrying out the manipulation of the robot arm by the person;

detecting as an information variation point, by an information variation point detecting section, a time point where at least one of the motion information acquired by the motion information acquiring section and the environment information acquired by the environment information acquiring section varies;

searching, by a behavior variation point detecting section, in a time from a time point after elapse of the predetermined reaction time from the information variation point, for a time point where a displacement in at least one of the motion information acquired by the motion information acquiring section and the environment information acquired by the environment information acquiring section varies, to detect an initially detected time point as a behavior variation point;

generating as a feedback rule, by a feedback rule generating section, at least one of the motion information acquired by the motion information acquiring section and the environment information acquired by the environment information acquiring section in a time from the behavior variation point;

generating, by a motion generating section, a motion of the robot arm based on the motion information, the information variation point, the behavior variation point, and the feedback rule; and controlling, by a controller, the motion of the robot arm in accordance with the motion of the robot arm generated by the motion generating section.

According to the fourteenth aspect of the present disclosure, there is generated the feedback rule for the manipulation by a person at the time point after elapse of the reaction time from the time point of generation of a stimulus. It is thus possible to generate the feedback rule as intended by the person. It is also possible to prevent an unstable motion during the reaction time, which enhances safety.

15th aspect: A control program for controlling a motion of a robot arm, the control program for causing a computer to execute steps of:

acquiring, by a motion information acquiring section, motion information including at least one of a position, orientation, and velocity of the robot arm in motion;

acquiring, by an environment information acquiring section, environment information including at least one of force information, sound volume information, and positional information related to peripheral environment and generated by the robot arm in motion;

acquiring, by a predetermined reaction time information acquiring section, predetermined reaction time information as information of a predetermined time from receipt of the environment information by a person in manipulation of the robot arm by the person to carrying out the manipulation of the robot arm by the person;

detecting as an information variation point, by an information variation point detecting section, a time point where at least one of the motion information acquired by the motion information acquiring section and the environment information acquired by the environment information acquiring section varies;

searching, by a behavior variation point detecting section, in a time from a time point after elapse of the predetermined reaction time from the information variation point, for a time point where at least one of the motion information acquired by the motion information acquiring section and the environment information acquired by the environment information acquiring section varies, to detect an initially detected time point as a behavior variation point;

generating as a feedback rule, by a feedback rule generating section, at least one of the motion information acquired by the motion information acquiring section and the environment information acquired by the environment information acquiring section in a time from the behavior variation point;

generating, by a motion generating section, a motion of the robot arm based on the motion information, the information variation point, the behavior variation point, and the feedback rule; and controlling, by a controller, the motion of the robot arm in accordance with the motion of the robot arm generated by the motion generating section.

According to the fifteenth aspect of the present disclosure, there is generated the feedback rule for the manipulation by a person at the time point after elapse of the reaction time from the time point of generation of a stimulus. It is thus possible to generate the feedback rule as intended by the person. It is also possible to prevent an unstable motion during the reaction time, which enhances safety.

16th aspect: An integrated electronic circuit for controlling a motion of a robot arm, the integrated electronic circuit for performing:

acquiring, by a motion information acquiring section, motion information including at least one of a position, orientation, and velocity of the robot arm in motion;

acquiring, by an environment information acquiring section, environment information including at least one of force information, sound volume information, and positional information related to peripheral environment and generated by the robot arm in motion;

acquiring, by a predetermined reaction time information acquiring section, predetermined reaction time information as information of a predetermined time from receipt of the environment information by a person in manipulation of the robot arm by the person to carrying out the manipulation of the robot arm by the person;

detecting as an information variation point, by an information variation point detecting section, a time point where at least one of the motion information acquired by the motion information acquiring section and the environment information acquired by the environment information acquiring section varies;

searching, by a behavior variation point detecting section, in a time from a time point after elapse of the predetermined reaction time from the information variation point, for a time point where a displacement in at least one of the motion information acquired by the motion information acquiring section and the environment information acquired by the environment information acquiring section varies, to detect an initially detected time point as a behavior variation point;

generating as a feedback rule, by a feedback rule generating section, at least one of the motion information acquired by the motion information acquiring section and the environment information acquired by the environment information acquiring section in a time from the behavior variation point;

generating, by a motion generating section, a motion of the robot arm based on the motion information, the information variation point, the behavior variation point, and the feedback rule; and controlling, by a controller, the motion of the robot arm in accordance with the motion of the robot arm generated by the motion generating section.

According to the sixteenth aspect of the present disclosure, there is generated the feedback rule for the manipulation by a person at the time point after elapse of the reaction time from the time point of generation of a stimulus. It is thus possible to generate the feedback rule as intended by the person. It is also possible to prevent an unstable motion during the reaction time, which enhances safety.

The embodiments of the present disclosure are described below with reference to the accompanying drawings.

(First Embodiment)

Figure 1A:
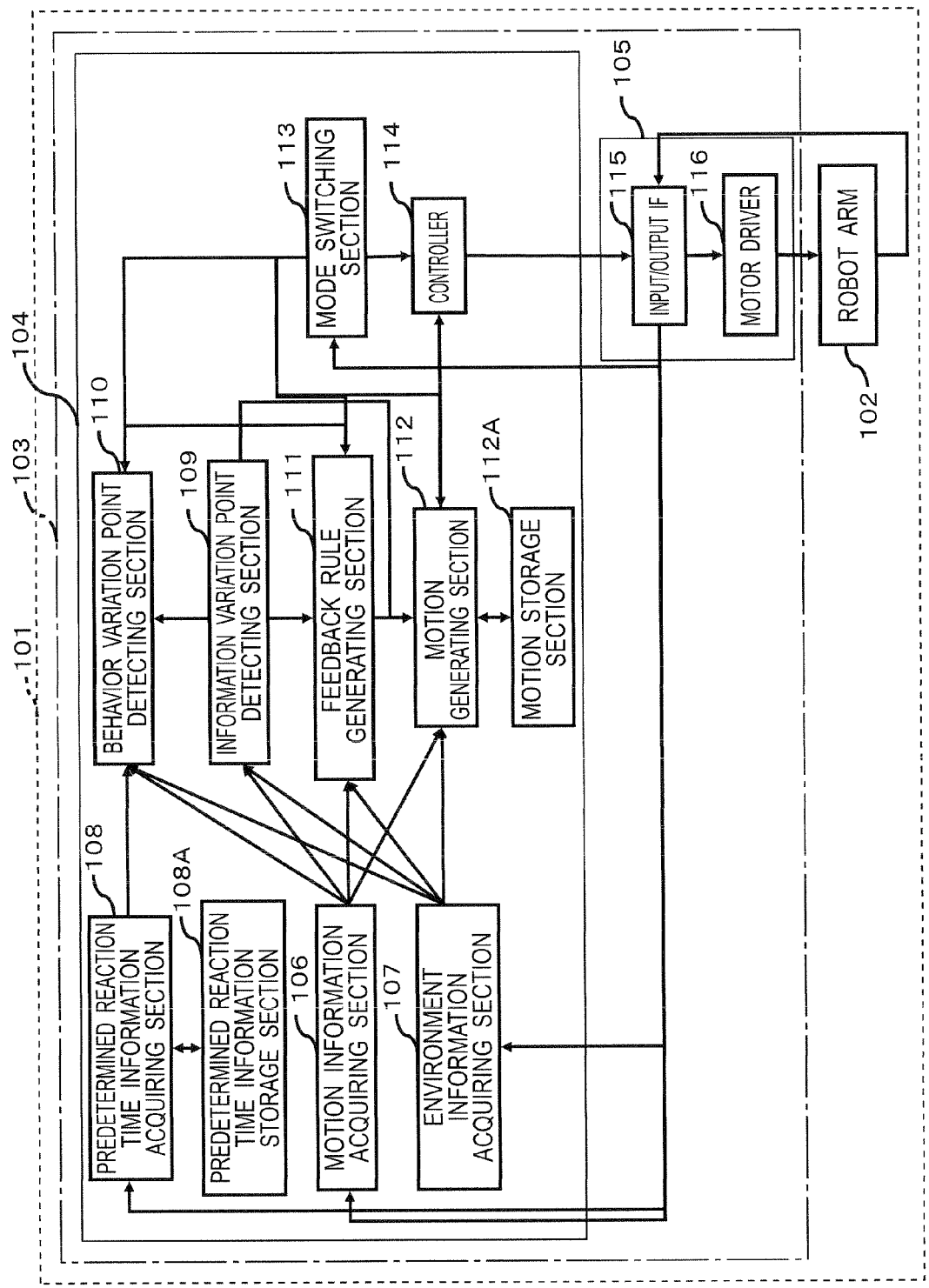
FIG. 1A is a block diagram of a robot arm in a robot according to a first embodiment of the present disclosure.

FIG. 1A is a block diagram of a robot 101 according to a first embodiment of the present disclosure. In FIG. 1A, the robot 101 includes a robot arm 102 and a control apparatus 103 for the robot arm 102.

<Description of Control Apparatus for Robot Arm>

The control apparatus 103 for the robot arm 102 includes a control apparatus main body 104 and a peripheral device 105.

<Description of Control Apparatus Main Body>

The control apparatus main body 104 includes a motion information acquiring section 106, an environment information acquiring section 107, a predetermined reaction time information acquiring section 108, a predetermined reaction time information storage section 108A, an information variation point detecting section 109, a behavior variation point detecting section 110, a feedback rule generating section 111, a motion generating section 112, a motion storage section 112A, a mode switching section 113, and a controller 114.

The peripheral device 105 includes an input/output interface (IF) 115 and a motor driver 116. Described below are functions of the respective portions.

The motion information acquiring section 106 receives positional information and orientation information on the robot arm 102 from the input/output IF 115, and time information from a timer incorporated in the input/output IF 115. The motion information acquiring section 106 acquires velocity Information by differentiating the positional information and the orientation information with the time information, which are received from the input/output IF 115. FIG. 2 indicates the time information, the positional information, the orientation information, the velocity information, and angular velocity information, which are acquired by the motion information acquiring section 106.

The motion information acquiring section 106 outputs the positional information, the orientation information, the velocity information, and the time information on the robot arm 102, which are thus acquired, to the information variation point detecting section 109, the behavior variation point detecting section 110, the feedback rule generating section 111, and the motion generating section 112.

The environment information acquiring section 107 acquires environment information that includes at least one of force information, sound volume information, and the positional information. The force information, the sound volume information, and the positional information relate to the peripheral environment and are generated when the robot arm 102 operates. More specifically, the environment information acquiring section 107 receives, from the input/output IF 115, information including at least one of a measurement value of a force sensor 716 (see FIG. 7) to be described later, a measurement value of a sound collector 717 (see FIG. 7) to be described later, and an image captured by an imaging device 718 (see FIG. 7) to be described later. The environment information acquiring section 107 also receives the time information from the timer incorporated in the input/output IF 115. The environment information acquiring section 107 regards the measurement value of the force sensor 716 as force information, and the measurement value of the sound collector 717 as sound volume information. The environment information acquiring section 107 further acquires positional information on a target object from captured image information of the imaging device 718, and regards the acquired positional information as target object positional information. Force information includes a value of the force sensor 716 mounted to the robot arm 102, and indicates magnitude of reactive force generated when the robot arm 102 comes into contact with a target object. Sound volume information includes a value of the sound collector 717 mounted near the robot arm 102, and indicates a level of sound generated when the robot arm 102 shifts and causes contact or the like. Target object positional information is positional information on a target object obtained from captured image information of the imaging device 718 that is mounted near the robot arm 102, and indicates a distance between the robot arm 102 and the target object (to be detailed later). FIG. 3 indicates the time information, the force information, the sound volume information, and the target object positional information, which are acquired by the environment information acquiring section 107.

The environment information acquiring section 107 outputs the time information and environment information including at least one of the force information, the sound volume information, and the target object positional information, to the information variation point detecting section 109, the behavior variation point detecting section 110, the feedback rule generating section 111, and the motion generating section 112.

The predetermined reaction time information acquiring section 108 acquires predetermined reaction time information from information received from the input/output IF 115, stores the predetermined reaction time information in the predetermined reaction time information storage section 108A, and outputs the received predetermined reaction time information to the behavior variation point detecting section 110.

Predetermined reaction time information is information on time from provision of a sensory stimulus to a person to generation of behavior reaction by the person, and can be received from the input/output IF 115. In this example, the predetermined reaction time information is set to 200 ms. More specifically, using the input/output IF 115 such as a keyboard, a mouse, a touch panel, a sound input device, or the like, a person inputs the number of years of task experience and a target task. The predetermined reaction time information acquiring section 108 predetermined reaction time information on the basis of the number of years of task experience and the target task thus inputted. FIG. 4 exemplifies a data chart that is referred to by the predetermined reaction time information acquiring section 108 upon determination of predetermined reaction time information. The predetermined reaction time information acquiring section 108 also stores predetermined reaction time information and information referred to for determination of the predetermined reaction time information in the predetermined reaction time information storage section 108A.

The information variation point detecting section 109 detects an information variation point on the basis of at least one of three pieces of information. The three pieces of information include at least one of the positional information, the orientation information, and the velocity information, which are received from the motion information acquiring section 106, the time information, and the environment information received from the environment information acquiring section 107. The information variation point detecting section 109 outputs the information variation point thus detected and the time information corresponding to the information variation point to the behavior variation point detecting section 110, the feedback rule generating section 111, and the motion generating section 112.

Described below is a method of detecting the information variation point.

Initially described is a case of using one piece of environment information. The information variation point detecting section 109 obtains a displacement in environment information that is transmitted from the environment information acquiring section 107 to the information variation point detecting section 109. The information variation point detecting section 109 sets an information variation point at a portion where the obtained displacement is larger than a first threshold (information variation point detection threshold). "Being larger than a threshold" means that a displacement has a sign same as that of the threshold and has the absolute value larger than that of the threshold. This applies to the rest of the present specification. The first threshold has a value that can be inputted using the input/output IF 115, and the value differs for each piece of environment information. For example, the first threshold is set to 3 N for force information, 10 dB for sound volume information, or 10 mm for target object positional information.

No information variation point is detected in a case where the information variation point detecting section 109 detects no portion where the obtained displacement is larger than the first threshold.

Described next is a case of using one piece of motion information and one piece of environment information. The information variation point detecting section 109 obtains a displacement in environment information that is transmitted from the environment information acquiring section 107 to the information variation point detecting section 109 and a displacement in motion information that is received from the motion information acquiring section 106. The information variation point detecting section 109 sets an information variation point at a portion where the obtained displacements are both larger than a first threshold (information variation point detection threshold). The first threshold includes a threshold for motion information in addition to the threshold for environment information described above. For example, the first threshold is set to 10 mm for positional information, 0.2 rad for orientation information, or 0.1 mm/ms for velocity information. Also in a case of using plural pieces of information, an information variation point is set at a portion where displacements of all the pieces of information are larger than the first thresholds.

FIG. 5 is a data chart of time information and an information variation point.

The behavior variation point detecting section 110 receives time information and motion information including at least one of positional information, orientation information, and velocity information from the motion information acquiring section 106, receives environment information and time information from the environment information acquiring section 107, receives predetermined reaction time information from the predetermined reaction time information acquiring section 108, and receives an information variation point and time information corresponding to the information variation point from the information variation point detecting section 109. The behavior variation point detecting section 110 detects a behavior variation point on the basis of the information thus received. The behavior variation point detecting section 110 outputs the behavior variation point thus detected and time information corresponding to the behavior variation point to the feedback rule generating section 111.

Described below is a method of detecting a behavior variation point by the behavior variation point detecting section 110. The behavior variation point detecting section 110 searches the motion information received from the motion information acquiring section 106 and the environment information received from the environment information acquiring section 107 for a portion where these pieces of information are larger than a second threshold (behavior variation point detection threshold) in the time from a time point after elapse of a predetermined reaction time from the information variation point, and detects an initial portion where these pieces of information are larger than the second threshold as a behavior variation point. The second threshold can be inputted using the input/output IF 115, and its value differs for each piece of information. For example, the second threshold is set to 0.5 N for force information, 1 dB for sound volume information, 1 mm for target object positional information, 1 mm for positional information, 0.02 rad for orientation information, or 0.01 mm/ms for velocity information. No behavior variation point is detected in a case where the behavior variation point detecting section 110 detects no portion where any one of pieces of the information is larger than the second threshold. A plurality of behavior variation points are detected in a case where the behavior variation point detecting section 110 detects portions where any one of pieces of the information are larger than the second thresholds in plural pieces of information.

FIG. 6 is a data chart of time information and a behavior variation point.

The feedback rule generating section 111 receives time information and motion information including at least one of positional information, orientation information, and velocity information from the motion information acquiring section 106, receives environment information and time information from the environment information acquiring section 107, receives an information variation point and time information corresponding to the information variation point from the information variation point detecting section 109, and receives a behavior variation point and time information corresponding to the behavior variation point from the behavior variation point detecting section 110. The feedback rule generating section 111 generates a feedback rule on the basis of the information thus received. The feedback rule generating section 111 outputs the feedback rule thus generated and time information to the motion generating section 112.

Described below is a method of generating a feedback rule by the feedback rule generating section 111. The feedback rule generating section 111 approximates, to an approximate curve, information (motion information or environment information) in which a behavior variation point is detected in the time after the behavior variation point received from the behavior variation point detecting section 110. The approximate curve is drawn in the following manner. If the feedback rule generating section 111 determines that there is an information variation point in the time after the behavior variation point, the feedback rule generating section 111 approximates, to an approximate curve, information from the behavior variation point to the next information variation point in accordance with the least squares method. If the feedback rule generating section 111 determines that there is no information variation point in the time after the behavior variation point, the feedback rule generating section 111 approximates, to an approximate curve, information in the time after the behavior variation point (until the end of taught data) in accordance with the least squares method. The feedback rule generating section 111 is alternatively capable of generating a feedback rule without approximating to an approximate curve, as in a method of directly setting information in which a behavior variation point is detected to a target value or in a method of setting a constant to a target value.

The motion generating section 112 receives time information and motion information including at least one of positional information, orientation information, and velocity information from the motion information acquiring section 106, receives environment information and time information from the environment information acquiring section 107, and receives an information variation point and time information corresponding to the information variation point from the information variation point detecting section 109. The motion generating section 112 generates motion information on the basis of the information thus received. The motion generating section 112 also receives a feedback rule and time information from the feedback rule generating section 111. The motion generating section 112 outputs the motion information thus generated and time information to the controller 114. The motion generating section 112 stores the motion information thus generated, the feedback rule, and the time information in the motion storage section 112A.

Described below is a method of generating motion information by the motion generating section 112. The motion generating section 112 generates motion information from the motion information received from the motion information acquiring section. In a case where the motion generating section 112 receives an information variation point from the information variation point detecting section 109 while the robot arm 102 is in motion, the motion generating section 112 generates a motion applied to the feedback rule on the basis of motion information and environment information. A motion applied to the feedback rule corresponds to motion information that is varied so as to be along a received approximate curve.

The mode switching section 113 outputs, to the controller 114, mode information that is received from the input/output IF 115. Mode information can be inputted using the input/ output IF 115, and includes information on one of a "teach mode", a "replay mode", or a "stop mode".

In the "teach mode", a person teaches the robot arm 102 a motion, and the robot arm 102 is moved in accordance with manipulation by the person. In the "replay mode", the robot arm 102 automatically replays a motion taught by a person in the "teach mode", and the robot arm 102 automatically moves without manipulation by a person. In the "stop mode", the robot arm 102 does not move but stops with no shift.

Figure 1B:
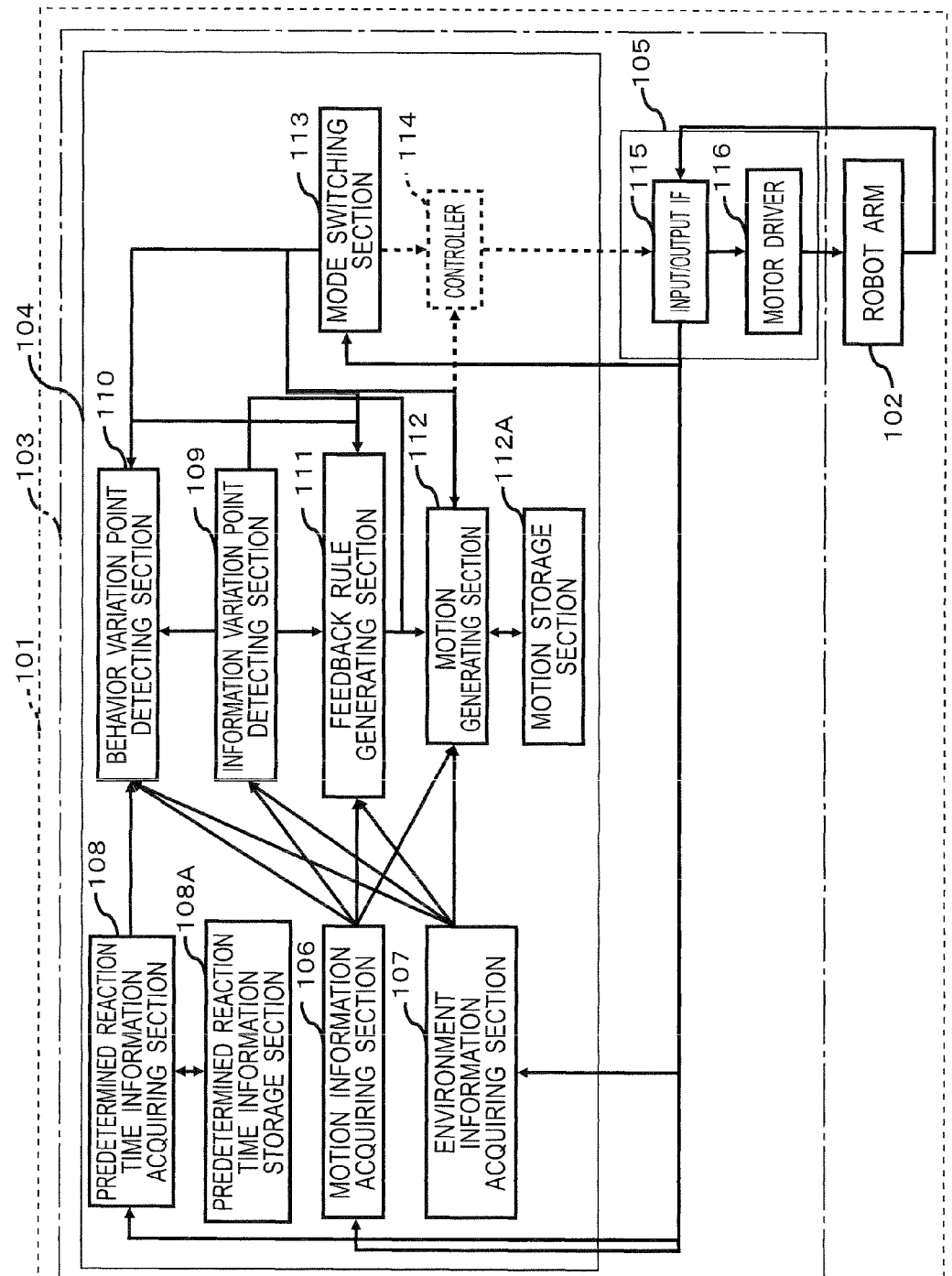
FIG. 1B is a block diagram of the robot arm being taught in the robot according to the first embodiment of the present disclosure.
Figure 1C:
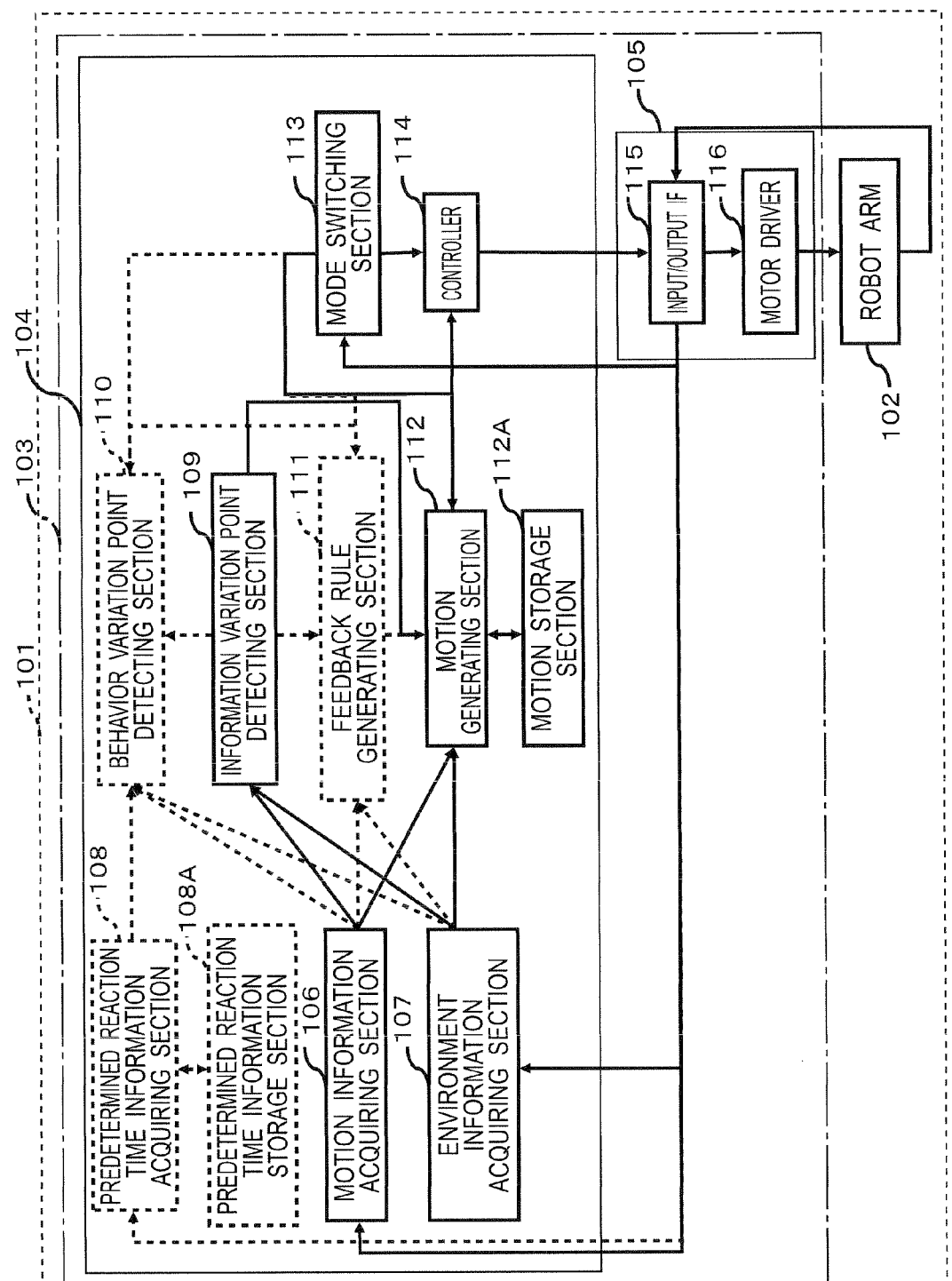
FIG. 1C is a block diagram of the robot arm upon replay in the robot according to the first embodiment of the present disclosure.

FIG. 1B is a block diagram in the "teach mode", and FIG. 1C is a block diagram in the "replay mode". In these block diagrams, elements indicated with broken lines (e.g. the controller 114 in FIG. 1B, the predetermined reaction time information acquiring section 108, the predetermined reaction time information storage section 108A, the behavior variation point detecting section 110, and the feedback rule generating section 111 in FIG. 1C) are not used. In the "teach mode", the information variation point detecting section 109 detects an information variation point and the behavior variation point detecting section 110 detects a behavior variation point on the basis of data (motion information and environment information) that is obtained through teaching. Furthermore, the feedback rule generating section 111 generates a feedback rule and the motion generating section 112 generates motion information used for a replaying motion. All the elements other than the controller are used accordingly. In the "replay mode", the controller 114 replays a motion generated during the teaching. If the information variation point detecting section 109 detects an information variation point, the controller 114 applies the feedback rule on the basis of motion information generated by the motion generating section 112.

Start time points and end time points of the "teach mode" and the "replay mode" are transmitted to the controller 114. The start time points and the end time points are outputted by pressing buttons (such as a start button and an end button) of the input/output IF 115 through manipulation by a person. In the "teach mode", the robot arm 102 is shifted in accordance with manipulation by a person. Taught data includes information from the start to end of shift of the robot arm 102 in accordance with manipulation by a person. In the "replay mode", the controller 114 automatically shifts the robot arm 102 so that the robot arm 102 follows a track according to taught data. The robot arm 102 automatically shifts in the time from the start to the end, and stops in the rest of time. In the "stop mode", the robot arm 102 stops at a current position and in current orientation without shifting.

The controller 114 receives motion information and time information from the motion generating section 112. The controller 114 outputs the motion information thus received to the input/output IF 115 at a constant time interval (e.g. every 1 ms) using the timer incorporated in the input/output IF 115. The controller 114 receives mode information from the mode switching section 113. If the mode information received from the mode switching section 113 is the "replay mode", the controller 114 outputs, to the input/output IF 115, motion information received from the motion generating section 112. If the mode information received from the mode switching section 113 is the "teach mode", the controller 114 does not output motion information received from the motion generating section 112 to the input/output IF 115. In this case, the robot arm 102 does not automatically move but is moved in accordance with manipulation by a person. If the mode information received from the mode switching section 113 is the "stop mode", the controller 114 does not output motion information received from the motion generating section 112 to the input/output IF 115, but outputs, to the input/output IF 115, motion information for stopping the robot arm 102 at a same position and in same orientation.

<Description of Peripheral Devices>

Figure 1D:
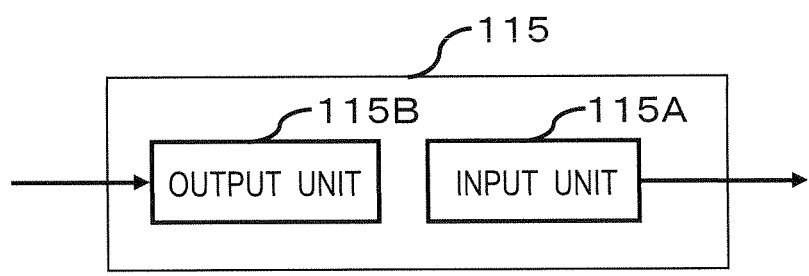
FIG. 1D is a block diagram of an input/output IF in the robot according to the first embodiment of the present disclosure.

The input/output IF 115 outputs motion information received from the controller 114 to the motor driver 116. The input/output IF 115 also outputs, to the environment information acquiring section, a measurement value of the force sensor 716, a measurement value of the sound collector 717, an image captured by the imaging device 718, and time information obtained from the timer incorporated in the input/output IF 115. A calculating section in each encoder 715 obtains positional information and orientation information on the robot arm 102 from a value received at the encoder 715 (to be detailed later), and the controller 114 outputs, to the motion information acquiring section 106, the positional information, the orientation information, and time information from the timer incorporated in the input/output IF 115. The controller 114 receives predetermined reaction time information (e.g. 200 ms) that is inputted by a person using the input/output IF 115, and outputs the predetermined reaction time information thus received to the predetermined reaction time information acquiring section 108. The controller 114 receives mode information that is inputted by a person using the input/output IF 115, and outputs the mode information thus received to the mode switching section 113. As shown in FIG. 1D, the input/output IF 115 includes an input unit 115A and an output unit 115B. The input unit 115A configures an input IF, and is used when a person selects an item using a keyboard, a mouse, a touch panel, a sound input device, or the like, or when a person inputs a number using a keyboard, a mouse, a touch panel, a sound input device, or the like. The output unit 115B configures an output IF, and is used when acquired information or the like is outputted or when the information is indicated on a display device or the like.

The motor driver 116 outputs, to the robot arm 102, a command value to each motor 714 (see FIG. 7) in the robot arm 102, in order to control the robot arm 102 on the basis of motion information received from the input/output IF 115.

<Description of Robot Arm>

In the robot arm 102, the calculating section in each encoder 715 of the robot arm 102 obtains positional information on the robot arm 102 at a constant time interval (e.g. every 1 ms) using the timer incorporated in the input/output IF 115. The positional information thus obtained is outputted to the input/output IF 115. The robot arm 102 is controlled in accordance with a command value from the motor driver 116.

Details thereof are given below with reference to FIG. 7. For example, the robot arm 102 configures a multiple link manipulator of six degrees of freedom, which is rotatable about six axes in total.

Figure 7:
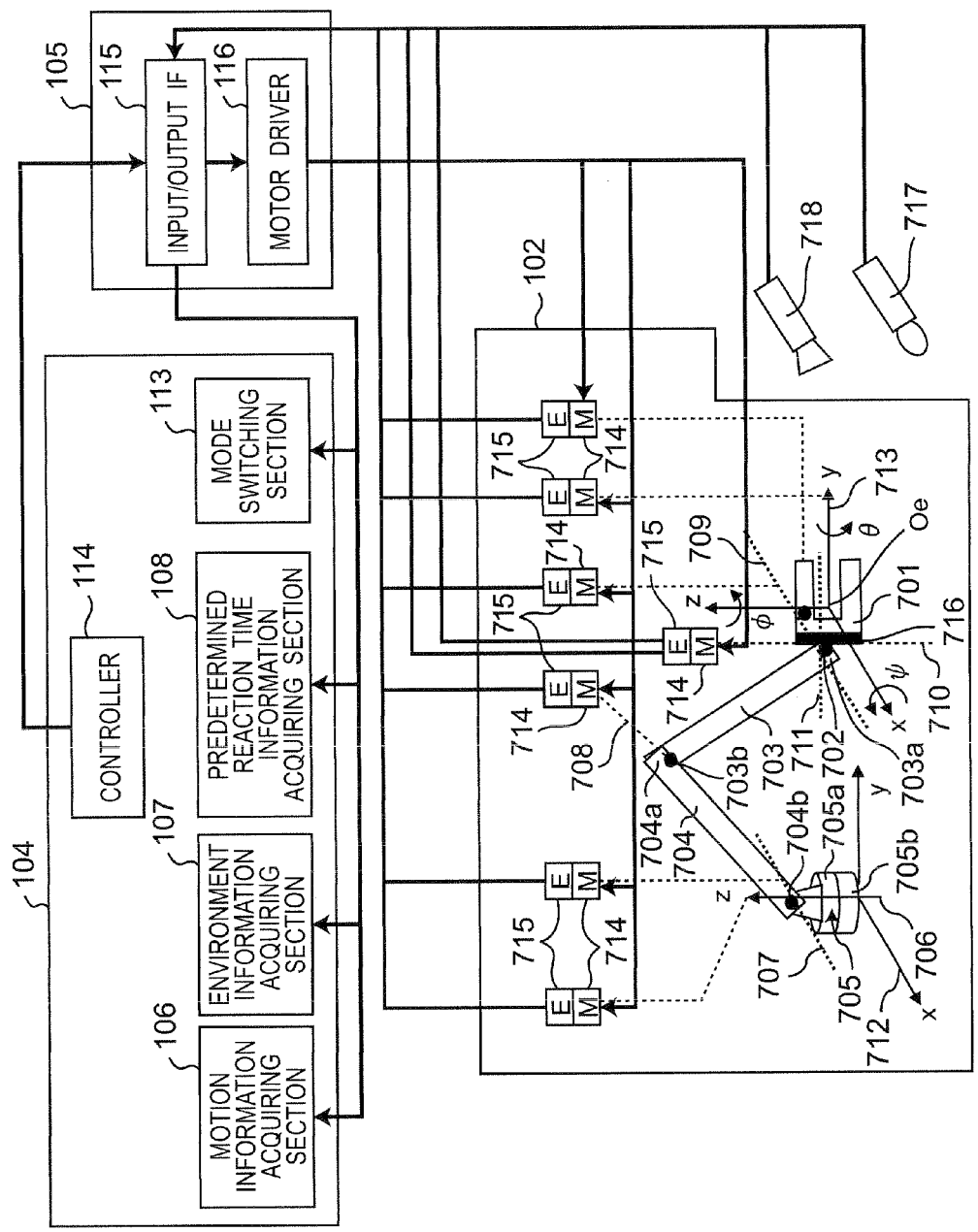
FIG. 7 is an explanatory view of the robot arm in the robot according to the first embodiment of the present disclosure.

As shown in FIG. 7, as one example, the robot arm 102 is a multijoint robot arm, more specifically, the multiple link manipulator of six degrees of freedom.

The robot arm 102 includes a hand 701, a front arm link 703 that has a distal end 703a provided with a wrist 702 to which the hand 701 is attached, an upper arm link 704 that has a distal end 704a rotatably connected to a proximal end 703b of the front arm link 703, and a pedestal 705 rotatably connecting and supporting a proximal end 704b of the upper arm link 704. The pedestal 705 is fixed at a constant position. Alternatively, the pedestal 705 can be connected to a rail (not shown) so as to be shiftable.

The wrist 702 has three rotary shafts perpendicular to one another, at a fourth joint 709, a fifth joint 710, and a sixth joint 711, so that relative orientation (direction) of the hand 701 can be varied with respect to the front arm link 703. More specifically, in FIG. 7, the fourth joint 709 is capable of varying relative orientation of the hand 701 with respect to the wrist 702, around a transverse axis. The fifth joint 710 is capable of varying relative orientation of the hand 701 with respect to the wrist 702, around an ordinate axis perpendicular to the transverse axis of the fourth joint 709. The sixth joint 711 is capable of varying relative orientation of the hand 701 with respect to the wrist 702, around a transverse axis perpendicular to the transverse axis of the fourth joint 709 as well as perpendicular to the ordinate axis of the fifth joint 710. The other end 703b of the front arm link 703 is made rotatable about a third joint 708 with respect to the distal end 704a of the upper arm link 704, in other words, about a transverse axis parallel to the transverse axis of the fourth joint 709. The other end of the upper arm link 704 is made rotatable about a second joint 707 with respect to the pedestal 705, in other words, a transverse axis parallel to the transverse axis of the fourth joint 709. Furthermore, the pedestal 705 has an upper movable portion 705a, which is made rotatable about a first joint 706 with respect to a lower fixed portion 705b of the pedestal 705, in other words, about an ordinate axis parallel to the ordinate axis of the fifth joint 710.

As a result, the robot arm 102 configures the multiple link manipulator of six degrees of freedom, which is rotatable about the six axes in total.

Each of the joints, which configure the rotary portions at the respective shafts of the robot arm 102, includes a rotation drive device such as the motor 714 for driving the corresponding joint, and the encoder 715 (actually located inside corresponding one of the joints of the robot arm 102) which detects a rotation phase angle (in other words, a joint angle) of the rotary shaft of the corresponding motor 714 and calculates positional information and orientation information using the calculating section in the encoder 715 to output the positional information and the orientation information thus calculated. The motor 714 (actually located inside the corresponding one of the joints of the robot arm 102) is driven and controlled by the motor driver 116 that is included in one of a pair of members configuring each of the joints (such as a rotary member and a support member supporting the rotary member). The rotary shaft of the motor 714 provided to the one of the members configuring each of the joints is connected to another one of the members configuring the corresponding joint so as to rotate positively or negatively the rotary shaft. Accordingly, the other one of the members is made rotatable about corresponding one of the shafts with respect to the one of the members.

Furthermore, reference numeral 712 denotes an absolute coordinate system in which the relative positional relationship is fixed with respect to the lower fixed portion 705b of the pedestal 705. Reference numeral 713 denotes an arm tip coordinate system in which the relative positional relationship is fixed with respect to the hand 701. Assume that an original position $O_e(x, y, z)$ of the arm tip coordinate system 713 viewed from the absolute coordinate system 712 corresponds to an arm tip position of the robot arm 102, and that orientation of the arm tip coordinate system 713 viewed from the absolute coordinate system 712 corresponds to arm tip orientation (orientation information) of the robot arm 102 expressed by a roll angle, a pitch angle, and a yaw angle ($\phi$, $\theta$, $\phi$). Furthermore, the arm tip position and an orientation vector are defined as a vector $r=[x, y, z, \phi, \theta, \phi]^T$. Accordingly, in an example, the ordinate axis of the first joint 706 can be made parallel to the z axis of the absolute coordinate system 712, and the transverse axis of the second joint 707 can be made parallel to the x axis of the absolute coordinate system 712. In a different example, the transverse axis of the fourth joint 709 can be made parallel to the x axis of the arm tip coordinate system 713, the transverse axis of the sixth joint 711 can be made parallel to the y axis of the arm tip coordinate system 713, and the ordinate axis of the fifth joint 710 can be made parallel to the z axis of the arm tip coordinate system 713.

It is assumed that the rotation angle of the arm tip coordinate system 713 about the x axis corresponds to the yaw angle $\phi$, the rotation angle thereof about the y axis corresponds to the pitch angle $\theta$, and the rotation angle thereof about the z axis corresponds to the roll angle $\phi$.

In the configuration shown in FIG. 7, there are provided the force sensor 716, the sound collector 717, and the imaging device 718 each of which acquires environment information generated while the robot arm 102 is in motion. In order to acquire environment information, there can be alternatively provided at least one of the force sensor 716, the sound collector 717, and the imaging device 718. The force sensor 716 is mounted to the wrist 702 of the front arm link 703, to which the hand 701 of the robot arm 102 is attached. The force sensor 716 is capable of detecting force applied to the hand 701. The sound collector 717 is located near the distal end of a connector 1003, and is capable of collecting click sound generated upon contact between a flexible board 1002 and the connector 1003. The imaging device 718 is mounted near (e.g. above) the robot arm 102 and is capable of capturing an image including the hand 701 of the robot arm 102 and the connector 1003 (target object). The imaging device 718 is capable of acquiring data from which a distance from the distal end of the hand 701 of the robot arm 102 to the connector 1003 (target object) can be obtained.

Described next are the process in the teach mode in which a person's hand 1001 manipulates to shift the robot arm 102 to generate a motion, and the process in the replay mode in which the robot arm 102 replays the motion.

A task of inserting the flexible board 1002 is described as an example of the first embodiment.

The flexible board 1002 in this example is 5.5 mm wide and 0.3 mm thick, and has ten contact pins for the connector 1003. The connector 1003 has an insert port of 5.57 mm wide and 0.35 mm thick.

Figure 8A:
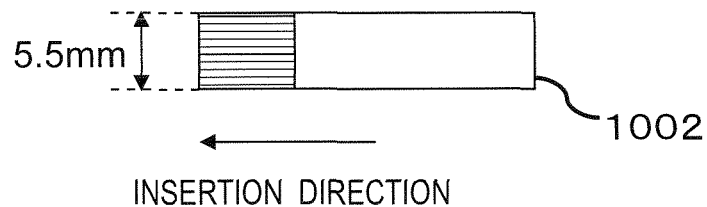
FIG. 8A is a view, seen from below in an insertion direction, of a flexible board in the robot according to the first embodiment of the present disclosure.
Figure 8B:
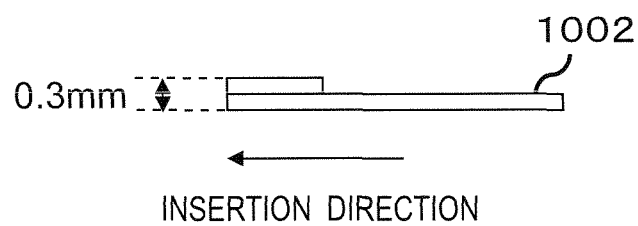
FIG. 8B is a lateral view in the insertion direction, of the flexible board in the robot according to the first embodiment of the present disclosure.
Figure 9A:
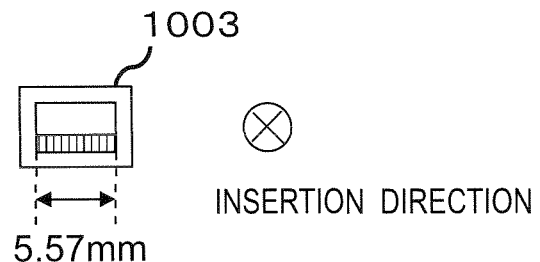
FIG. 9A is a front view in an insertion direction, of a connector in the robot according to the first embodiment of the present disclosure.
Figure 9B:
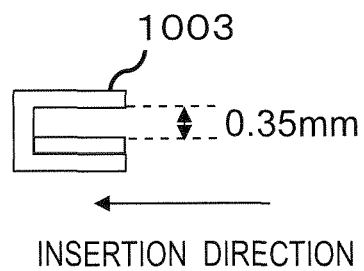
FIG. 9B is a lateral view in the insertion direction, of the connector in the robot according to the first embodiment of the present disclosure.

FIG. 8A is a view, from below in a direction of inserting the connector 1003, of the flexible board 1002. FIG. 8B is a lateral view of the flexible board 1002 in the direction of inserting the connector 1003. FIG. 9A is a front view in the insertion direction, of the connector 1003. FIG. 9B is a lateral view in the insertion direction, of the connector 1003.

The flexible board 1002 is thin and highly flexible, so that the task of inserting the flexible board into the connector 1003 is quite fine and difficult to achieve.

Described below are three examples of using environment information, namely, (i) using force information, (ii) using sound volume information, and (iii) using target object positional information.

(i) Example of using force information
<Description of Teach Mode>
The example of using force information is described below.

A person shifts, using the person's hand 1001, the robot arm 102 that grips a flexible board at the hand 701, to teach the robot arm 102 the motion of inserting the flexible board into the connector that is fixed to a jig or the like.

Among FIGS. 10A to 10J, the process of teaching the robot arm 102 the motion using the person's hand 1001 is illustrated in the order of FIGS. 10A, 10C, 10E, 10G, and 10I, while corresponding states of the flexible board 1002 and the connector 1003 are shown in the order of FIGS. 10B, 10D, 10F, 10H, and 10J. The mode switching section 113 selects the "teach mode" in this case. In the teaching, a person presses the start button of the IF 115 in the state shown in FIG. 10A, and the person presses the end button of the IF 115 in the state shown in FIG. 10I.

Figure 10A:
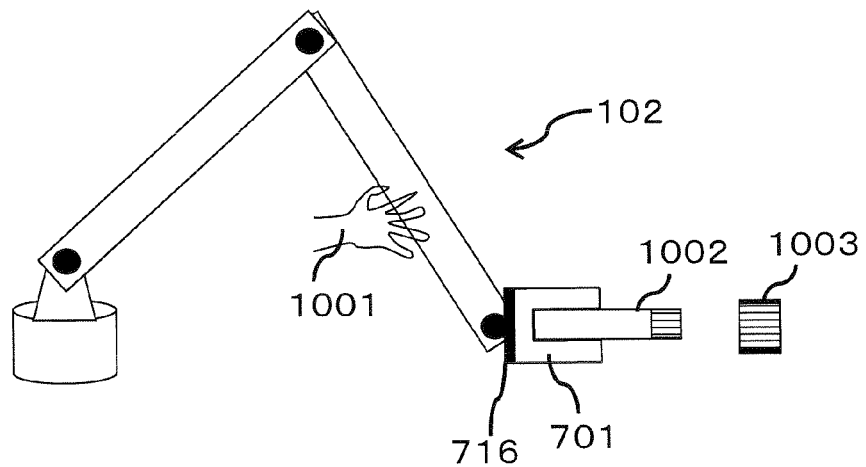
FIG. 10A is an explanatory view of a motion of teaching a task of inserting a flexible board, of the robot arm in the robot according to the first embodiment of the present disclosure (in a case of using force information)
Figure 10B:
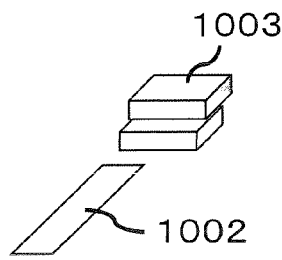
FIG. 10B is an explanatory view of the motion of teaching the task of inserting a flexible board, of the robot arm in the robot according to the first embodiment of the present disclosure (in the case of using force information)

FIG. 10A illustrates the time point where the person's hand 1001 grips the robot arm 102 and the person starts teaching the robot arm 102. In this time point, the flexible board 1002 gripped by the hand 701 of the robot arm 102 and the connector 1003 have not yet come into contact with each other. The person's hand 1001 thus receives no reactive force to be generated upon contact between the flexible board 1002 and the connector 1003.

Figure 10C:
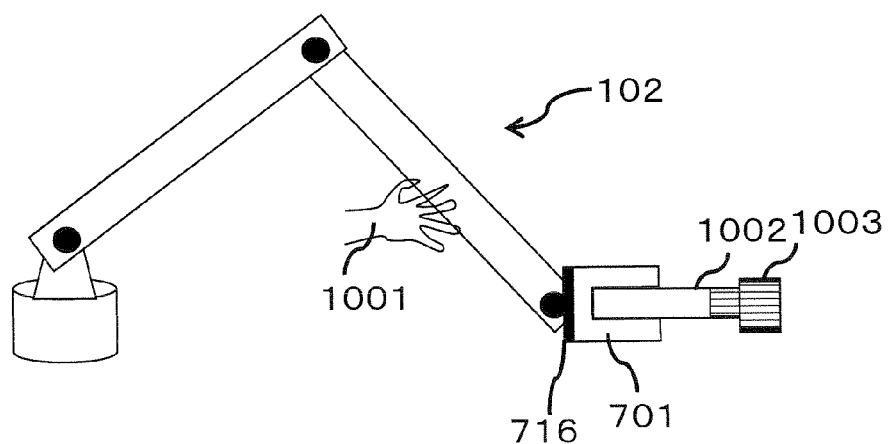
FIG. 10C is an explanatory view of the motion of teaching the task of inserting a flexible board, of the robot arm in the robot according to the first embodiment of the present disclosure (in the case of using force information)
Figure 10D:
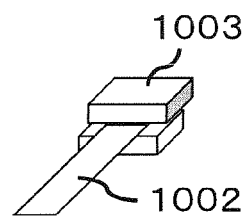
FIG. 10D is an explanatory view of the motion of teaching the task of inserting a flexible board, of the robot arm in the robot according to the first embodiment of the present disclosure (in the case of using force information)

Next, FIG. 10C illustrates the time point where the distal end of the flexible board 1002 is in contact with an inlet port of the connector 1003. After elapse of a reaction time from this time point, the person's hand 1001 receives a reactive force generated upon contact, and the person changes his or her behavior. The person changes a force applied to the flexible board 1002 or the direction of inserting the flexible board 1002 while estimating the degree of warp or the position of the flexible board 1002 on the basis of magnitude of the reactive force sensed by the hand 1001, and then, insert the flexible board 1002 into the connector 1003. The force sensor 716 detects the magnitude of the reactive force during this inserting task.

Figure 10E:
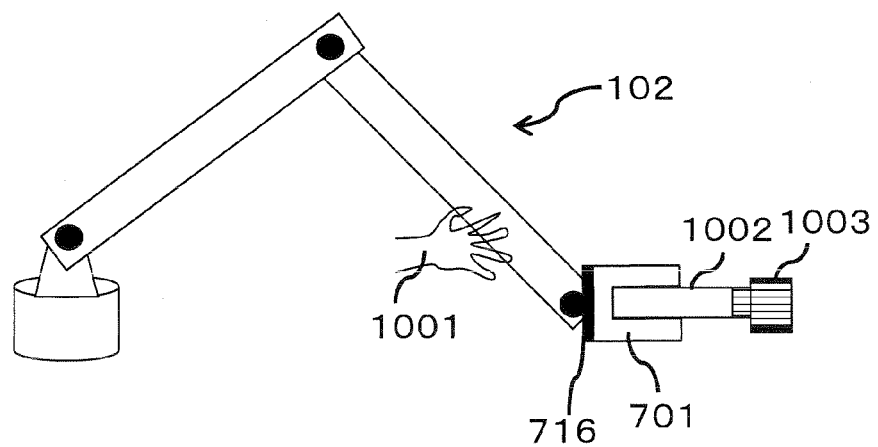
FIG. 10E is an explanatory view of the motion of teaching the task of inserting a flexible board, of the robot arm in the robot according to the first embodiment of the present disclosure (in the case of using force information)
Figure 10F:
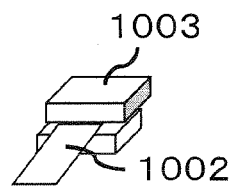
FIG. 10F is an explanatory view of the motion of teaching the task of inserting a flexible board, of the robot arm in the robot according to the first embodiment of the present disclosure (in the case of using force information)

Next, FIG. 10E illustrates the time point of performing the inserting task after the contact, of pressing the flexible board 1002 into the connector 1003. In this time point, the person's hand 1001 receives a reactive force generated upon inserting the flexible board 1002 into the connector 1003. The reactive force in this time point is sensed with the person's hand 1001, so that the person adjusts the degree of insertion of the flexible board 1002 into the connector 1003.

Figure 10G:
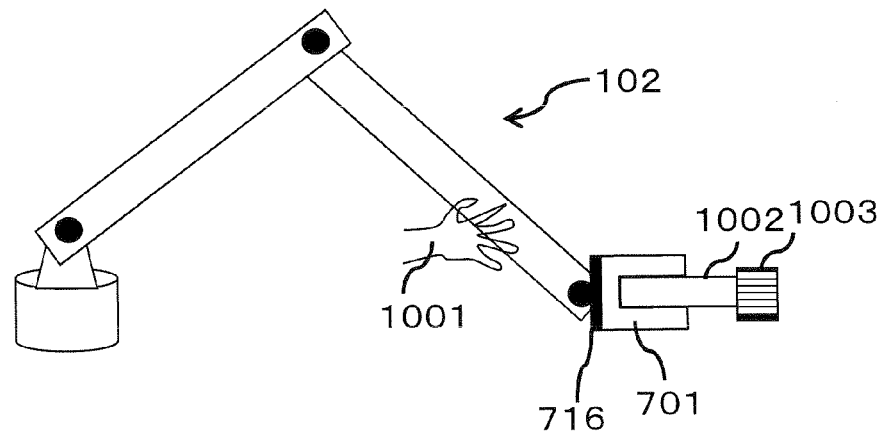
FIG. 10G is an explanatory view of the motion of teaching the task of inserting a flexible board, of the robot arm in the robot according to the first embodiment of the present disclosure (in the case of using force information)
Figure 10H:
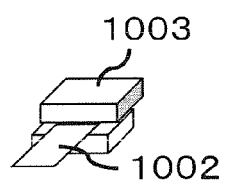
FIG. 10H is an explanatory view of the motion of teaching the task of inserting a flexible board, of the robot arm in the robot according to the first embodiment of the present disclosure (in the case of using force information)

Next, FIG. 10G illustrates the time point where the distal end of the flexible board 1002 is in contact with the inner bottom of the connector 1003 and the inserting task is completed. After elapse of a reaction time from this time point, the person's hand 1001 receives a reactive force generated upon contact between the distal end of the flexible board 1002 and the inner bottom of the connector 1003, and the person changes his or her behavior. The reactive force at this time point is sensed with the person's hand 1001, so that the person recognizes completion of insertion of the flexible board 1002 into the connector 1003.

Figure 10I:
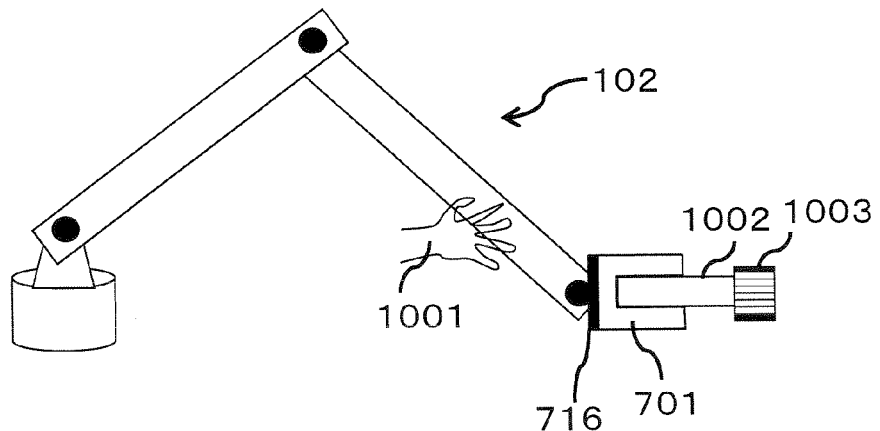
FIG. 10I is an explanatory view of the motion of teaching the task of inserting a flexible board, of the robot arm in the robot according to the first embodiment of the present disclosure (in the case of using force information)
Figure 10J:
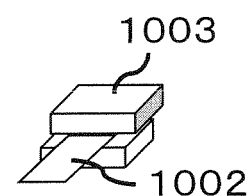
FIG. 10J is an explanatory view of the motion of teaching the task of inserting a flexible board, of the robot arm in the robot according to the first embodiment of the present disclosure (in the case of using force information)

Next, FIG. 10I illustrates the time point where the teaching motion ends. In the time point shown in FIG. 10G, the teaching motion is ended such that the flexible board 1002 is not pressed into the connector 1003 from the time point where the person's hand 1001 senses the reactive force at completion of the inserting task to the time point at the end of the teaching motion.

The task of inserting the flexible board 1002 into the connector 1003 is taught in this manner.

Described next with reference to FIG. 11A is the process of detecting an information variation point and a behavior variation point from data on the teaching motion and generating a feedback rule.

FIG. 11A indicates a value of the force sensor 716 and positional information on the robot arm 102 during the teaching motion illustrated in FIGS. 10A to 10J. The positional information on the robot arm 102 corresponds to positional information that is acquired by the motion information acquiring section 106. A first solid line 310 in graph indicates the value detected by the force sensor 716. A second solid line 311 in graph indicates the position of the robot arm 102. The transverse axis in FIG. 11A denotes teaching motion time (ms) from start of the teaching motion (0 ms) to end of the teaching motion. The left ordinate axis in FIG. 11A denotes the position (mm) of the robot arm 102. The right ordinate axis in FIG. 11A denotes the value (N) detected by the force sensor 716. Illustrated under the graph in FIG. 11A are the states of insertion (FIGS. 10A, 10C, 10E, and 10G, and 10I) of the flexible board 1002 into the connector 1003 during the teaching motion.

The information variation point detecting section 109 detects a time point where a displacement in force information is larger than the first threshold for force information. In the first embodiment, the first threshold for force information is set to −0.5 N. The information variation point detecting section 109 detects force information at time points A and D in FIG. 11A as information variation points. The behavior variation point detecting section 110 then detects a time point where a displacement in force information is larger than the second threshold for the force information at and after a time point (a time point B or E in FIG. 11A) after elapse of a predetermined reaction time from the time point at the information variation point (a time point A or D in FIG. 11A) The second threshold for force information is set to −0.2 N in this case, and the behavior variation point detecting section 110 detects the force information at the time point C in FIG. 11A as a behavior variation point. There is found no time point where a displacement is larger than the second threshold for force information at and after the time point E in FIG. 11A. Accordingly, the behavior variation point detecting section 110 does not detect any behavior variation point. Lastly, the feedback rule generating section 111 indicates, with an approximate curve, force information from the behavior variation point (the time point C in FIG. 11A) to the next information variation point (the time point D in FIG. 11A). In this case, the feedback rule generating section 111 generates an approximate curve having inclination of −0.1 N. An approximate curve is generated as follows. The feedback rule generating section 111 generates an approximate curve by approximating force information from the behavior variation point to the next information variation point to a linear function in accordance with the least squares method. FIG. 11A indicates an approximate curve F thus obtained.

An adopted method of detecting a behavior variation point includes detection of a time point where a displacement is larger than a threshold as described above. A different method is described with reference to FIG. 11B. The behavior variation point detecting section 110 divides a section from the information variation point to the next information variation point (e.g. into five sections) and approximates force information in each of the divided sections to a linear function in accordance with the least squares method. The behavior variation point detecting section 110 compares degrees of inclination of two linear functions adjacent to each other, and sets a time point having a larger difference as a behavior variation point. In the example of FIG. 11B, the behavior variation point detecting section 110 divides the section from the information variation point A to the next information variation point F into five sections, and approximates force information in each of the divided sections to a linear function (G to K). The behavior variation point detecting section 110 compares degrees of inclination of adjacent linear functions (G and H, H and I, I and J, and J and K). The behavior variation point detecting section 110 sets, as a behavior variation point, the time point where the difference is the largest (boundary between I and J).

As described above, the information variation point detecting section 109 and the behavior variation point detecting section 110 detect an information variation point and a behavior variation point from taught data, respectively, and the feedback rule generating section 111 generates a feedback rule.

<Description of Replay Mode>

Next, the process of replaying by the robot arm 102 on the basis of taught data is described next with reference to FIGS. 12A to 12J and 13. The process of replaying by the robot arm 102 is illustrated in the order of FIGS. 12A, 12C, 12E, 12G, and 12I. States of the flexible board 1002 and the connector 1003 at the respective time points are illustrated in the order of FIGS. 12B, 12D, 12F, 12H, and 12J. The mode switching section 113 selects the "replay mode" in this case. A person presses the start button of the IF 115 in the time point shown in FIG. 12A, and the person presses the end button of the IF 115 in the time point shown in FIG. 12I.

Figure 12A:
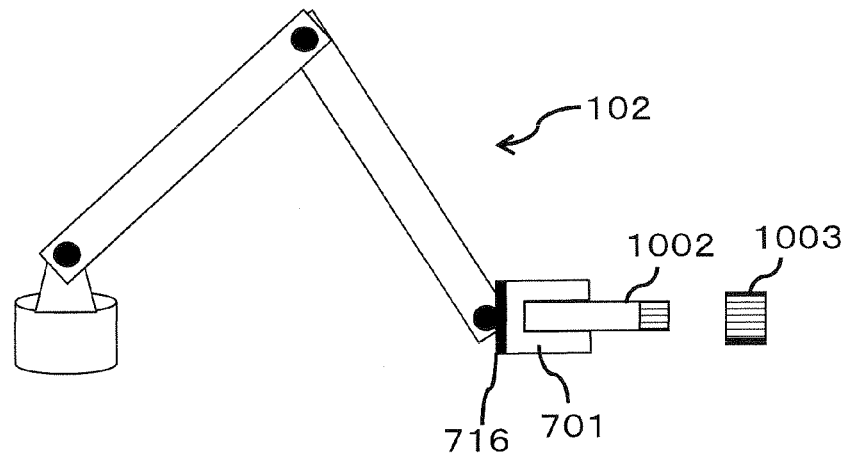
FIG. 12A is an explanatory view of a motion of replaying the task of inserting a flexible board, of the robot arm in the robot according to the first embodiment of the present disclosure (in the case of using force information)
Figure 12B:
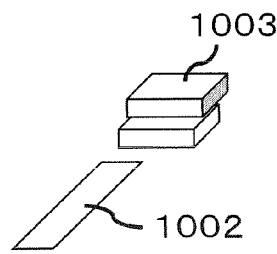
FIG. 12B is an explanatory view of the motion of replaying the task of inserting a flexible board, of the robot arm in the robot according tother first embodiment of the present disclosure (in the case of using force information)
Figure 12C:
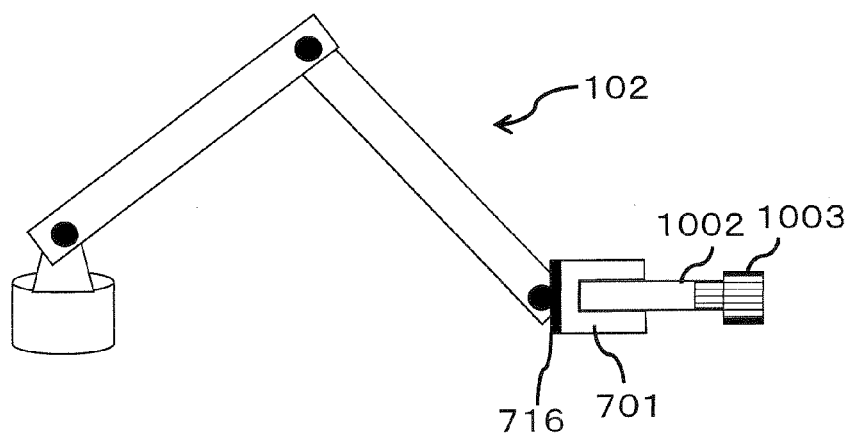
FIG. 12C is an explanatory view of the motion of replaying the task of inserting a flexible board, of the robot arm in the robot according to the first embodiment of the present disclosure (in the case of using force information)
Figure 12D:
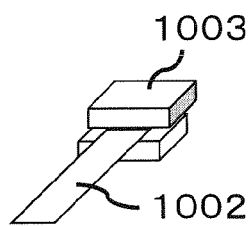
FIG. 12D is an explanatory view of the motion of replaying the task of inserting a flexible board, of the robot arm in the robot according to the first embodiment of the present disclosure (in the case of using force information)
Figure 12E:
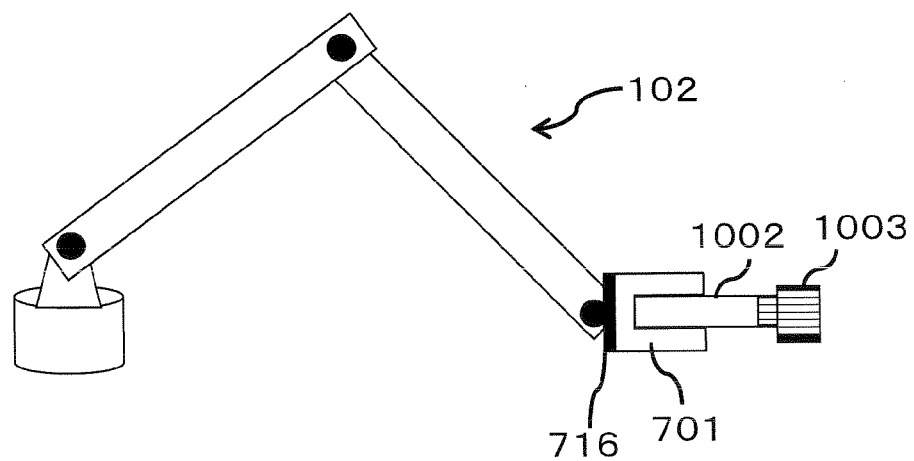
FIG. 12E is an explanatory view of the motion of replaying the task of inserting a flexible board, of the robot arm in the robot according to the first embodiment of the present disclosure (in the case of using force information)
Figure 12F:
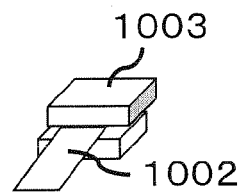
FIG. 12F is an explanatory view of the motion of replaying the task of inserting a flexible board, of the robot arm in the robot according to the first embodiment of the present disclosure (in the case of using force information)
Figure 12G:
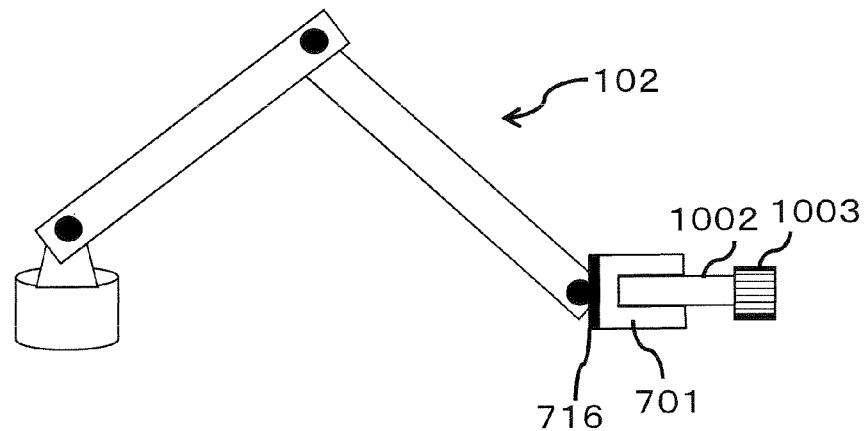
FIG. 12G is an explanatory view of the motion of replaying the task of inserting a flexible board, of the robot arm in the robot according to the first embodiment of the present disclosure (in the case of using force information)
Figure 12H:
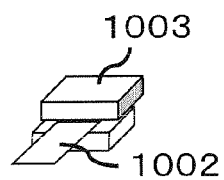
FIG. 12H is an explanatory view of the motion of replaying the task of inserting a flexible board, of the robot arm in the robot according to the first embodiment of the present disclosure (in the case of using force information)
Figure 12I:
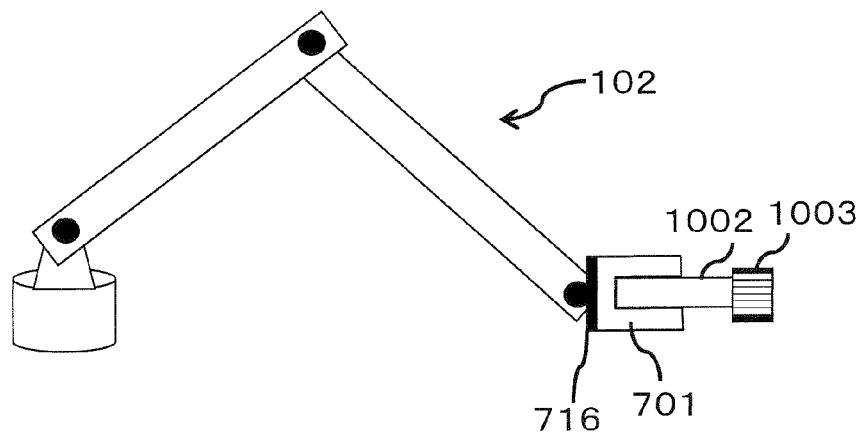
FIG. 12I is an explanatory view of the motion of replaying the task of inserting a flexible board, of the robot arm in the robot according to the first embodiment of the present disclosure (in the case of using force information)
Figure 12J:
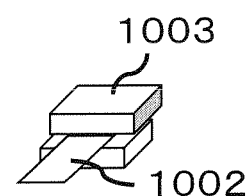
FIG. 12J is an explanatory view of the motion of replaying the task of inserting a flexible board, of the robot arm in the robot according to the first embodiment of the present disclosure (in the case of using force information)
Figure 13:
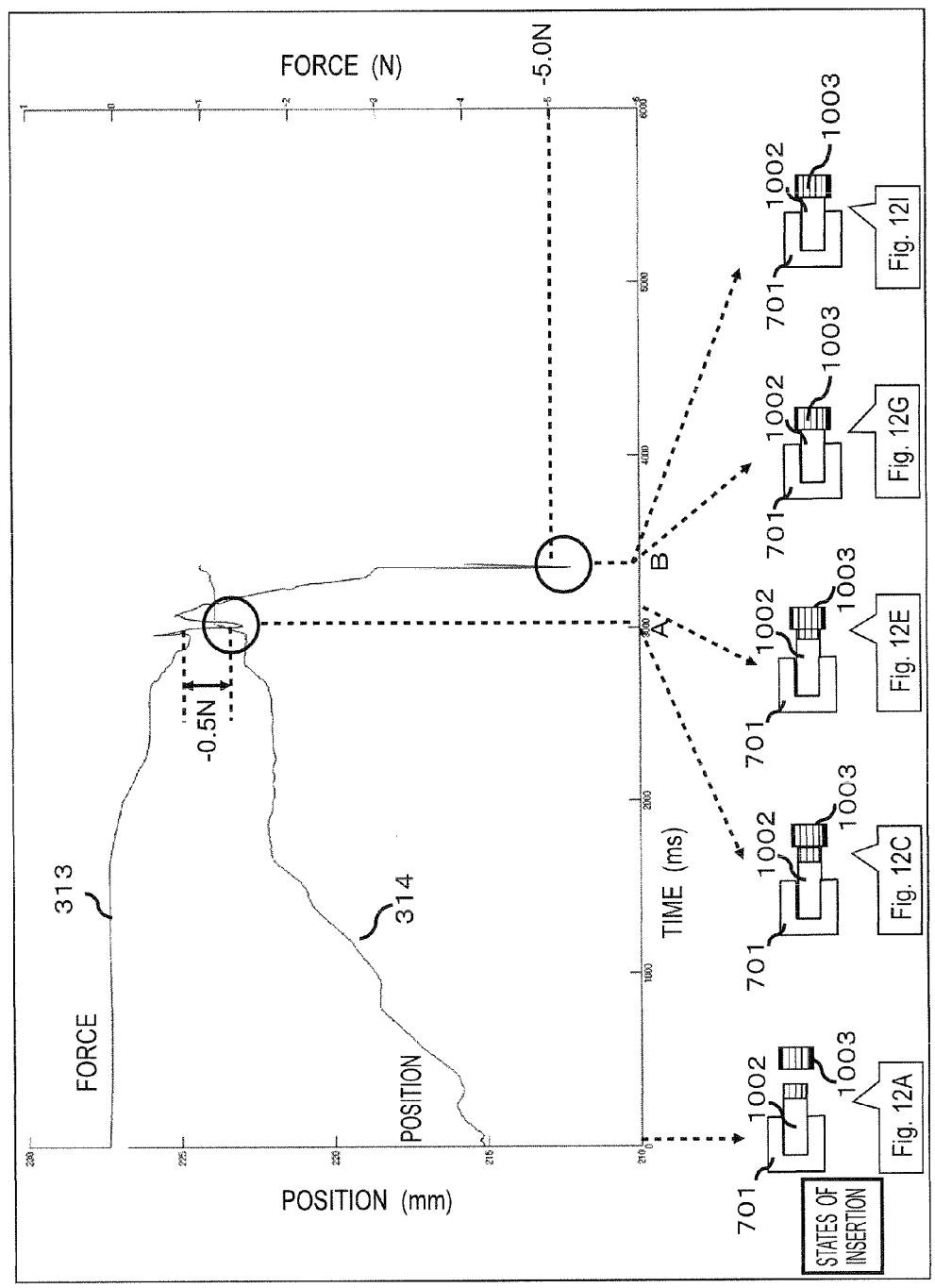
FIG. 13 is a view of force information and positional information during the motion of replaying the task of inserting a flexible board, of the robot arm in the robot according to the first embodiment of the present disclosure.

FIG. 13 indicates a value of the force sensor 716 and positional information on the robot arm 102 during the replaying motion illustrated in FIGS. 12A to 12J. The positional information on the robot arm 102 corresponds to positional information that is acquired by the motion information acquiring section 106. A first solid line 313 in graph indicates the value detected by the force sensor 716. A second solid line 314 in graph indicates the position of the robot arm 102. The transverse axis in FIG. 13 denotes replaying motion time (ms) from start of the replaying motion (ms) to end of the replaying motion. The left ordinate axis in FIG. 13 denotes the position (mm) of the robot arm 102. The right ordinate axis in FIG. 13 denotes the value (N) detected by the force sensor 716. Illustrated under the graph in FIG. 13 are the states of insertion (FIGS. 12A, 12C, 12E, and 12G, and 12I) of the flexible board 1002 into the connector 1003 during the replaying motion.

FIG. 12A illustrates the time point where the robot arm 102 starts a replaying motion. In this time point, positional information in taught data is replayed, and the flexible board 1002 and the connector 1003 have not yet come into contact with each other (see FIG. 13).

Next, FIG. 12C illustrates the time point where the distal end of the flexible board 1002 is in contact with the port of the connector 1003. In the time point, the information variation point detecting section 109 detects, as an information variation point, this time point where a displacement in force information is larger than the first threshold (−0.5 N) (see the time point A in FIG. 13). From this time point, the controller 114 applies the feedback rule on the basis of motion information from the motion generating section 112.

Next, FIG. 12E illustrates the time point where the flexible board 1002 is pressed to be inserted into the connector 1003. At this time point, the controller 114 applies the feedback rule on the basis of motion information from the motion generating section 112. The controller 114 adjusts the position of the robot arm 102 on the basis of motion information from the motion generating section 112 so that the force information follows the approximate curve having inclination of −0.1 N (see FIG. 13).

Next, FIG. 12G illustrates the time point where the distal end of the flexible board 1002 is in contact with the inner bottom of the connector 1003 and the inserting task is completed. At this time point, if the motion generating section 112 determines that the value of the force sensor 716 is larger than a threshold (replaying motion ending condition threshold) (−5.0 N in this case), the motion generating section 112 is set to stop the robot arm 102. Accordingly, the robot arm 102 stops (see the time point B in FIG. 13).

Next, FIG. 12I illustrates the time point where the replaying motion is ended (see FIG. 13).

As described above, the feedback rule generating section 111 generates a feedback rule on the basis of taught data, and the controller 114 replays in accordance with the feedback rule thus generated and motion information generated by the motion generating section 112. It is thus possible to replay a motion similar to the teaching motion even in a case where the environment is varied.

(ii) Example of Using Sound Volume Information

The example of using sound volume information is described next.

<Description of Teach Mode>

Figure 14:
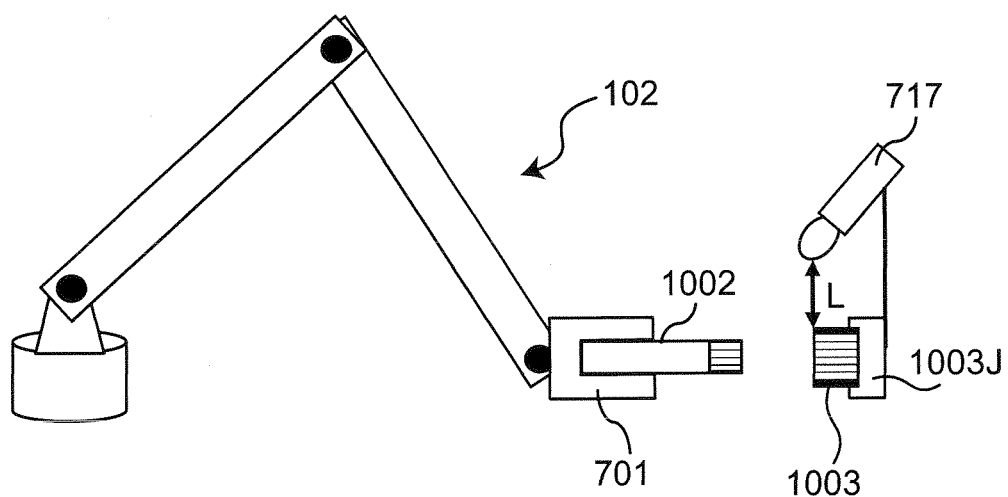
FIG. 14 is a view showing a position of mounting a sound collector in the robot according to the first embodiment of the present disclosure.

The sound collector 717 is mounted to a jig 1003J supporting the connector 1003 at a position where a distance L, as shown in FIG. 14, from the distal end of the sound collector 717 to the distal end of the connector 1003 is 10.0 cm or less, for example. The sound collector 717 collects click sound generated upon contact between the flexible board 1002 and the connector 1003. The following figures do not illustrate the jig 1003J for the purpose of simplification.

FIGS. 15A to 15J show the process performed by the person's hand 1001 manipulating and teaching the robot arm 102. The process performed by the person's hand 1001 teaching the robot arm 102 is illustrated in the order of FIGS. 15A, 15C, 15E, 15G, and 15I. States of the flexible board 1002 and the connector 1003 at the respective time points are illustrated in the order of FIGS. 15B, 15D, 15F, 15H, and 15J. The mode switching section 113 selects the "teach mode" in this case. The person presses the start button of the IF 115 in the time point shown in FIG. 15A, and the person presses the end button of the IF 115 in the time point shown in FIG. 15I.

Figure 15A:
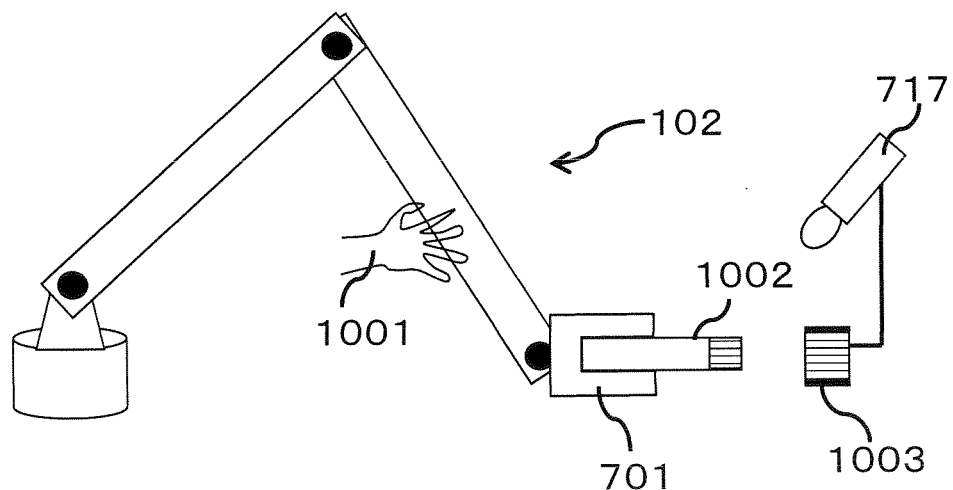
FIG. 15A is an explanatory view of the motion of teaching the task of inserting a flexible board, of the robot arm in the robot according to the first embodiment of the present disclosure (in a case of using sound volume information)
Figure 15B:
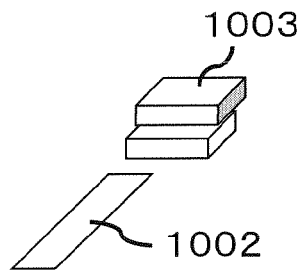
FIG. 15B is an explanatory view of the motion of teaching the task of inserting a flexible board, of the robot arm in the robot according to the first embodiment of the present disclosure (in the case of using sound volume information)

FIG. 15A illustrates the time point where the person's hand 1001 grips the robot arm 102 and the person starts teaching the robot arm 102. In this time point, the flexible board 1002 and the connector 1003 have not yet come into contact with each other. Accordingly, sound volume information is extremely low.

Figure 15C:
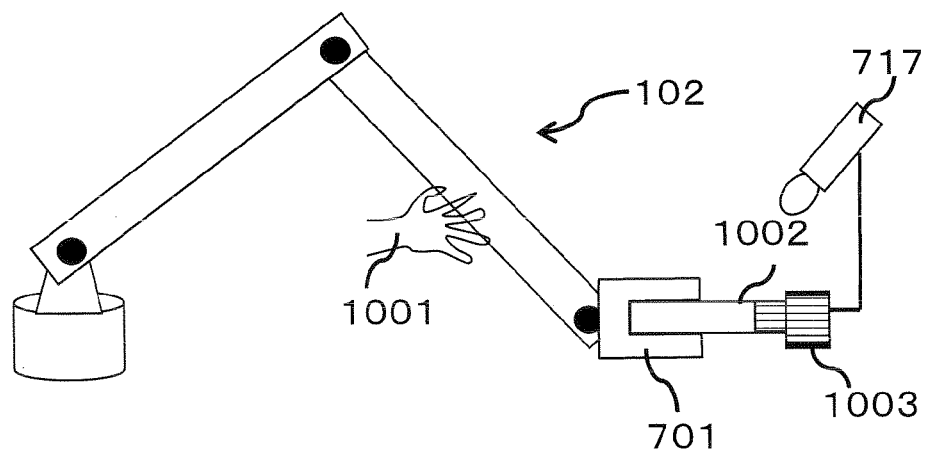
FIG. 15C is an explanatory view of the motion of teaching the task of inserting a flexible board, of the robot arm in the robot according to the first embodiment of the present disclosure (in the case of using sound volume information)
Figure 15D:
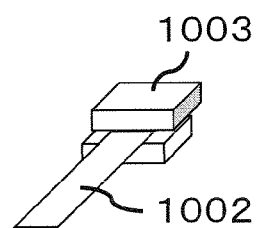
FIG. 15D is an explanatory view of the motion of teaching the task of inserting a flexible board, of the robot arm in the robot according to the first embodiment of the present disclosure (in the case of using sound volume information)

Next, FIG. 15C illustrates the time point where the distal end of the flexible board 1002 is in contact with the port of the connector 1003. In this time point, the sound volume information is raised by sound generated upon contact.

Figure 15E:
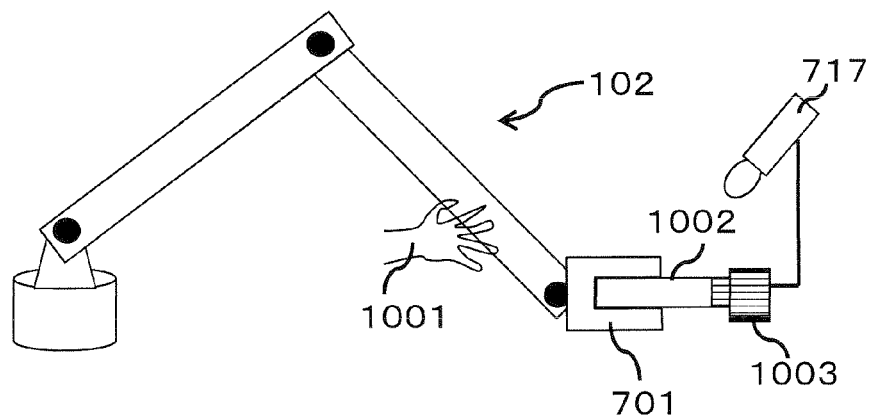
FIG. 15E is an explanatory view of the motion of teaching the task of inserting a flexible board, of the robot arm in the robot according to the first embodiment of the present disclosure (in the case of using sound volume information)
Figure 15F:
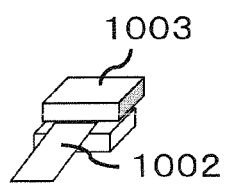
FIG. 15F is an explanatory view of the motion of teaching the task of inserting a flexible board, of the robot arm in the robot according to the first embodiment of the present disclosure (in the case of using sound volume information)

Next, FIG. 15E illustrates the time point where the flexible board 1002 is pressed to be inserted into the connector 1003. In this time point, the sound volume information is gradually raised as the flexible board 1002 is pressed into the connector 1003.

Figure 15G:
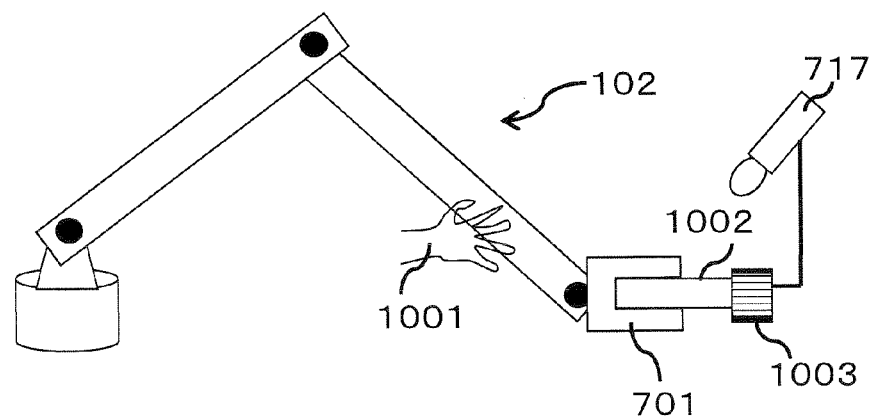
FIG. 15G is an explanatory view of the motion of teaching the task of inserting a flexible board, of the robot arm in the robot according to the first embodiment of the present disclosure (in the case of using sound volume information)
Figure 15H:
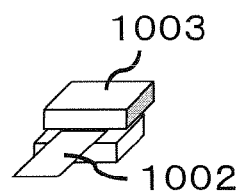
FIG. 15H is an explanatory view of the motion of teaching the task of inserting a flexible board, of the robot arm in the robot according to the first embodiment of the present disclosure (in the case of using sound volume information)

Next, FIG. 15G illustrates the time point where the distal end of the flexible board 1002 is in contact with the inner bottom of the connector 1003 and the inserting task is completed. In this time point, the sound volume information is raised by sound generated when the distal end of the flexible board 1002 comes into contact with the inner bottom of the connector 1003. After elapse of a reaction time from this time point, a person hears the sound generated upon contact and recognizes completion of insertion of the flexible board 1002 into the connector 1003.

Figure 15I:
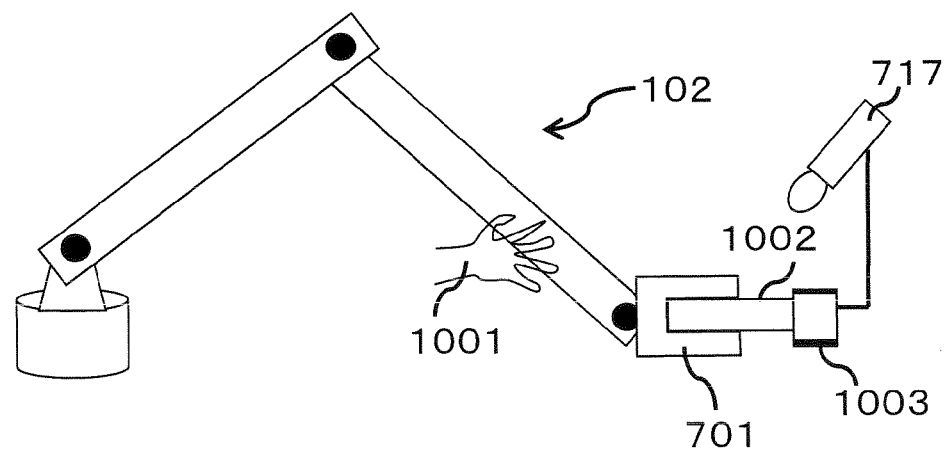
FIG. 15I is an explanatory view of the motion of teaching the task of inserting a flexible board, of the robot arm in the robot according to the first embodiment of the present disclosure (in the case of using sound volume information)
Figure 15J:
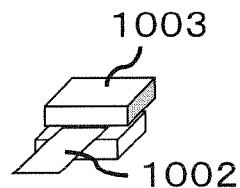
FIG. 15J is an explanatory view of the motion of teaching the task of inserting a flexible board, of the robot arm in the robot according to the first embodiment of the present disclosure (in the case of using sound volume information)

Next, FIG. 15I illustrates the time point where the teaching motion ends.

The task of inserting the flexible board 1002 into the connector 1003 is taught in this manner.

Described next with reference to FIG. 16 is the process of detecting an information variation point and a behavior variation point from taught data and generating a feedback rule.

FIG. 16 indicates sound volume information acquired by the sound collector 717 during the teaching motion illustrated in FIGS. 15A to 15J. The transverse axis in FIG. 16 denotes time from start of the teaching motion (0 ms) to end of the teaching motion. The ordinate axis therein denotes sound volume information (dB). Illustrated under the graph in FIG. 16 are the states of insertion (FIGS. 15A, 15C, 15E, and 15G, and 15I) of the flexible board 1002 into the connector 1003 during the teaching motion.

The information variation point detecting section 109 detects a time point where a displacement in sound volume information acquired by the sound collector 717 is larger than the first threshold. The first threshold in this case is set to 10 dB, for example. The information variation point detecting section 109 detects sound volume information at the time point A in FIG. 16 as an information variation point. The behavior variation point detecting section 110 then detects a time point where a displacement in sound volume information is larger than the second threshold at and after the time point (B) after elapse of a predetermined reaction time from the time point (A) at the information variation point. The second threshold in this case is set to 5 dB, for example. The information variation point detecting section 109 detects sound volume information at the time point C in FIG. 16 as a behavior variation point. Lastly, the feedback rule generating section 111 indicates, with an approximate curve, sound volume information at and after the behavior variation point (the time point C in FIG. 16). In this case, the feedback rule generating section 111 generates an approximate curve having inclination of 3 dB, for example. An approximate curve is generated as follows. The feedback rule generating section 111 generates an approximate curve by approximating sound volume information from the behavior variation point to the next information variation point to a linear function in accordance with the least squares method. FIG. 16 indicates an approximate curve D thus obtained by the feedback rule generating section 111.

As described above, the information variation point detecting section 109 and the behavior variation point detecting section 110 detect an information variation point and a behavior variation point from taught data, respectively, and the feedback rule generating section 111 generates a feedback rule.

<Description of Replay Mode>

The process of replaying by the robot arm 102 on the basis of taught data is described next with reference to FIGS. 17A to 17J and 18. The process of replaying by the robot arm 102 is illustrated in the order of FIGS. 17A, 17C, 17E, 17G, and 17I. States of the flexible board 1002 and the connector 1003 at the respective time points are illustrated in the order of FIGS. 17B, 17D, 17F, 17H, and 17J. The mode switching section 113 selects the "replay mode" in this case. A person presses the start button of the IF 115 in the time point shown in FIG. 17A, and the person presses the end button of the IF 115 in the time point shown in FIG. 17I.

FIG. 18 indicates sound volume information acquired by the sound collector 717 during the replaying motion illustrated from FIG. 17A to 17J. The transverse axis in FIG. 18 denotes a time from start of the replaying motion (0 ms) to end of the replaying motion. The ordinate axis therein denotes sound volume information (dB). Illustrated under the graph in FIG. 18 are the states of insertion (FIGS. 17A, 17C, 17E, and 17G, and 17I) of the flexible board 1002 into the connector 1003.

Figure 17A:
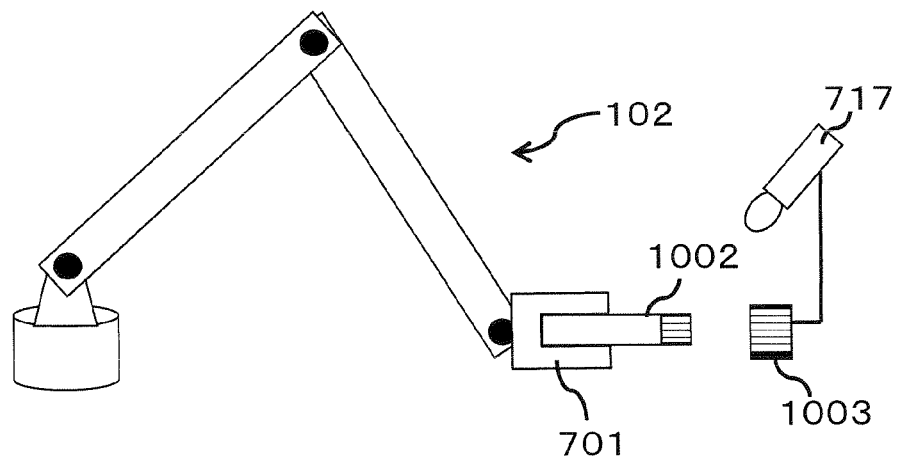
FIG. 17A is an explanatory view of the motion of replaying the task of inserting a flexible board, of the robot arm in the robot according to the first embodiment of the present disclosure (in the case of using sound volume information)
Figure 17B:
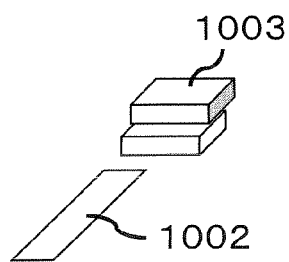
FIG. 17B is an explanatory view of the motion of replaying the task of inserting a flexible board, of the robot arm in the robot according to the first embodiment of the present disclosure (in the case of using sound volume information)

FIG. 17A illustrates the time point where the robot arm 102 starts are playing motion. In this time point, positional information in taught data is replayed, and the flexible board 1002 and the connector 1003 have not yet come into contact with each other (see FIG. 18)

Figure 17C:
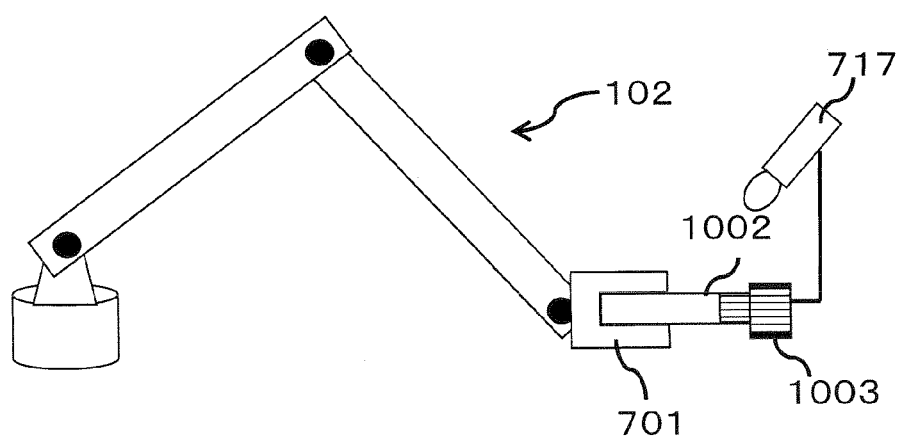
FIG. 17C is an explanatory view of the motion of replaying the task of inserting a flexible board, of the robot arm in the robot according to the first embodiment of the present disclosure (in the case of using sound volume information)
Figure 17D:
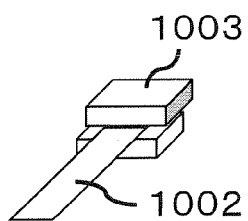
FIG. 17D is an explanatory view of the motion of replaying the task of inserting a flexible board, of the robot arm in the robot according to the first embodiment of the present disclosure (in the case of using sound volume information)

Next, FIG. 17C illustrates the time point where the distal end of the flexible board 1002 is in contact with the inlet port of the connector 1003. In this time point, the information variation point detecting section 109 detects, as an information variation point, this time point where a displacement in sound volume information is larger than the first threshold (10 dB) (see the time point A in FIG. 18). From this time point, the controller 114 applies the feedback rule on the basis of motion information from the motion generating section 112.

Figure 17E:
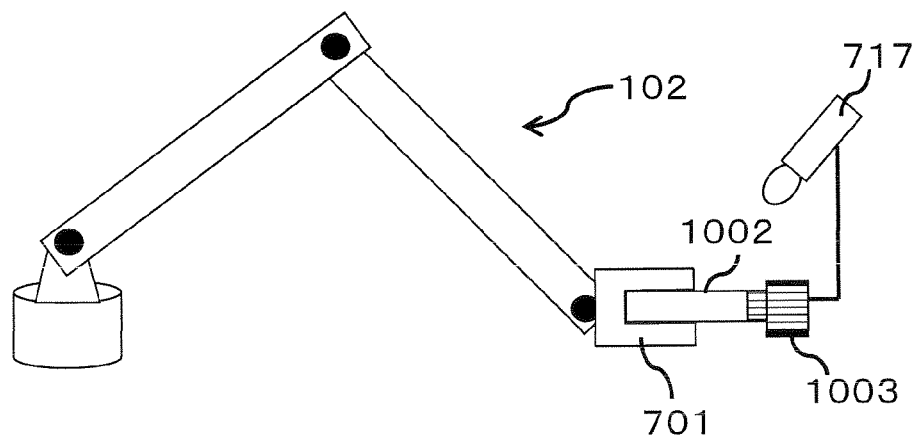
FIG. 17E is an explanatory view of the motion of replaying the task of inserting a flexible board, of the robot arm in the robot according to the first embodiment of the present disclosure (in the case of using sound volume information)
Figure 17F:
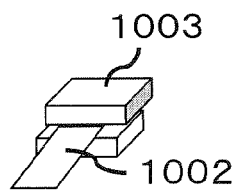
FIG. 17F is an explanatory view of the motion of replaying the task of inserting a flexible board, of the robot arm in the robot according to the first embodiment of the present disclosure (in the case of using sound volume information)

FIG. 17E illustrates the time point where the flexible board 1002 is pressed to be inserted into the connector 1003. At this time point, the controller 114 applies the feedback rule on the basis of motion information from the motion generating section 112. The controller 114 adjusts the position of the robot arm 102 on the basis of motion information from the motion generating section 112 so that the sound volume information follows the approximate curve having inclination of 3 dB (see FIG. 18).

Figure 17G:
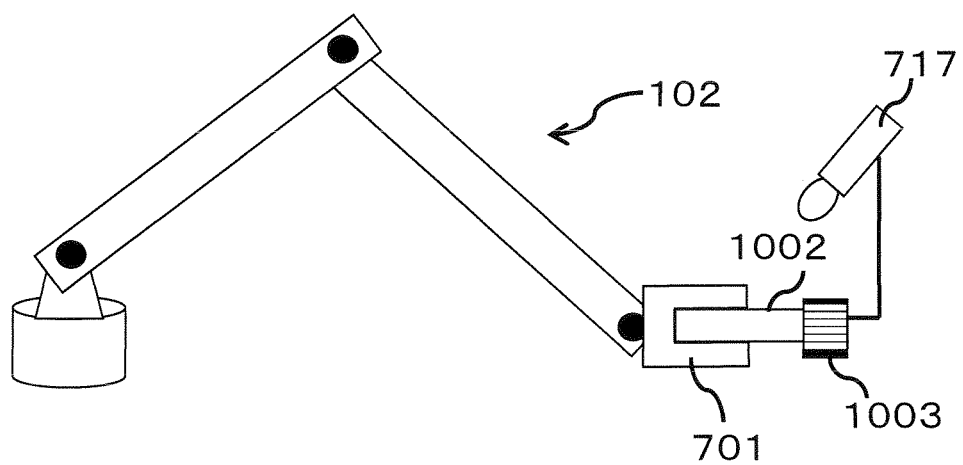
FIG. 17G is an explanatory view of the motion of replaying the task of inserting a flexible board, of the robot arm in the robot according to the first embodiment of the present disclosure (in the case of using sound volume information)
Figure 17H:
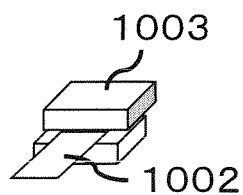
FIG. 17H is an explanatory view of the motion of replaying the task of inserting a flexible board, of the robot arm in the robot according to the first embodiment of the present disclosure (in the case of using sound volume information)

Next, FIG. 17G illustrates the time point where the distal end of the flexible board 1002 is in contact with the inner bottom of the connector 1003 and the inserting task is completed. At this time point, if the motion generating section 112 determines that the sound volume information is larger than a threshold (replaying motion ending condition threshold) (50 dB in this case), the motion generating section 112 is set to stop the robot arm 102. Accordingly, the robot arm 102 stops (see the time point B in FIG. 18).

Figure 17I:
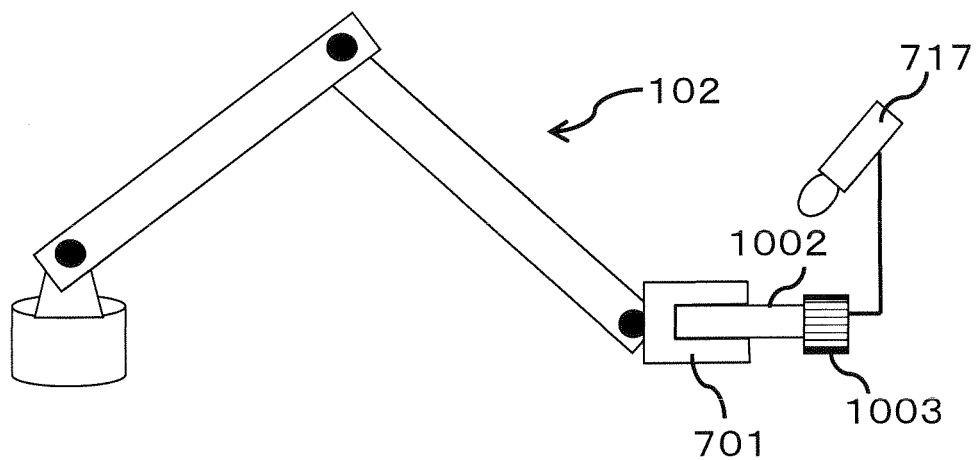
FIG. 17I is an explanatory view of the motion of replaying the task of inserting a flexible board, of the robot arm in the robot according to the first embodiment of the present disclosure (in the case of using sound volume information)
Figure 17J:
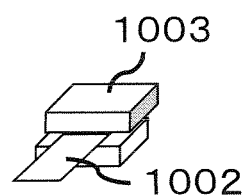
FIG. 17J is an explanatory view of the motion of replaying the task of inserting a flexible board, of the robot arm in the robot according to the first embodiment of the present disclosure (in the case of using sound volume information)
Figure 19A:
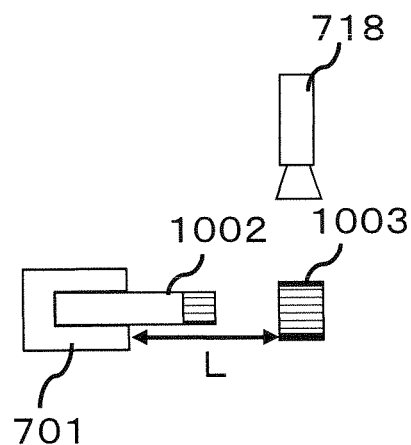
FIG. 19A is an explanatory view of target object positional information on the robot arm in the robot according to the first embodiment of the present disclosure.
Figure 19B:
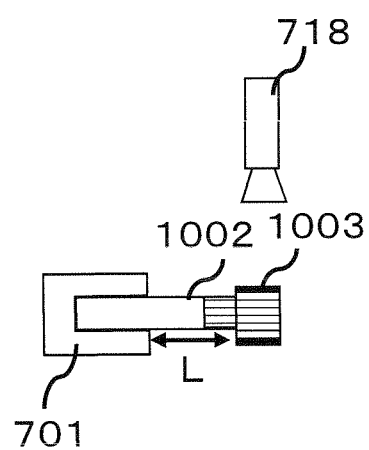
FIG. 19B is an explanatory view of target object positional information on the robot arm in the robot according to the first embodiment of the present disclosure.
Figure 19C:
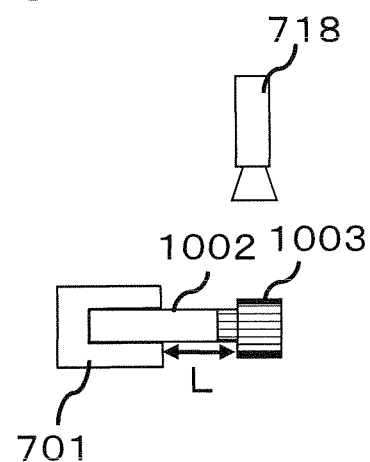
FIG. 19C is an explanatory view of target object positional information on the robot arm in the robot according to the first embodiment of the present disclosure.
Figure 19D:
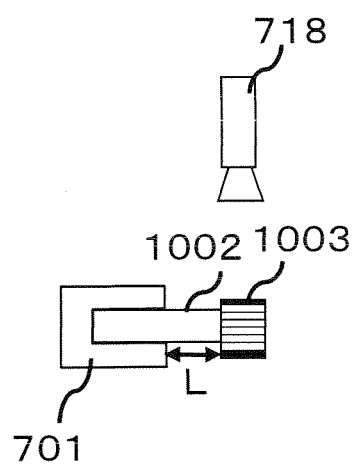
FIG. 19D is an explanatory view of target object positional information on the robot arm in the robot according to the first embodiment of the present disclosure.

Next, FIG. 17I illustrates the time point where the replaying motion is ended (see FIG. 18).

As described above, the feedback rule generating section 111 generates a feedback rule on the basis of taught data, and the controller 114 replays in accordance with the feedback rule thus generated and motion information generated by the motion generating section 112. It is thus possible to replay a motion similar to the teaching motion even in a case where the environment is varied.

(iii) Example of Using Target Object Positional Information

<Description of Teach Mode>

The example of using target object positional information is described below. Target object positional information is acquired by the environment information acquiring section 107, and is obtained on the basis of an image captured by the imaging device 718. More specifically, target object positional information is a distance from the distal end of the hand 701 of the robot arm 102 to the connector 1003 (target object). A distance L between respective feature points (the distal end of the hand 701 of the robot arm 102 and the distal end of the connector 1003) is calculated from the captured image. The target object positional information is described with reference to FIGS. 19A to 19D. The distance L in each of FIGS. 19A to 19D corresponds to the target object positional information.

FIGS. 20A to 20J show the process performed by the person's hand 1001 manipulating and teaching the robot arm 102. The process performed by the person's hand 1001 teaching the robot arm 102 is illustrated in the order of FIGS. 20A, 20C, 20E, 20G, and 20I. States of the flexible board 1002 and the connector 1003 at the respective time points are illustrated in the order of FIGS. 20B, 20D, 20F, 20H, and 20J. The mode switching section 113 selects the "teach mode" in this case. The person presses the start button of the IF 115 in the time point shown in FIG. 20A, and the person presses the end button of the IF 115 in the time point shown in FIG. 20I.

Figure 20A:
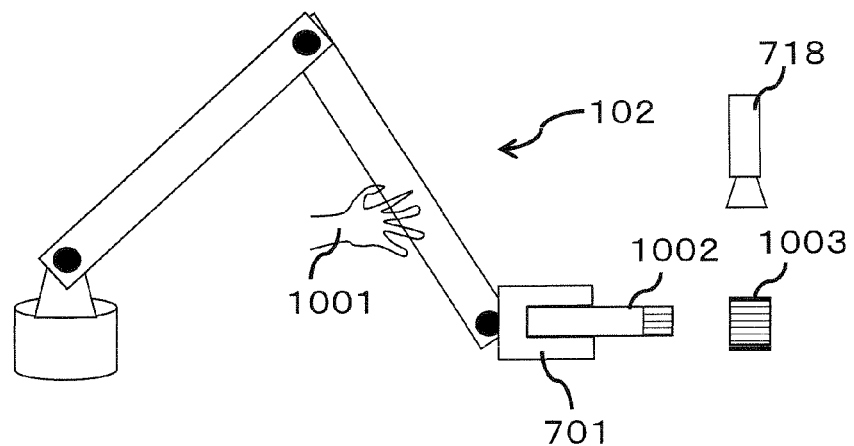
FIG. 20A is an explanatory view of the motion of teaching the task of inserting a flexible board, of the robot arm in the robot according to the first embodiment of the present disclosure (in a case of using target object positional information)
Figure 20B:
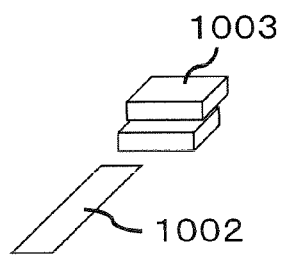
FIG. 20B is an explanatory view of the motion of teaching the task of inserting a flexible board, of the robot arm in the robot according to the first embodiment of the present disclosure (in the case of using target object positional information)

FIG. 20A illustrates the time point where the person's hand 1001 grips the robot arm 102 and the person starts teaching the robot arm 102. In this time point, the flexible board 1002 and the connector 1003 have not yet come into contact with each other. Accordingly, the distance L as target object positional information is large.

Figure 20C:
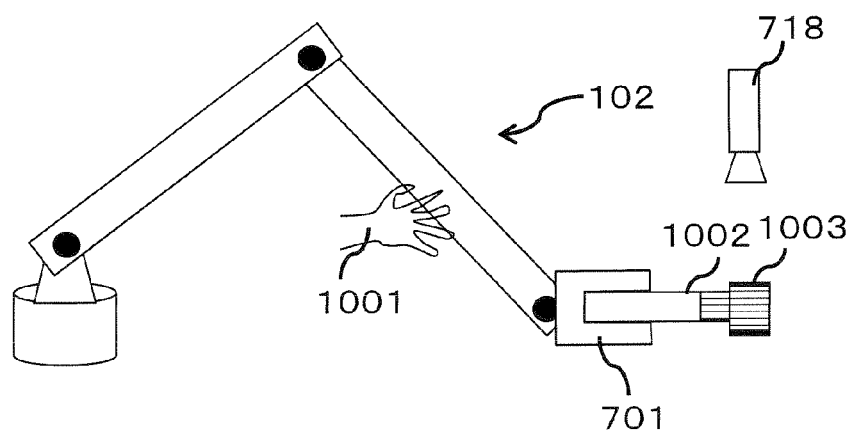
FIG. 20C is an explanatory view of the motion of teaching the task of inserting a flexible board, of the robot arm in the robot according to the first embodiment of the present disclosure (in the case of using target object positional information)
Figure 20D:
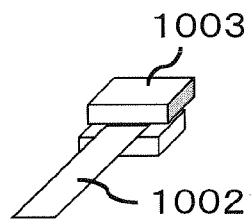
FIG. 20D is an explanatory view of the motion of teaching the task of inserting a flexible board, of the robot arm in the robot according to the first embodiment of the present disclosure (in the case of using target object positional information)

Next, FIG. 20C illustrates the time point where the distal end of the flexible board 1002 is in contact with the inlet port of the connector 1003. At this time point, the flexible board 1002 starts to be inserted into the connector 1003 upon contact. Accordingly, a displacement in target object positional information starts to be varied. After elapse of a reaction time from this time point, a person visually recognizes the contact and the person changes his or her behavior.

Figure 20E:
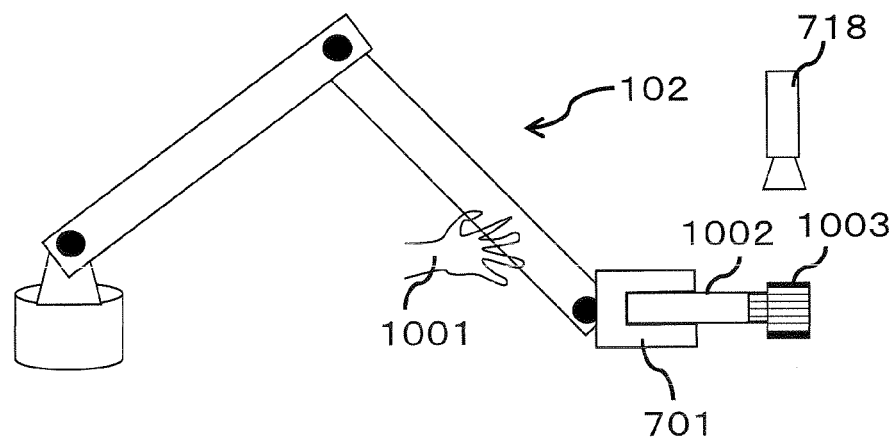
FIG. 20E is an explanatory view of the motion of teaching the task of inserting a flexible board, of the robot arm in the robot according to the first embodiment of the present disclosure (in the case of using target object positional information)
Figure 20F:
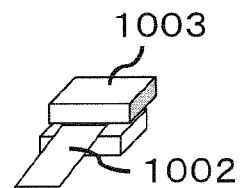
FIG. 20F is an explanatory view of the motion of teaching the task of inserting a flexible board, of the robot arm in the robot according to the first embodiment of the present disclosure (in the case of using target object positional information)

Next, FIG. 20E illustrates the time point where the flexible board 1002 is pressed to be inserted into the connector 1003.

Figure 20G:
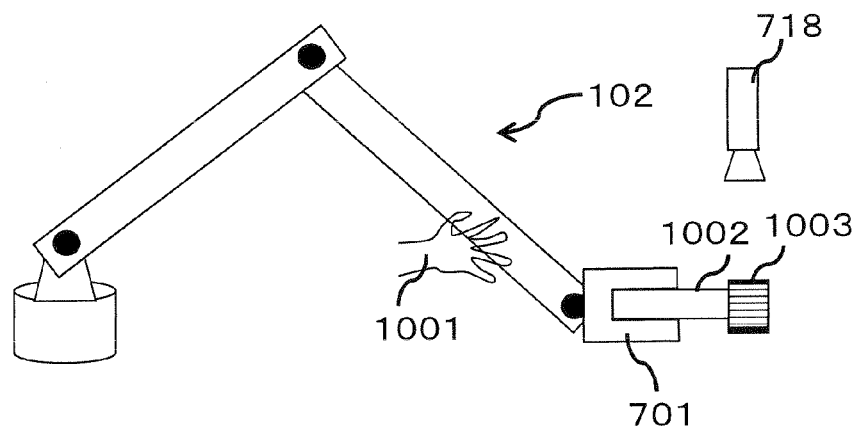
FIG. 20G is an explanatory view of the motion of teaching the task of inserting a flexible board, of the robot arm in the robot according to the first embodiment of the present disclosure (in the case of using target object positional information)
Figure 20H:
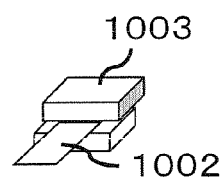
FIG. 20H is an explanatory view of the motion of teaching the task of inserting a flexible board, of the robot arm in the robot according to the first embodiment of the present disclosure (in the case of using target object positional information)

Next, FIG. 20G illustrates the time point where the distal end of the flexible board 1002 is in contact with the inner bottom of the connector 1003 and the inserting task is completed. A displacement in target object positional information stops at this time point because the distal end of the flexible board 1002 is in contact with the inner bottom of the connector 1003. After elapse of a reaction time from this time point, a person visually recognizes he stopped state and recognizes completion of insertion of the flexible board 1002 into the connector 1003.

Figure 20I:
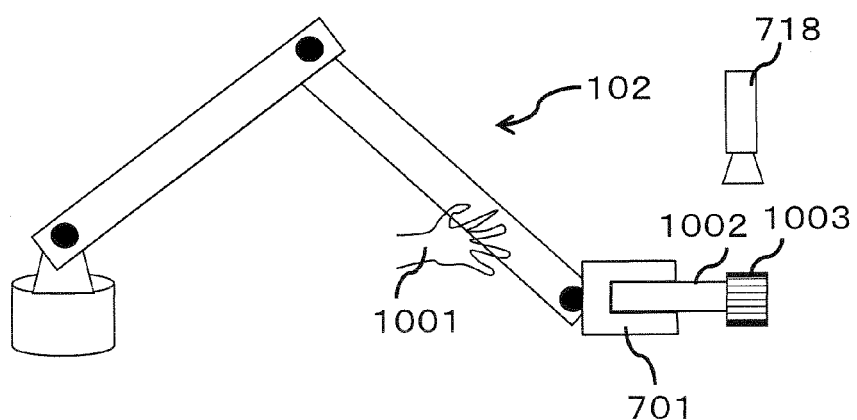
FIG. 20I is an explanatory view of the motion of teaching the task of inserting a flexible board, of the robot arm in the robot according to the first embodiment of the present disclosure (in the case of using target object positional information)
Figure 20J:
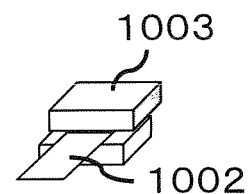
FIG. 20J is an explanatory view of the motion of teaching the task of inserting a flexible board, of the robot arm in the robot according to the first embodiment of the present disclosure (in the case of using target object positional information)

Next, FIG. 20I illustrates the time point where the teaching motion ends.

The task of inserting the flexible board 1002 into the connector 1003 is taught in this manner.

Described next with reference to FIG. 21 is the process of detecting an information variation point and a behavior variation point from taught data and generating a feedback rule.

FIG. 21 indicates target object positional information during the teaching motion illustrated in FIGS. 20A to 20J. The transverse axis in FIG. 21 denotes teaching motion time from start of the teaching motion (0 ms) to end of the teaching motion. The ordinate axis therein denotes target object positional information (mm). Illustrated under the graph in FIG. 21 are the states of insertion (FIGS. 20A, 20C, 20E, and 20G, and 20I) of the flexible board 1002 into the connector 1003.

The information variation point detecting section 109 detects a time point where a displacement in target object positional information acquired by the environment information acquiring section 107 is larger than the first threshold. The first threshold in this case is set to −0.5 mm, for example. The information variation point detecting section 109 detects target object positional information at the time point A in FIG. 21 as an information variation point. The behavior variation point detecting section 110 then detects a time point where a displacement in target object positional information is larger than the second threshold at and after the time point (the time point B in FIG. 21) after elapse of a predetermined reaction time from the information variation point (the time point A in FIG. 21). The second threshold in this case is set to −1.0 mm, for example. The information variation point detecting section 109 detects target object positional information at the time point C in FIG. 21 as a behavior variation point. Lastly, the feedback rule generating section 111 indicates, with an approximate curve, target object positional information at and after the behavior variation point (the time point C in FIG. 21). In this case, the feedback rule generating section 111 generates an approximate curve having inclination of −0.8 mm, for example. An approximate curve is generated as follows. The feedback rule generating section 111 generates an approximate curve by approximating sound volume information from the behavior variation point to the next information variation point to a linear function in accordance with the least squares method. FIG. 21 indicates an approximate curve D thus obtained by the feedback rule generating section 111.

As described above, the information variation point detecting section 109 and the behavior variation point detecting section 110 detect an information variation point and a behavior variation point from taught data, respectively, and the feedback rule generating section 111 generates a feedback rule.

<Description of Replay Mode>

The process of replaying by the robot arm 102 on the basis of taught data is described next with reference to FIGS. 22A to 22J and 23. The process of replaying by the robot arm 102 is illustrated in the order of FIGS. 22A, 22C, 22E, 22G, and 22I. States of the flexible board 1002 and the connector 1003 at the respective time points are illustrated in the order of FIGS. 22B, 22D, 22F, 22H, and 22J. The mode switching section 113 selects the "replay mode" in this case. The person presses the start button of the IF 115 in the time point shown in FIG. 22A, and the person presses the end button of the IF 115 in the time point shown in FIG. 22I.

Figure 22A:
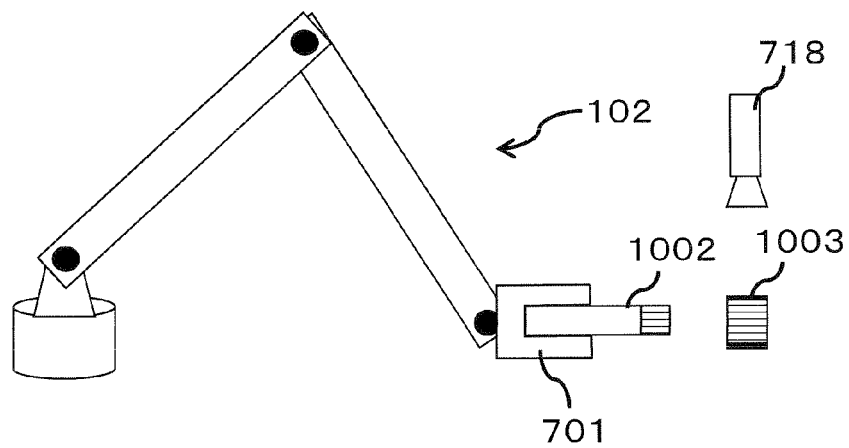
FIG. 22A is an explanatory view of the motion of replaying the task of inserting a flexible board, of the robot arm in the robot according to the first embodiment of the present disclosure (in the case of using target object positional information)
Figure 22B:
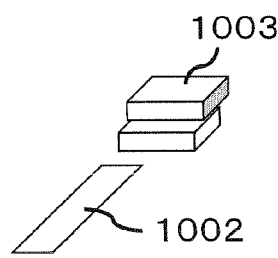
FIG. 22B is an explanatory view of the motion of replaying the task of inserting a flexible board, of the robot arm in the robot according to the first embodiment of the present disclosure (in the case of using target object positional information)
Figure 22C:
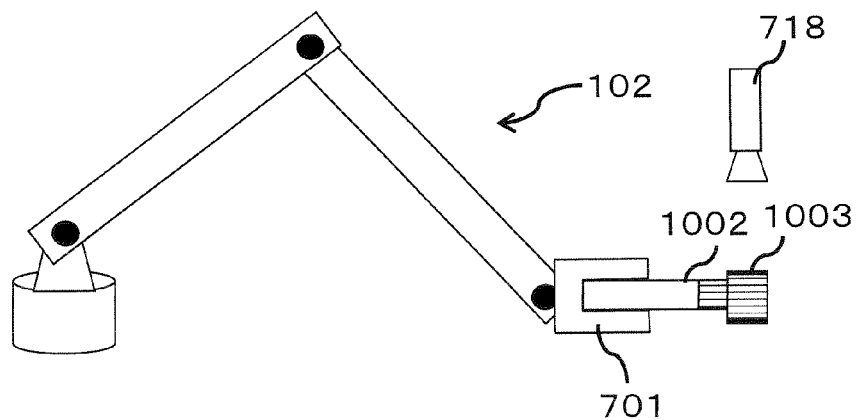
FIG. 22C is an explanatory view of the motion of replaying the task of inserting a flexible board, of the robot arm in the robot according to the first embodiment of the present disclosure (in the case of using target object positional information)
Figure 22D:
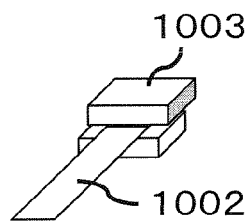
FIG. 22D is an explanatory view of the motion of replaying the task of inserting a flexible board, of the robot arm in the robot according to the first embodiment of the present disclosure (in the case of using target object positional information)
Figure 22E:
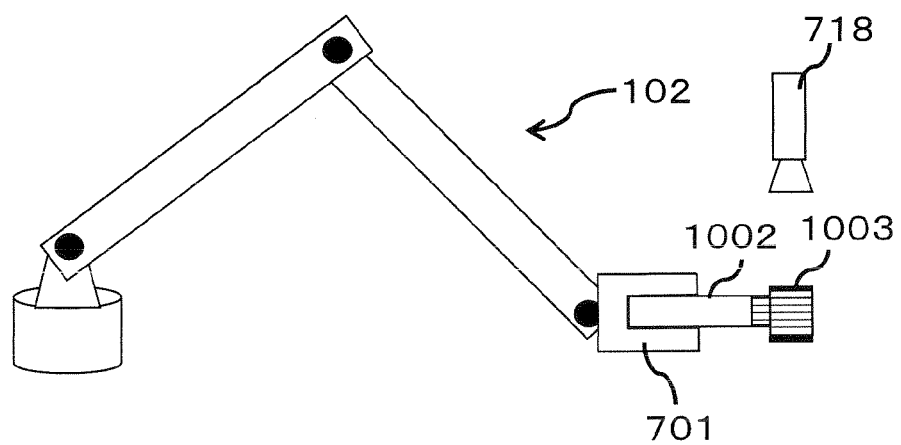
FIG. 22E is an explanatory view of the motion of replaying the task of inserting a flexible board, of the robot arm in the robot according to the first embodiment of the present disclosure (in the case of using target object positional information)
Figure 22F:
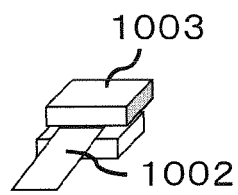
FIG. 22F is an explanatory view of the motion of replaying the task of inserting a flexible board, of the robot arm in the robot according to the first embodiment of the present disclosure (in the case of using target object positional information)
Figure 22G:
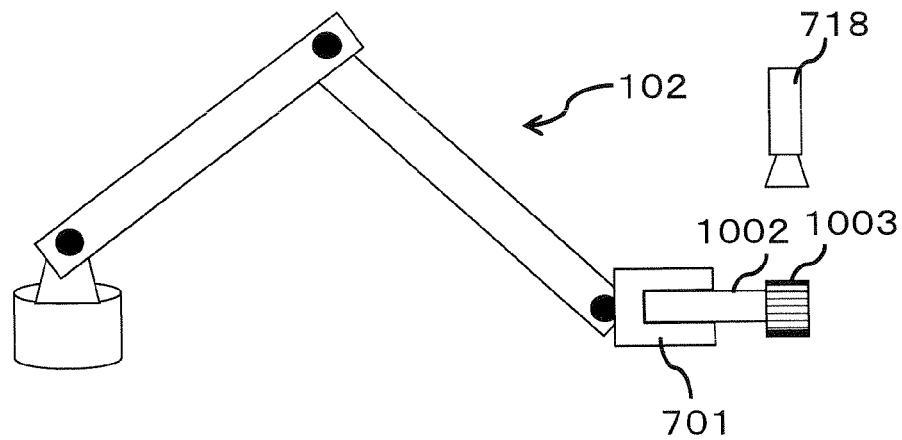
FIG. 22G is an explanatory view of the motion of replaying the task of inserting a flexible board, of the robot arm in the robot according to the first embodiment of the present disclosure (in the case of using target object positional information)
Figure 22H:
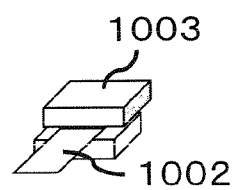
FIG. 22H is an explanatory view of the motion of replaying the task of inserting a flexible board, of the robot arm in the robot according to the first embodiment of the present disclosure (in the case of using target object positional information)
Figure 22I:
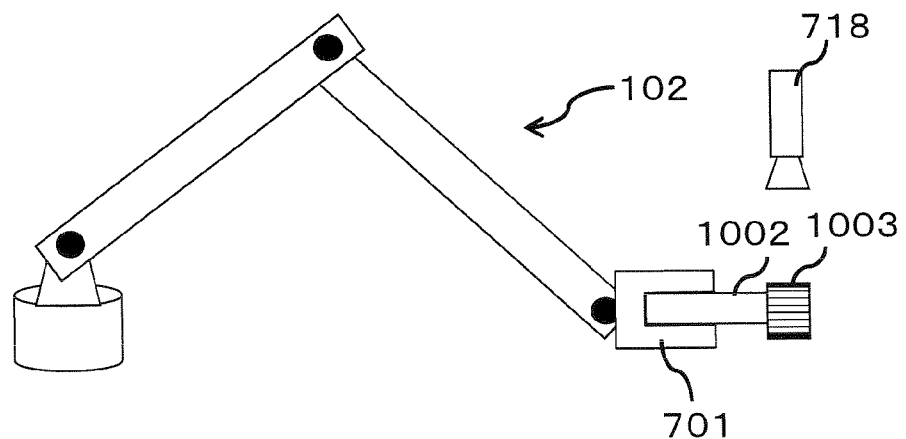
FIG. 22I is an explanatory view of the motion of replaying the task of inserting a flexible board, of the robot arm in the robot according to the first embodiment of the present disclosure (in the case of using target object positional information)
Figure 22J:
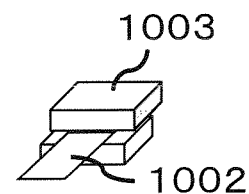
FIG. 22J is an explanatory view of the motion of replaying the task of inserting a flexible board, of the robot arm in the robot according to the first embodiment of the present disclosure (in the case of using target object positional information)
Figure 23:
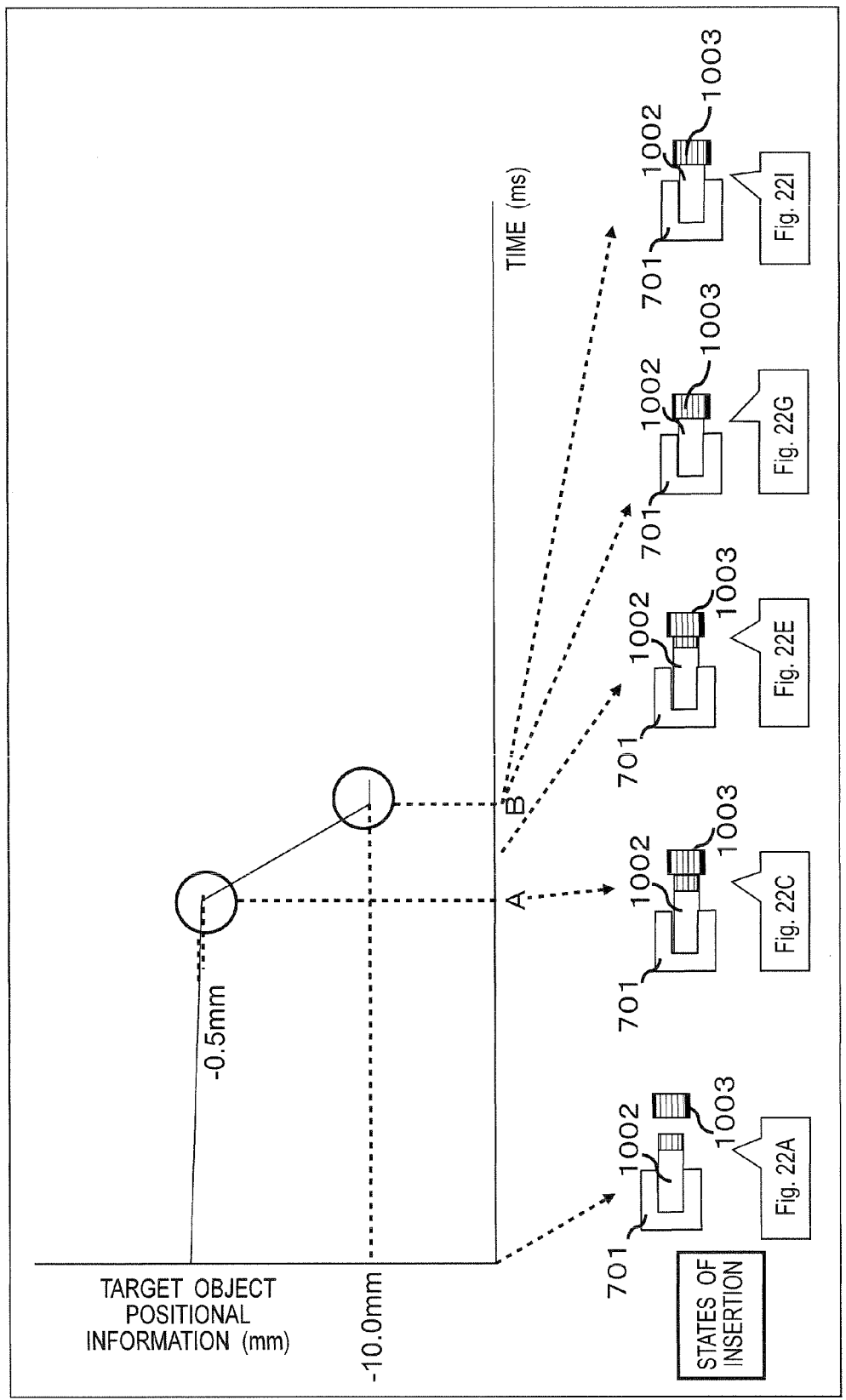
FIG. 23 is a view of target object positional information during the motion of replaying the task of inserting a flexible board, of the robot arm in the robot according to the first embodiment of the present disclosure.

FIG. 23 indicates target object positional information during the replaying motion illustrated from FIG. 22A to 22J. A solid line the graph of FIG. 23 indicates the target object positional information. The transverse axis in FIG. 23 denotes a replaying motion time (ms), namely, a time from start of the replaying motion (0 ms) to end of the replaying motion. The ordinate axis in FIG. 23 denotes target object positional information (mm). Illustrated under the graph in FIG. 23 are the states of insertion of the flexible board 1002 into the connector 1003, in other words, the states of the flexible board 1002 with respect to the connector 1003 at the time during the replaying motion denoted by the transverse axis of the graph.

FIG. 22A illustrates the time point where the robot arm 102 starts are playing motion. In this time point, positional information in taught data is replayed, and the flexible board 1002 and the connector 1003 have not yet come into contact with each other (see FIG. 23).

Next, FIG. 22C illustrates the time point where the distal end of the flexible board 1002 is in contact with the port of the connector 1003. In the time point, the information variation point detecting section 109 detects, as an information variation point, this time point where a displacement in target object positional information is larger than the first threshold (−0.5 mm) (see the time point A in FIG. 23). From this time point, the controller 114 applies the feedback rule on the basis of motion information from the motion generating section 112.

FIG. 22E illustrates the time point where the flexible board 1002 is pressed to be inserted into the connector 1003. At this time point, the controller 114 applies the feedback rule on the basis of motion information from the motion generating section 112. The controller 114 adjusts the position of the robot arm 102 on the basis of motion information from the motion generating section 112 so that the target object positional information follows the approximate curve having inclination of −0.8 mm (see FIG. 23).

Next, FIG. 22G illustrates the time point where the distal end of the flexible board 1002 is in contact with the inner bottom of the connector 1003 and the inserting task is completed. At this time point, if the motion generating section 112 determines that the target object positional information is larger than a threshold (replaying motion ending condition threshold) (−10.0 mm in this case), the motion generating section 112 is set to stop the robot arm 102. Accordingly, the robot arm 102 stops (see the time point B in FIG. 23). Next, FIG. 22I illustrates the time point where the replaying motion is ended (see FIG. 23).

As described above, the feedback rule generating section 111 generates a feedback rule on the basis of taught data, and the controller 114 replays in accordance with the feedback rule thus generated and motion information generated by the motion generating section 112. It is thus possible to replay a motion similar to the teaching motion even in a case where the environment is varied.

Exemplified above is the case where a person directly manipulates to teach the robot (direct teaching). The present disclosure is also applicable to a case where a person manipulates a master robot so as to teach a slave robot (master-slave control).

Figure 24:
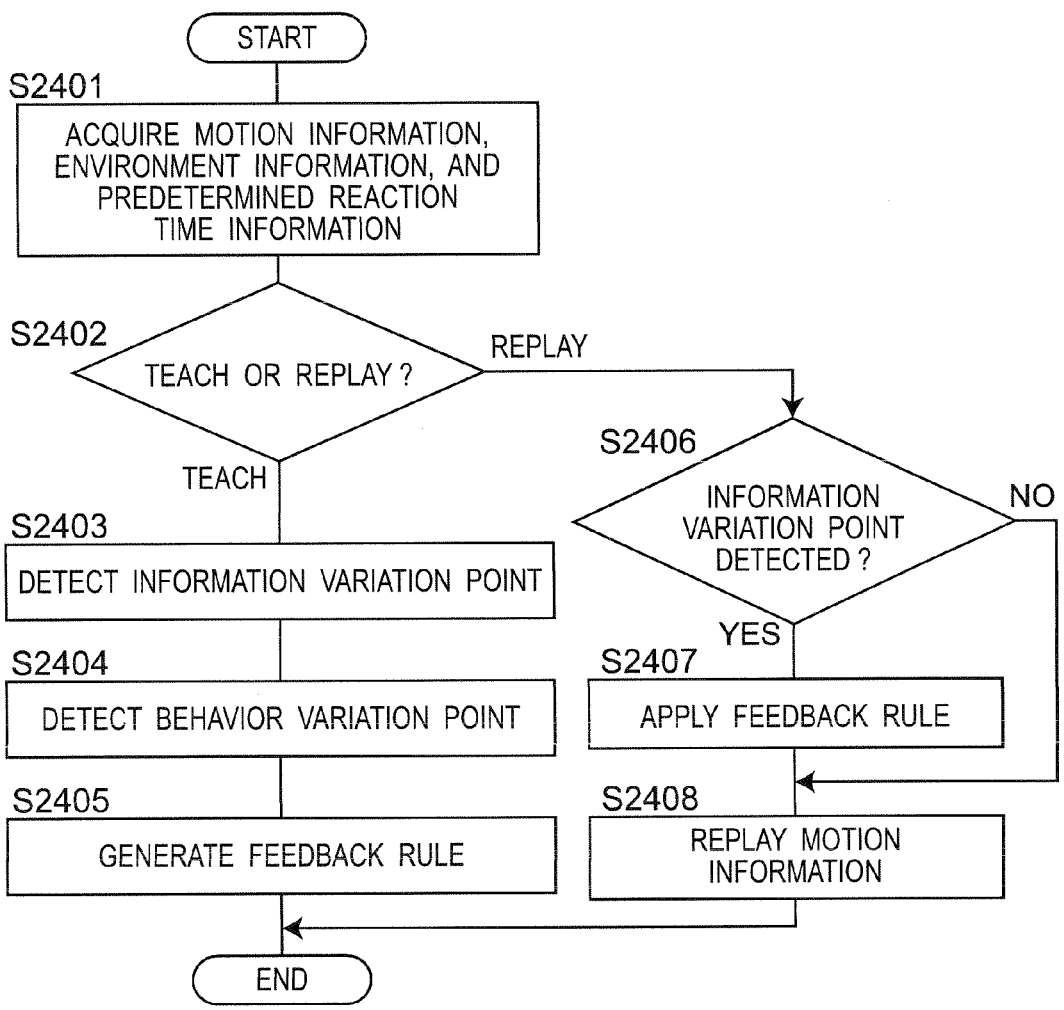
FIG. 24 is a flowchart of the robot according to the first embodiment of the present disclosure.

The manipulation process of the control apparatus 103 for the robot arm 102 according to the first embodiment is described below with reference to the flowchart in FIG. 24.

In step S2401, the motion information acquiring section 106 acquires motion information, the environment information acquiring section 107 acquires environment information, the predetermined reaction time information acquiring section 108 acquires predetermined reaction time information, and then the process proceeds to step S2402.

Subsequently in step S2402, the mode switching section 113 outputs mode information (either the "teach mode" or the "replay mode") to the controller 114. If the "teach mode" is outputted, the process proceeds to step S2403. If the "replay mode" is outputted, the process proceeds to step S2406.

In step S2403, the information variation point detecting section 109 detects an information variation point from taught data thus acquired (information acquired in step S2401), and outputs the information variation point thus detected, to the behavior variation point detecting section 110. The process then proceeds to step S2404.

Subsequently in step S2404, the behavior variation point detecting section 110 searches for a behavior variation point at and after a time point after elapse of a predetermined reaction time from the time point at the information variation point received from the information variation point detecting section 109. The behavior variation point detecting section 110 outputs the behavior variation point thus detected in the search, to the feedback rule generating section 111. The process then proceeds to step S2405.

Subsequently in step S2405, the feedback rule generating section 111 indicates, with an approximate curve, information at and after the behavior variation point received from the behavior variation point detecting section 110, and generates a feedback rule to output the feedback rule to the motion generating section 112, and then this flow ends.

If the information variation point detecting section 109 determines in step S2406 that an information variation point is detected, the process proceeds to step S2407. If the information variation point detecting section 109 determines that no information variation point is detected, the process proceeds to step S2408.

In step S2407, the motion generating section 112 generates motion information by applying the feedback rule to the motion information received from the motion information acquiring section 106, and then the process proceeds to step S2408.

In step S2408, the controller 114 controls the robot arm 102 on the basis of the motion information generated by the motion generating section 112, and then this flow ends.

Described in the first embodiment are the cases of selecting the "teach mode" and the "replay mode". The present disclosure is also applicable to a case of analyzing taught data only in the "teach mode". In the above description, a behavior variation point is detected, and then, a feedback rule is generated from the time point. Alternatively, the present disclosure is applicable to a configuration of generating a feedback rule from a time point after elapse of a predetermined reaction time from an information variation point, without detecting any behavior variation point. The case of using a feedback rule upon replaying is described in the first embodiment. Alternatively, it is possible to simply replay taught data from a behavior variation point at a time point where an information variation point is detected, without generating any feedback rule.

According to the first embodiment, variation in behavior of a person corresponding to variation in environment while the person is directly manipulating the robot arm 102 is generated as a feedback rule taking reaction time into consideration. It is thus possible to transfer skills of the person to the robot arm 102, and the robot arm 102 is capable of performing a task similarly to the person even in a case where the environment is varied. Furthermore, it is possible to replay while deleting a motion of a person during reaction time, so that an unstable motion generated during the reaction time can be deleted.

(Second Embodiment)

Figure 25A:
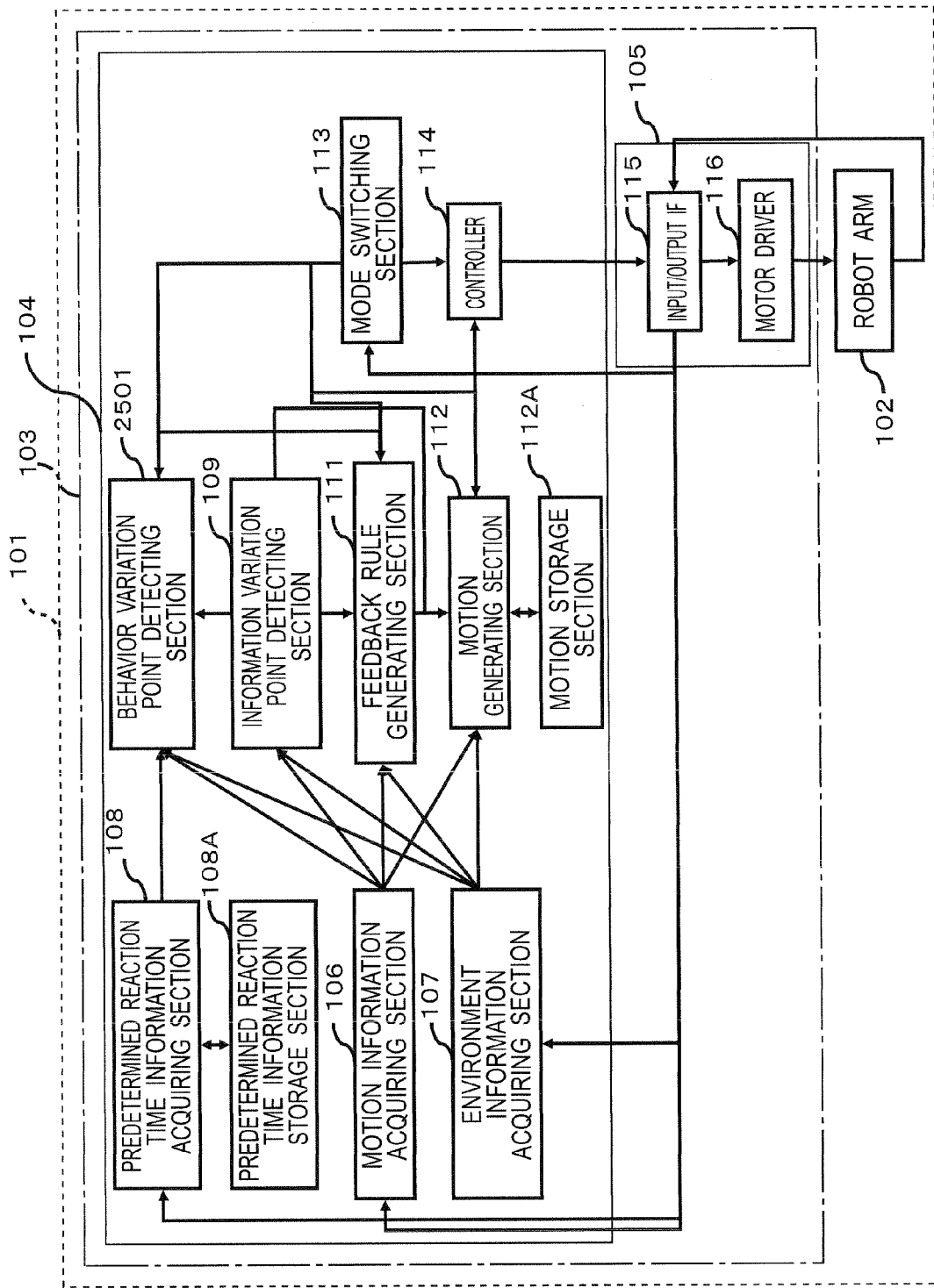
FIG. 25A is a block diagram of a robot arm in a robot according to a second embodiment of the present disclosure.

FIG. 25A is a block diagram of a robot 101 according to the second embodiment of the present disclosure. In the robot 101 according to the second embodiment, the robot arm 102, the peripheral device 105, as well as the motion information acquiring section 106, the environment information acquiring section 107, the predetermined reaction time information acquiring section 108, the information variation point detecting section 109, the feedback rule generating section 111, the motion generating section 112, the mode switching section 113, and the controller 114 in the control apparatus 103 are configured similarly to those of the first embodiment. These common elements are denoted by the same reference signs and are not described repeatedly in the second embodiment. Differences from the first embodiment are detailed below in the second embodiment.

The control apparatus 103 includes a behavior variation point detecting section 2501 in place of the behavior variation point detecting section 110. The behavior variation point detecting section 2501 receives positional information, orientation information, velocity information, and time information from the motion information acquiring section 106, receives environment information and time information from the environment information acquiring section 107, receives predetermined reaction time information from the predetermined reaction time information acquiring section 108, and receives an information variation point and time information corresponding to the information variation point from the information variation point detecting section 109.

The behavior variation point detecting section 2501 detects a behavior variation point on the basis of the information thus received. The behavior variation point detecting section 2501 outputs the behavior variation point thus detected and time information corresponding to the behavior variation point, to the feedback rule generating section 111.

Described below is a method of detecting a behavior variation point. The behavior variation point detecting section 2501 searches the motion information received from the motion information acquiring section 106 and the environment information received from the environment information acquiring section 107 for a portion that is larger than a second threshold in the time from a time point after elapse of a predetermined reaction time from the information variation point, and detects an initial portion that is larger than the second threshold as a behavior variation point. The second threshold can be inputted using the input/output IF 115, and its value differs for each piece of information. For example, the second threshold is set to 0.5 N for force information, 1 dB for sound volume information, 1 mm for target object positional information, 1 mm for positional information, 0.02 rad for orientation information, or 0.01 mm/ms for velocity information. If the behavior variation point detecting section 2501 determines that there is detected no portion larger than the second threshold in a time from a time point after elapse of a predetermined reaction time from the information variation point, the behavior variation point detecting section 2501 searches in a time until the time point after elapse of the predetermined reaction time from the information variation point. The search ends at the information variation point. If the behavior variation point detecting section 2501 still determines that there is detected no portion larger than the second threshold, the behavior variation point detecting section 2501 does not detect any behavior variation point. The behavior variation point detecting section 2501 detects a plurality of behavior variation points if the behavior variation point detecting section 2501 determines that portions larger than the second threshold are detected as plural behavior variation points.

The second embodiment is different from the first embodiment in that the behavior variation point detecting section 2501 searches also in the time until the time point after elapse of a predetermined reaction time from the information variation point. Accordingly, the behavior variation point detecting section 2501 is capable of extracting a behavior variation point even in a case where reaction occurs before the predetermined reaction time. Reaction occurs before the predetermined reaction time in various cases where a task is well experienced, where a delicate task is performed carefully, and the like.

A task of inserting the flexible board 1002 into the connector 1003 is described as an application example of the second embodiment.

<Teach Mode>

Figure 26:
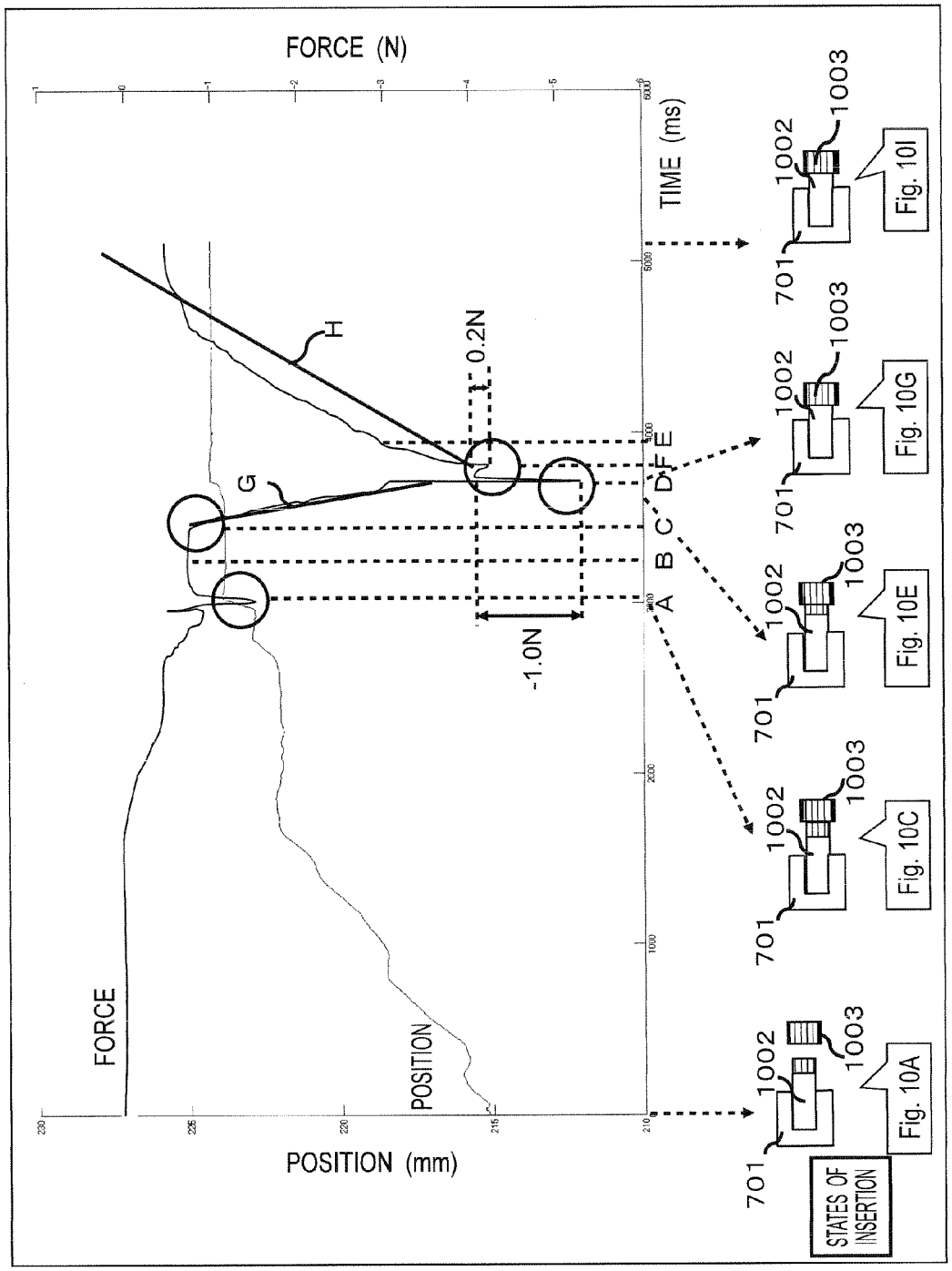
FIG. 26 is a view of force information and positional information during the motion of teaching the task of inserting a flexible board, of the robot arm in the robot according to the second embodiment of the present disclosure.

Similarly to FIG. 11A, FIG. 26 indicates a value of the force sensor 716 and positional information on the robot arm 102 during the teaching motion.

Described is the process of detecting an information variation point and a behavior variation point from data on the teaching motion using the information variation point detecting section 109 and the behavior variation point detecting section 2501 to generate a feedback rule. In the second embodiment, in addition to the information variation point (a time point A in FIG. 26) and the behavior variation point (a time point C in FIG. 26) that are detected in the first embodiment and the feedback rule (an approximate curve G in FIG. 26) generated in the first embodiment, the information variation point detecting section 109 and the behavior variation point detecting section 2501 detect an information variation point (a time point D in FIG. 26) and a behavior variation point (a time point F in FIG. 26), and the feedback rule generating section 111 generates a feedback rule (an approximate curve H in FIG. 26). Described below is the process in which the information variation point detecting section 109 and the behavior variation point detecting section 2501 additionally detect an information variation point and a behavior variation point, respectively, and the feedback rule generating section 111 additionally generates a feedback rule.

The information variation point detecting section 109 detects a time point where a displacement in force information is larger than the first threshold. In the second embodiment, in addition to the value of the first threshold set in the first embodiment, the first threshold also includes the value of −1.0 N, for example, and the information variation point detecting section 109 detects, as an information variation point, force information at the time point D in FIG. 26.

The behavior variation point detecting section 2501 then detects a time point where a displacement in force information is larger than the second threshold from a time point (the time point E in FIG. 26) after elapse of a predetermined reaction time from the time point at the information variation point (the time point D in FIG. 26). In the second embodiment, in addition to the value of the second threshold set in the first embodiment, the second threshold also includes the value of 0.2 N, for example.

The behavior variation point detecting section 2501, however, does not detect any time point where a displacement in force information is larger than the second threshold at and after the time point E in FIG. 26. The behavior variation point detecting section 2501 accordingly searches in a time until the time point E in FIG. 26. The behavior variation point detecting section 2501 then detects, as a behavior variation point, force information at the time point F in FIG. 26. As a displacement that is larger than 0.2 N, a displacement around the time point E is small, and there is thus found no behavior variation point before the time point F.

Lastly, the feedback rule generating section 111 indicates, with an approximate curve, force information at and after the behavior variation point (the time point F in FIG. 26). In this case, the feedback rule generating section 111 generates an approximate curve having inclination of 0.1 N, for example. An approximate curve is generated as follows. The feedback rule generating section 111 generates an approximate curve by approximating force information from the behavior variation point to end time of the teaching motion to a linear function in accordance with the least squares method. FIG. 26 indicates the approximate curve H thus obtained by the feedback rule generating section 111.

The feedback rule generating section 111 generates an approximate curve as follows. If there is an information variation point in the time from the behavior variation point, the feedback rule generating section 111 approximates, to an approximate curve, information from the behavior variation point to the next information variation point in accordance with the least squares method. If there is no information variation point in the time from the behavior variation point, the feedback rule generating section 111 approximates, to an approximate curve, information in the time from the behavior variation point in accordance with the least squares method.

As described above, the information variation point detecting section 109 and the behavior variation point detecting section 110 detect an information variation point and a behavior variation point from taught data, respectively, and the feedback rule generating section 111 generates a feedback rule.

<Description of Replay Mode>

The process of replaying with the robot arm 102 on the basis of the data on the teaching motion is similar to that illustrated in FIGS. 12A to 12J, and only differences are described below.

Figure 27:
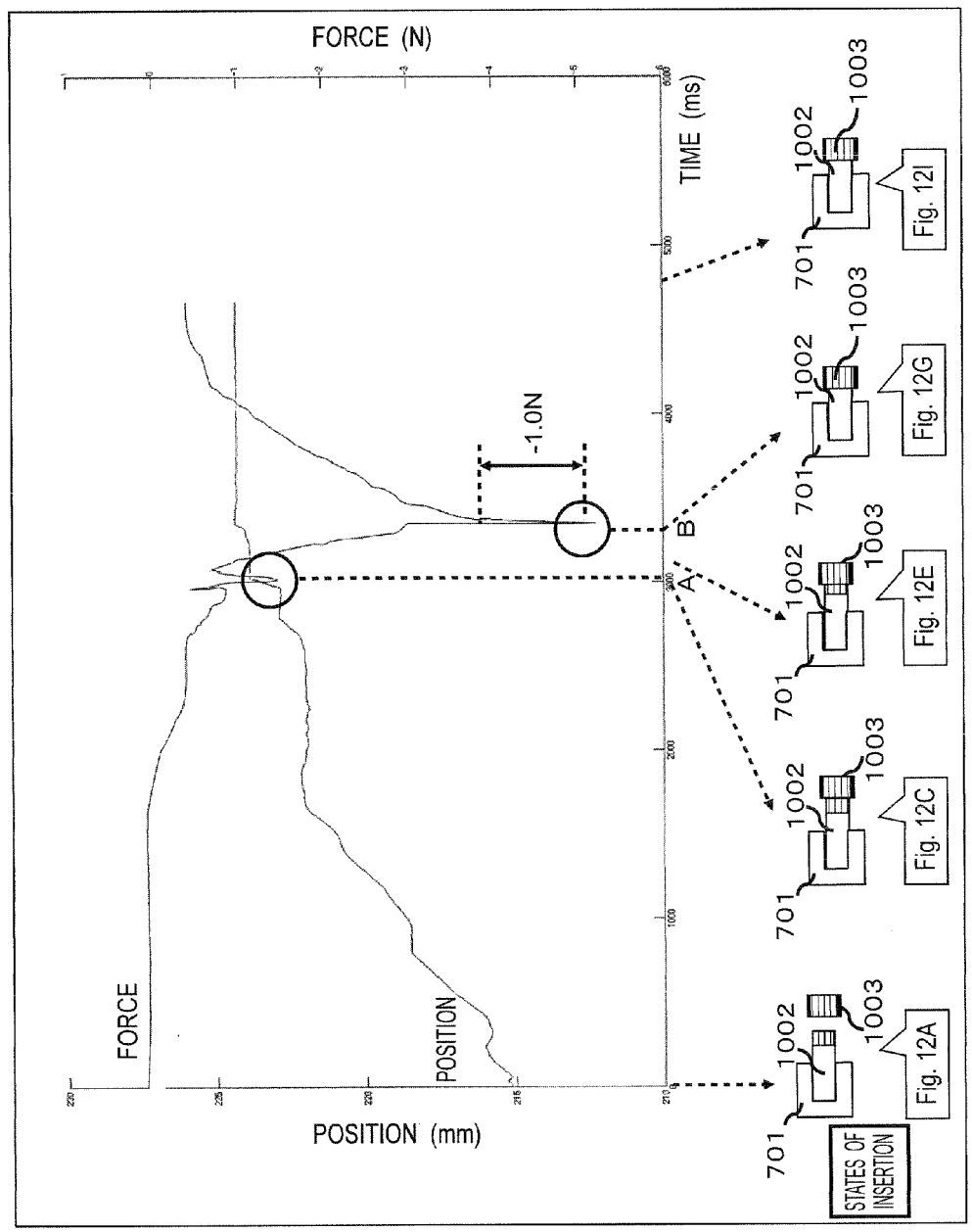
FIG. 27 is a view of force information and positional information during the motion of replaying the task of inserting a flexible board, of the robot arm in the robot according to the second embodiment of the present disclosure.

Similarly to FIG. 13, FIG. 27 indicates a value of the force sensor 716 and positional information on the robot arm 102 during the replaying motion illustrated in FIGS. 12A to 12J.

FIG. 12A illustrates the motion performed in the both of first and second embodiments.

Next, FIG. 12C illustrates the time point where the distal end of the flexible board 1002 is in contact with the inlet port of the connector 1003. In the time point, the information variation point detecting section 109 detects, as the information variation point detected in the first embodiment, this time point where a displacement in force information is larger than the first threshold (−0.5 N) (see the time point A in FIG. 27).

From this time point, the controller 114 applies the feedback rule generated in the first embodiment, on the basis of motion information from the motion generating section 112.

Next, FIG. 12E illustrates the time point where the flexible board 1002 is pressed to be inserted into the connector 1003. At this time point, the controller 114 applies the feedback rule generated in the first embodiment, on the basis of motion information from the motion generating section 112. The controller 114 adjusts the position of the robot arm 102 on the basis of motion information from the motion generating section 112 so that the force information follows the approximate curve having inclination of −0.1 N (see FIG. 27).

Next, FIG. 12G illustrates the time point where the distal end of the flexible board 1002 is in contact with the inner bottom of the connector 1003 and the inserting task is completed. At this time point, the information variation point detecting section 109 detects, in the force information, a portion larger than the first threshold (−1.0 N) as an information variation point (see the time point B in FIG. 27). From this time point, the controller 114 applies the feedback rule generated in the second embodiment, on the basis of motion information from the motion generating section 112. More specifically, the controller 114 adjusts the position of the robot arm 102 on the basis of motion information from the motion generating section 112 so that the force information follows the approximate curve having inclination of −0.1 N.

FIG. 12I illustrates the time point where the replaying motion is ended (see FIG. 27). As described above, the first threshold is used for detecting an information variation point in each of the teach mode and the replay mode, whereas the second threshold is used for generating a feedback rule in the teach mode.

As described above, the feedback rule generating section 111 generates a feedback rule on the basis of taught data, and the controller 114 performs replay in accordance with the feedback rule thus generated and motion information generated by the motion generating section 112. It is thus possible to replay a motion similar to the teaching motion even in a case where the environment is varied.

(Modification Example: Applying Feedback Rule into Multiple Directions)

Figure 28:
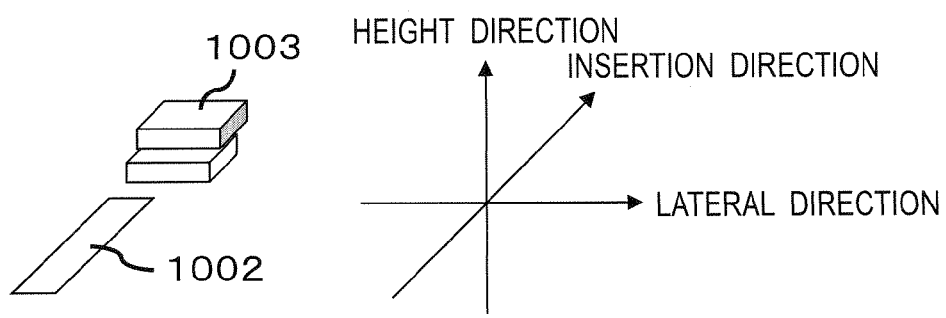
FIG. 28 is an explanatory view of respective directions in the task of inserting a flexible board, of the robot arm in the robot according to the second embodiment of the present disclosure.

Described above in the second embodiment is application of a feedback rule to a task mainly in a singular direction (insertion direction). In some cases, the controller 114 applies a feedback rule into multiple directions on the basis of motion information from the motion generating section 112. As exemplified in FIG. 28, the task of inserting the flexible board 1002 into the connector 1003 is performed in multiple directions including the insertion direction, the lateral direction, the height direction, and the like. In such a case, according to the present modification example, the motion generating section 112 sets priority ranking as to be described below, and the controller 114 applies a feedback rule into the multiple directions on the basis of motion information from the motion generating section 112.

Figure 25B:
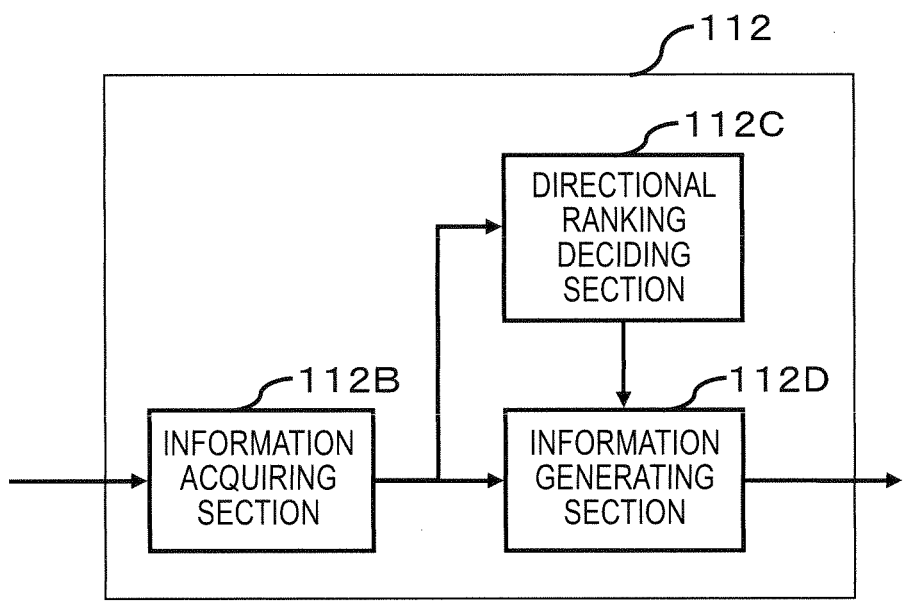
FIG. 25B is a block diagram of a motion generating section in the robot according to the second embodiment of the present disclosure.

FIG. 25B is a block diagram detailing the inside of the motion generating section 112 in the case where the controller 114 applies a feedback rule into the multiple directions on the basis of motion information from the motion generating section 112. The motion generating section 112 in this example includes an information acquiring section 112B, a directional ranking deciding section 112C, and an information generating section 112D.

The information acquiring section 112B acquires information transmitted from a different element to the motion generating section 112, and outputs the information thus acquired to each of the directional ranking deciding section 112C and the information generating section 112D.

The directional ranking deciding section 112C decides directional ranking on the basis of environment information received from the information acquiring section 112B, and outputs information thus decided to the information generating section 112D. A method of deciding ranking is exemplified below. The directional ranking deciding section 112C compares displacements in different directions at a time point in environment information received from the information acquiring section 112B. The directional ranking deciding section 112C decides ranking in the order of larger displacements.

The information generating section 112D generates a replaying motion on the basis of information received from the information acquiring section 112B. The information generating section 112D generates the replaying motion so that, when the information generating section 112D applies a feedback rule, the feedback rule is applied by the information generating section 112D in corresponding directions on the basis of ranking information received from the directional ranking deciding section 112C. The controller 114 applies the feedback rule on the basis of motion information generated by the information generating section 112D in the motion generating section 112.

FIGS. 2A to 29C each indicate a value of the force sensor 716 and positional information on the robot arm 102 in the insertion direction (FIG. 29A), the lateral direction (FIG. 29B), and the height direction (FIG. 29C), during the teaching motion illustrated in FIGS. 10A to 10J.

Figure 29A:
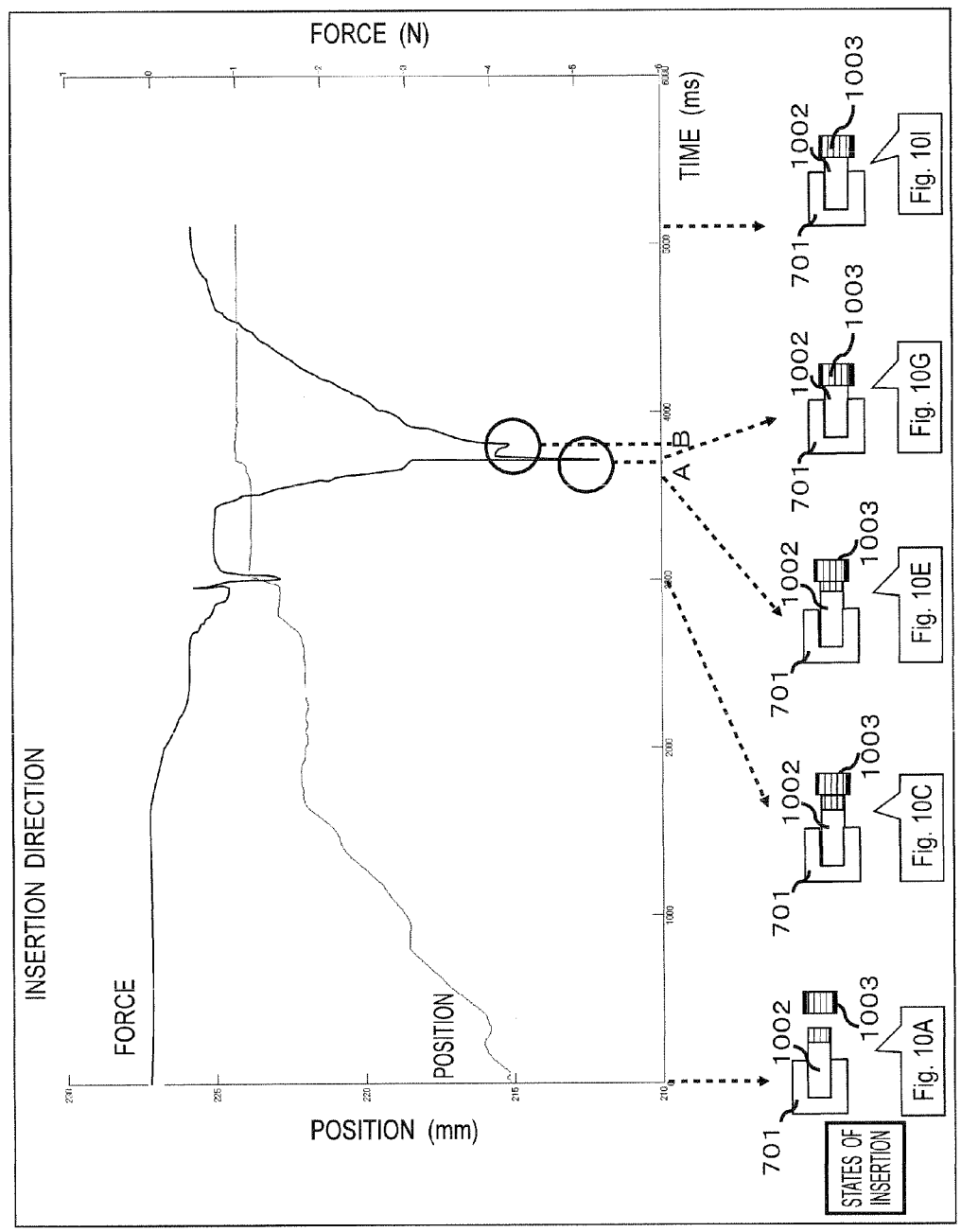
FIG. 29A is a view of force information and positional information in an insertion direction, during the motion of replaying the task of inserting a flexible board, of the robot arm in the robot according to the second embodiment of the present disclosure.
Figure 29C:
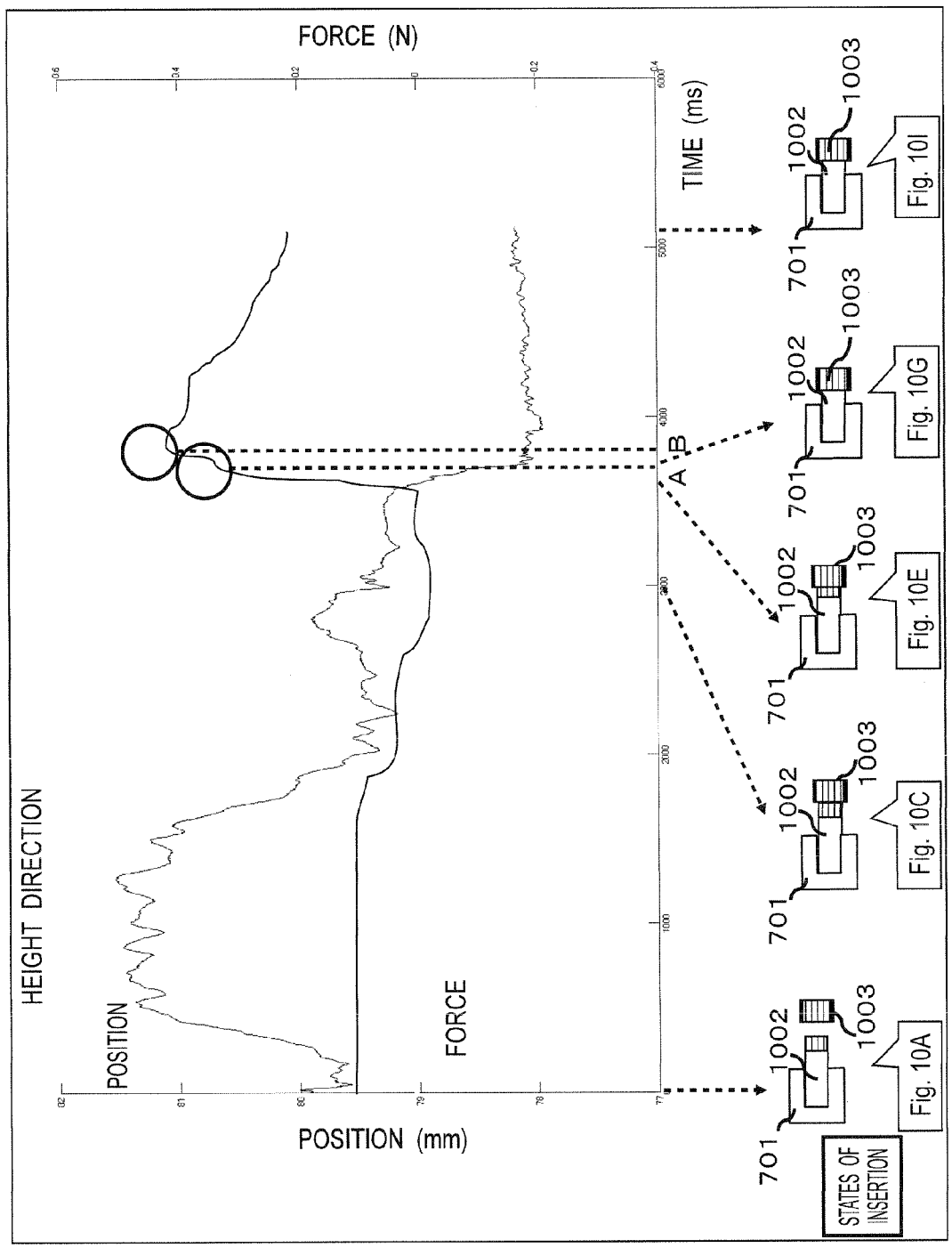
FIG. 29C is a view of force information and positional information in a height direction, during the motion of replaying the task of inserting a flexible board, of the robot arm in the robot according to the second embodiment of the present disclosure.

FIGS. 29A to 29C can be described similarly to FIG. 11A.

Assume that the directional ranking deciding section 112C compares displacements in force information in the respective directions at time points wherein formation variation points and behavior variation points are detected respectively and the directional ranking deciding section 112C decides that the displacements are larger in the order of the insertion direction, the lateral direction, and the height direction.

During replaying, the controller 114 applies the feedback rule according to the priority ranking of the insertion direction, the lateral direction, and the height direction in the order of larger displacements, on the basis of motion information from the motion generating section 112. When a person performs a task, the person changes the method of performing the task while sensing force in a direction of a larger displacement in force with a hand. The information generating section 112D generates a replaying motion so as to apply the feedback rule in the order of larger displacements in force information, and the controller 114 applies the feedback rule on the basis of motion information generated by the information generating section 112D. In this configuration, the controller 114 is capable of applying the feedback rule on the basis of motion information from the motion generating section 112, in a manner similar to that of a task performed while sensing force with the person's hand 1001.

According to an application example, the controller 114 applies the feedback rule into only one direction of the highest priority ranking, on the basis of motion information from the motion generating section 112. In a case where an information variation point is detected in every one of the directions during replaying, the controller 114 applies the feedback rule only into the insertion direction on the basis of motion information from the motion generating section 112. In a case where an information variation point is detected in each of the lateral direction and the height direction, the controller 114 applies the feedback rule only into the lateral direction on the basis of motion information from the motion generating section 112.

Other than the above application example, it is alternatively possible to adopt a different method such as applying the feedback rule into all the directions in which an information variation point is detected.

When the controller 114 applies the feedback rule in multiple directions on the basis of motion information from the motion generating section 112, the robot arm 102 is capable of replaying an insertion method similar to that performed by a person, regardless of variation in environment or change of a target object.

Figure 30:
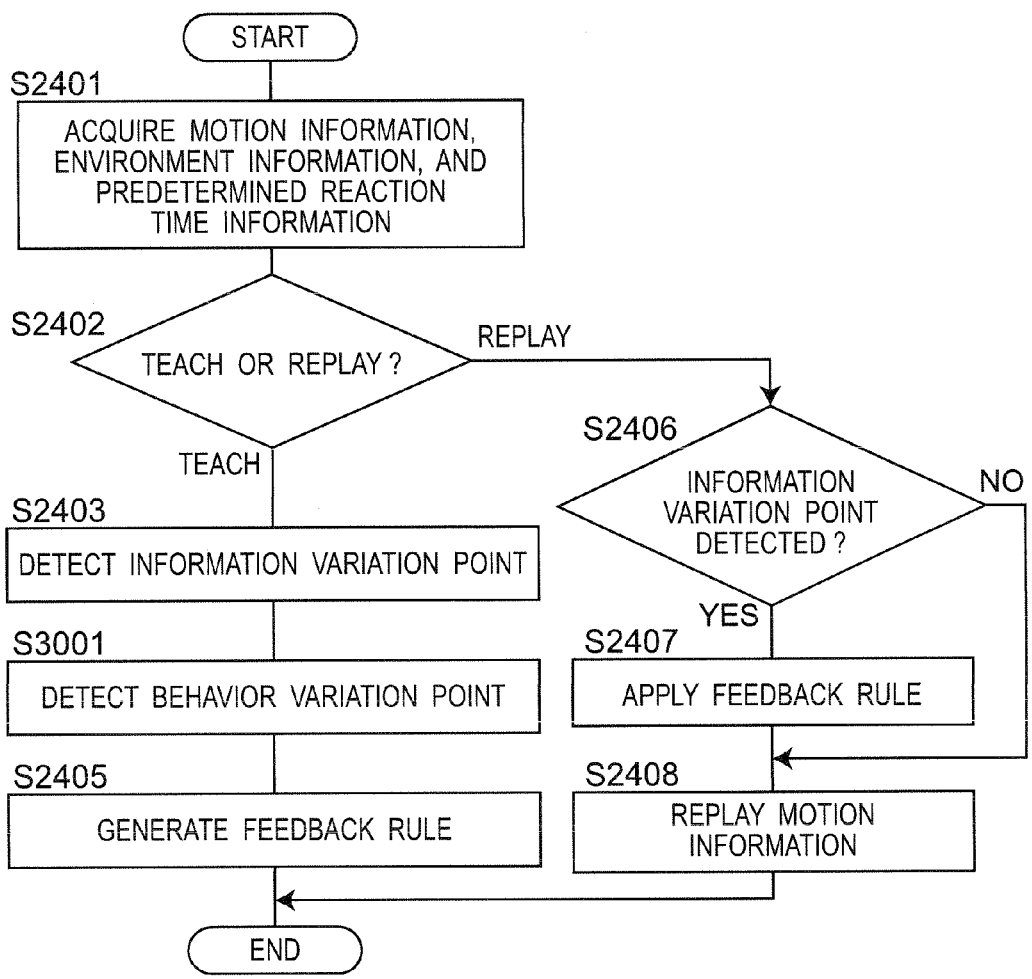
FIG. 30 is a flowchart of the robot according to the second embodiment of the present disclosure.

The operation process of the control apparatus 103 for the robot arm 102 according to the second embodiment is described below with reference to the flowchart in FIG. 30.

In step S2401, the motion information acquiring section 106 acquires motion information, the environment information acquiring section 107 acquires environment information, and the predetermined reaction time information acquiring section 108 acquires predetermined reaction time information.

Then in step S2402, the mode switching section 113 switches the mode. More specifically, the mode switching section 113 outputs mode information (either the "teach mode" or the "replay mode") to the controller 114. If the "teach mode" is outputted, the process proceeds to step S2403. If the "replay mode" is outputted, the process proceeds to step S2406.

(Flow in Teach Mode)

In step S2403, the information variation point detecting section 109 detects an information variation point from taught data thus acquired (information acquired in step S2401), and outputs the information variation point thus detected, to the behavior variation point detecting section 2501.

Subsequently in step S3001, the behavior variation point detecting section 2501 searches for a behavior variation point at and after a time point after elapse of a predetermined reaction time from the information variation point received from the information variation point detecting section 109. If the behavior variation point detecting section 2501 determines that no behavior variation point is detected in the search by the behavior variation point detecting section 2501, the behavior variation point detecting section 2501 searches for a behavior variation point detected until the time point after elapse of the predetermined reaction time from the time point at the information variation point. The behavior variation point detecting section 2501 outputs the behavior variation point thus detected by the behavior variation point detecting section 2501 to the feedback rule generating section 111. The process then proceeds to step S2405.

Subsequently in step S2405, the feedback rule generating section 111 indicates, with an approximate curve, information at and after the behavior variation point received from the behavior variation point detecting section 2501, and generates a feedback rule to output the feedback rule to the motion generating section 112, and then this flow ends.

(Flow in Replay Mode)

In step S2406, if the information variation point detecting section 109 determines that an information variation point is detected, the process in the replay mode proceeds to step S2407. If the information variation point detecting section 109 determines that no information variation point is detected, the process in the replay mode proceeds to step S2408.

In step S2407, the motion generating section 112 generates motion information by applying the feedback rule to the motion information received from the motion information acquiring section 106.

In step S2408, the controller 114 controls the robot arm 102 on the basis of the motion information generated by the motion generating section 112, and then this flow ends.

According to the second embodiment, even in a case where a reaction time of a person is short (where a task is well experienced, where a task having great concentration is performed, or the like), variation in behavior of the person can be indicated accurately and a behavior variation point can be detected, so that skills of the person can be transferred to the robot arm. This enables a task similar to that performed by the person regardless of variation in environment.

(Third Embodiment)

Figure 31:
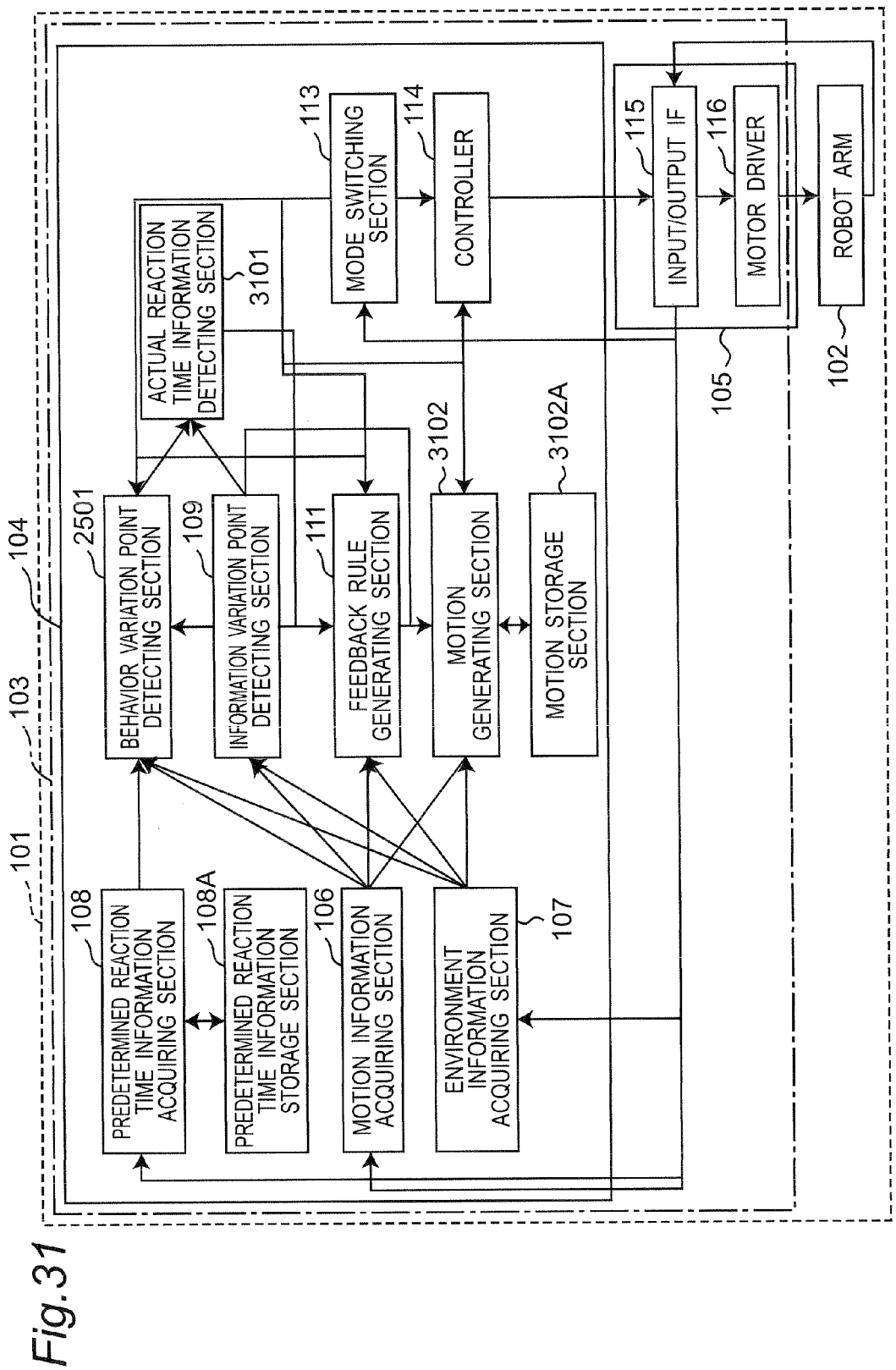
FIG. 31 is a block diagram of a robot arm in a robot according to a third embodiment of the present disclosure.

FIG. 31 is a block diagram of a robot 101 according to the third embodiment of the present disclosure. In the robot 101 according to the third embodiment of the present disclosure, the robot arm 102, the peripheral device 105, as well as the motion information acquiring section 106, the environment information acquiring section 107, the predetermined reaction time information acquiring section 108, the information variation point detecting section 109, the behavior variation point detecting section 2501, the feedback rule generating section 111, the mode switching section 113, and the controller 114 in the control apparatus 103 are configured similarly to those of the second embodiment. These common elements are denoted by the same reference signs and are not described repeatedly, and only differences are to be detailed below.

The control apparatus 103 additionally includes an actual reaction time information detecting section 3101 that receives an information variation point and time information corresponding to the information variation point from the information variation point detecting section 109. The actual reaction time information detecting section 3101 also receives a behavior variation point and time information corresponding to the behavior variation point from the behavior variation point detecting section 2501. The actual reaction time information detecting section 3101 subtracts the time point of the information variation point from the time point of the behavior variation point thus acquired, to obtain actual reaction time information. The actual reaction time information detecting section 3101 outputs, to a motion generating section 3102, the actual reaction time information obtained by the actual reaction time information detecting section 3101 and time information.

Figure 32:
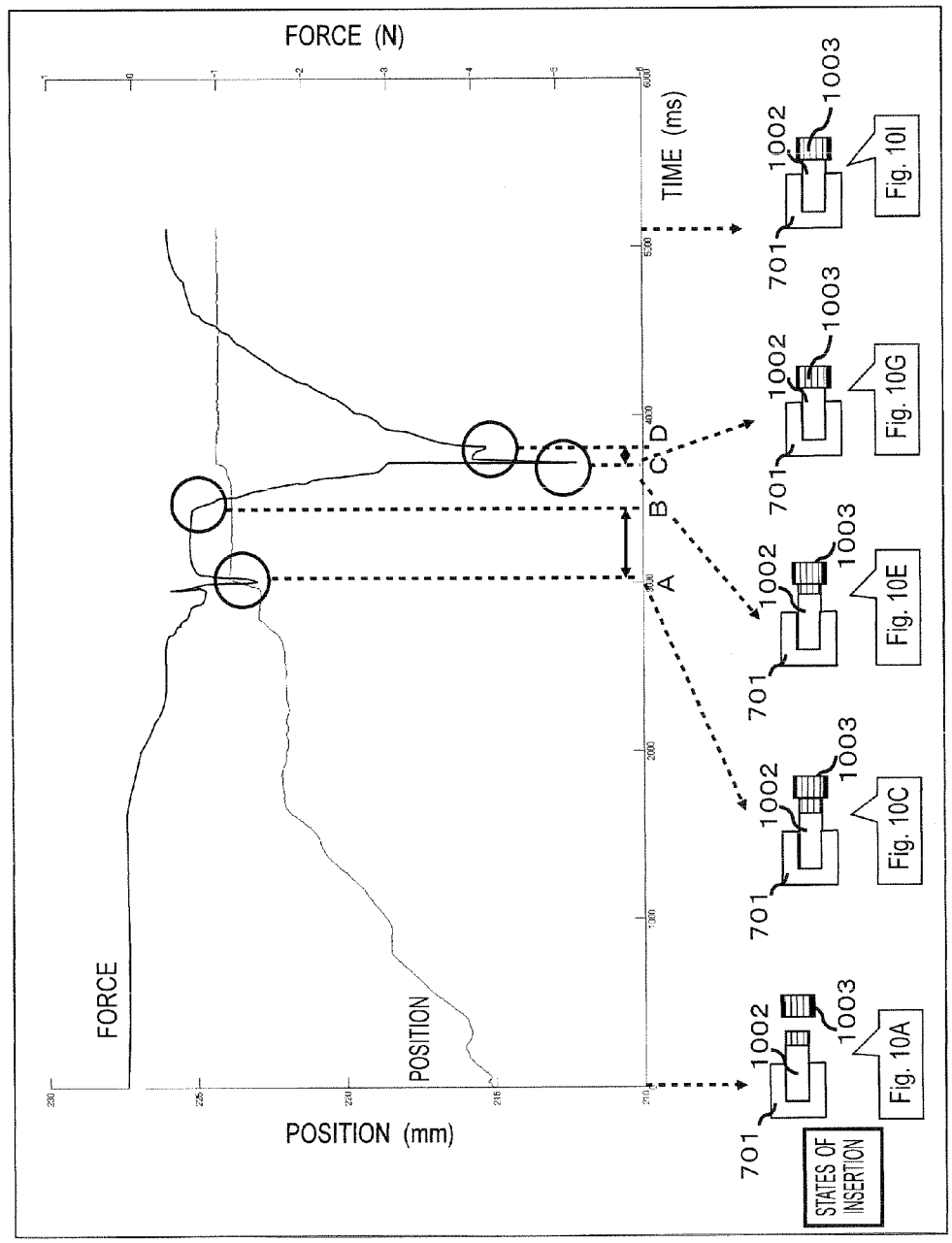
FIG. 32 is an explanatory view of actual reaction time information in the task of inserting a flexible board, of the robot arm in the robot according to the third embodiment of the present disclosure.

Similarly to FIG. 11A, FIG. 32 indicates taught data obtained during the teaching motion illustrated in FIGS. 10A to 10J. FIG. 32 indicates information variation points A and C and behavior variation points B and D.

FIG. 32 indicates actual reaction time zones B-A and D-C.

The motion generating section 3102 replaces the motion generating section 112 in the control apparatus 103, and generates motion information on the basis of (i) positional information, orientation information, velocity information, and time information received from the motion information acquiring section 106, (ii) environment information and time information received from the environment information acquiring section 107, (iii) an information variation point and time information corresponding to the information variation point, which are received from the information variation point detecting section 109, and (iv) actual reaction time information and time information received from the actual reaction time information detecting section 3101, so as to output the motion information thus generated and time information to the controller 114. The motion generating section 3102 stores the motion information thus generated, a feedback rule, and time information in a motion storage section 3102A.

Described below is a method of generating motion information by the motion generating section 3102. The motion generating section 3102 generates as motion information the motion information received from the motion information acquiring section 106. In a case where the motion generating section 3102 receives an information variation point from the information variation point detecting section 109 while the robot arm 102 is in motion, the motion generating section 3102 generates a motion applied to the feedback rule. A motion applied to the feedback rule corresponds to varying motion information so as to be along a received approximate curve. In a case where an information variation point is detected and a feedback rule is applied, the motion generating section 3102 urges a person to select, using the input/output IF 115, whether a motion related to actual reaction time information is replayed or deleted. For example, a display device serving as the example of the input/output IF 115 indicates a command urging to select either replaying or deleting the motion related to actual reaction time information. A person is thus capable of inputting, to the motion generating section 3102, information on selection made using the input/output IF 115 so as to select either replaying or deleting the motion related to actual reaction time information. As selection criteria, a motion related to actual reaction time information is replayed if a motion similar to a teaching motion is performed, and a motion related to actual reaction time information is deleted before being replayed if a motion is replayed efficiently and quickly.

The motion can be replayed similarly to a motion according to taught data.

In the case of deleting a motion related to actual reaction time information, a motion during reaction time of a person can be deleted and an unstable motion can be thus deleted.

Figure 33A:
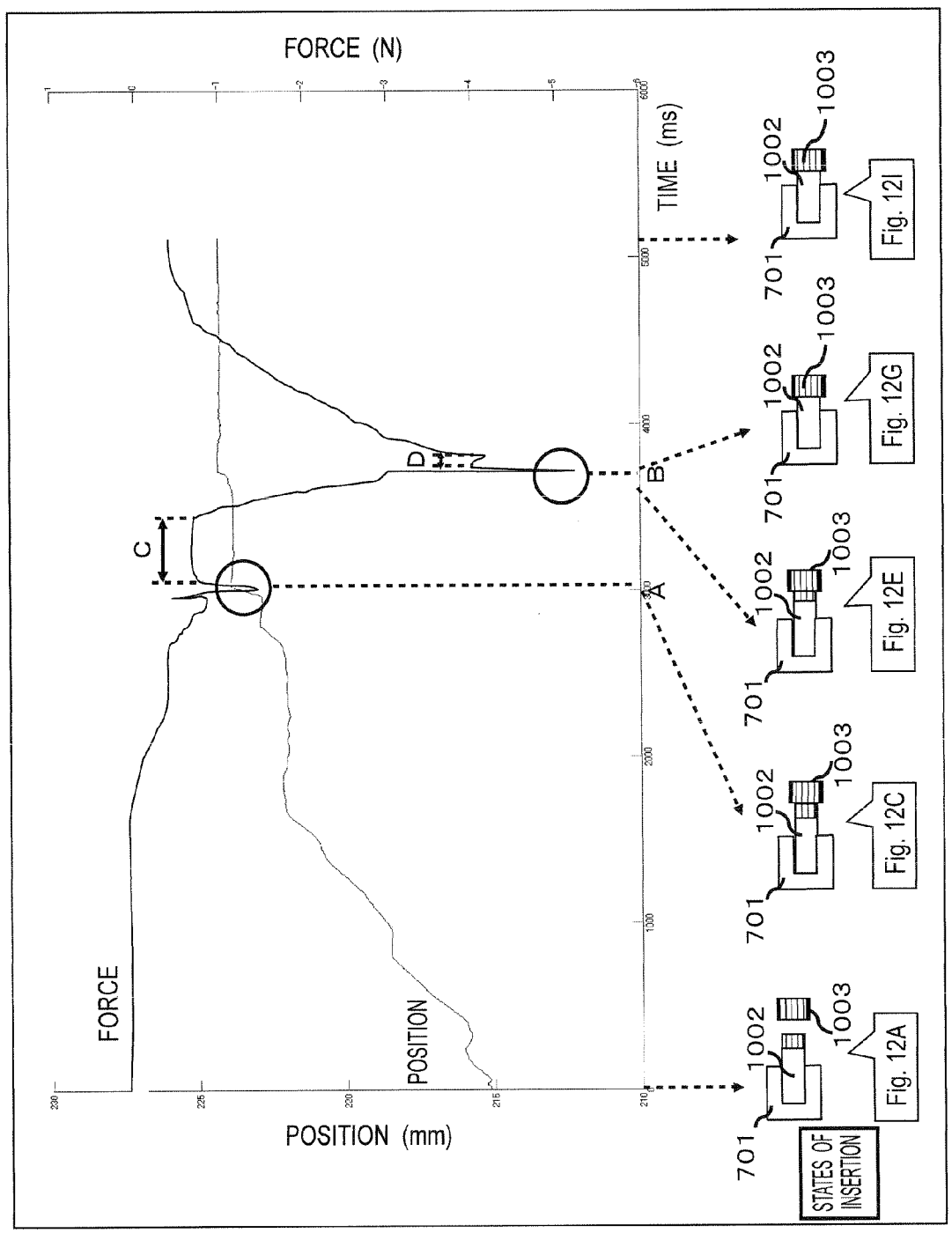
FIG. 33A is a view of force information and positional information, in a case of not deleting a motion in the actual reaction time information, during the motion of replaying the task of inserting a flexible board, of the robot arm in the robot according to the third embodiment of the present disclosure.
Figure 33B:
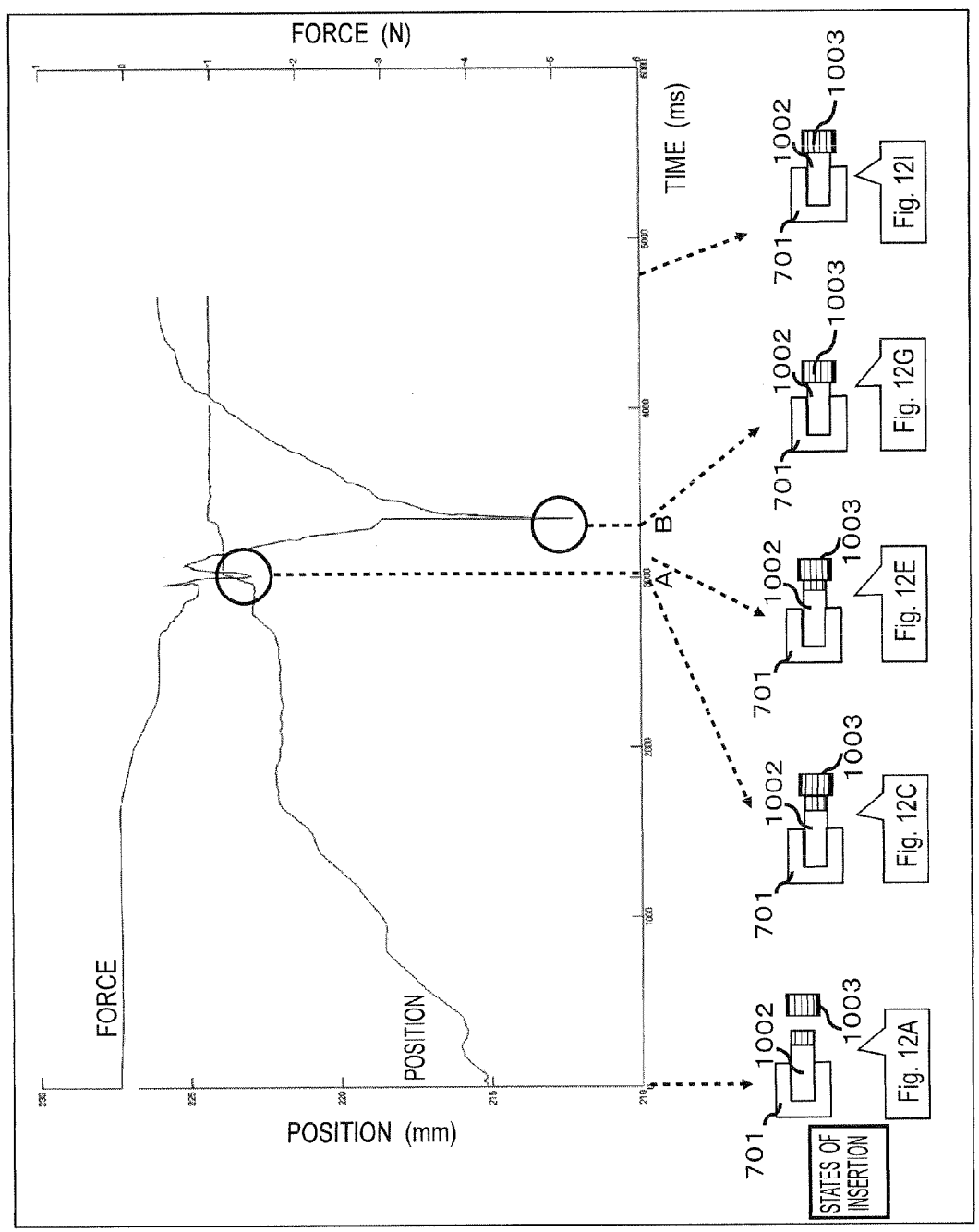
FIG. 33B is a view of force information and positional information, in a case of deleting the motion in the actual reaction time information, during the motion of replaying the task of inserting a flexible board, of the robot arm in the robot according to the third embodiment of the present disclosure.

Similarly to FIG. 13, FIGS. 33A and 33B each include a graph of force information and positional information in the replaying motion illustrated in FIGS. 12A to 12J. More specifically, FIG. 33A indicates a result of a case of replaying a motion related to actual reaction time information, whereas FIG. 33B indicates a result of a case of deleting a motion related to actual reaction time information.

FIG. 33A exhibits a result similar to that of taught data indicated in FIG. 26. Meanwhile, according to FIG. 33B, a motion related to actual reaction time information is deleted, so that it is confirmed that a motion during reaction time of a person is deleted (sections C and D in FIG. 33A are deleted from FIG. 33B)

The motion generating section 3102 is capable of interpolating a motion during reaction time of a person, instead of deleting a motion during reaction time of a person as described above. For example, interpolated is information on time between information at a time point where an information variation point is detected and information at a time point after elapse of a reaction time from the information variation point. Interpolation can be performed in any one of methods such as linear interpolation, polynomial interpolation, and circular arc interpolation.

Figure 33C:
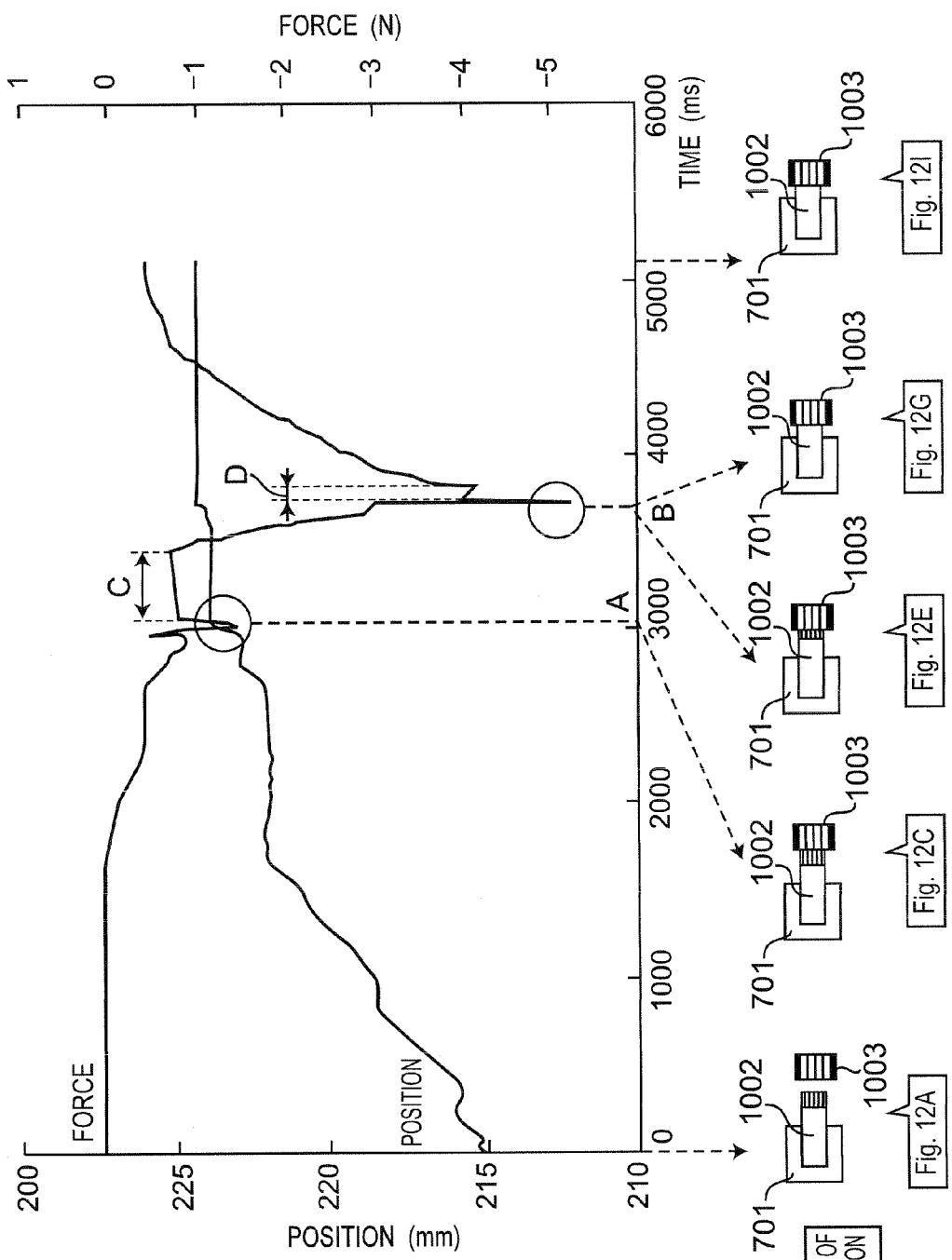
FIG. 33C is a view of force information and positional information, in a case of interpolating the motion in the actual reaction time information, during the motion of replaying the task of inserting a flexible board, of the robot arm in the robot according to the third embodiment of the present disclosure.

FIG. 33C includes a graph of force information and positional information in an interpolated replaying motion. Linear interpolation is applied to sections C and D in FIG. 33C.

It is also possible to automatically switch between deletion and interpolation in accordance with a difference in size between information at a time point where an information variation point is detected and information at a time point after elapse of a reaction time from the information variation point. For example, interpolation is performed if a difference in absolute value between force information at a time point where an information variation point is detected and force information at a time point after elapse of a reaction time from the information variation point is equal to or more than an arbitrary threshold (motion correction switching threshold) (0.1 N), whereas deletion is performed if the difference is less than the arbitrary threshold (motion correction switching threshold) (0.1 N).

Figure 34:
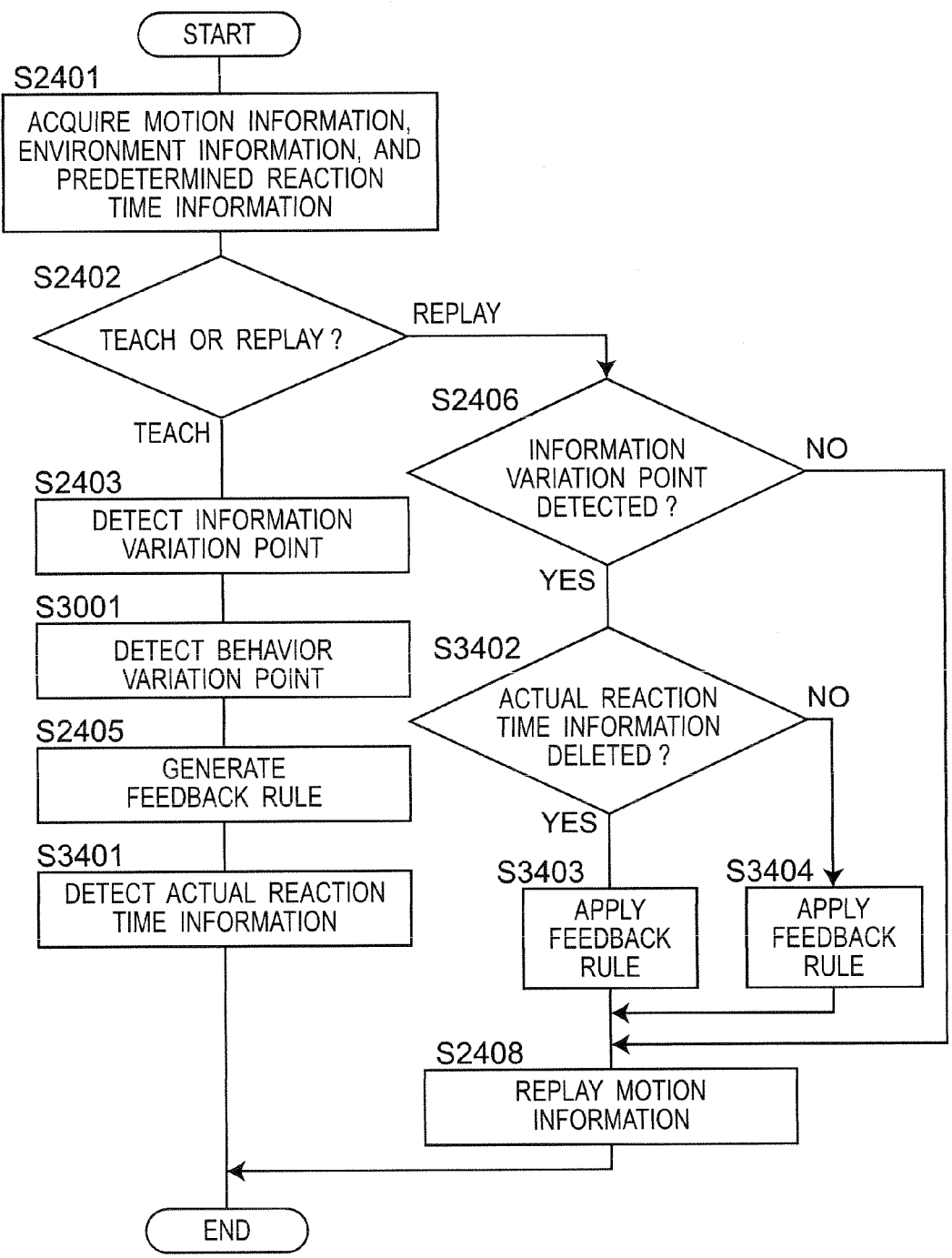
FIG. 34 is a flowchart of the robot according to the third embodiment of the present disclosure.

The operation process of the control apparatus 103 for the robot arm 102 according to the third embodiment is described below with reference to the flowchart in FIG. 34.

In step S2401, the motion information acquiring section 106 acquires motion information, the environment information acquiring section 107 acquires environment information, the predetermined reaction time information acquiring section 108 acquires predetermined reaction time information, and then the process proceeds to step S2402.

Subsequently in step 2402, the mode switching section 113 outputs mode information (either the "teach mode" or the "replay mode") to the controller 114. If the "teach mode" is outputted, the process proceeds to step S2403. If the "replay mode" is outputted, the process proceeds to step S2406.

In step S2403, the information variation point detecting section 109 detects an information variation point from taught data thus acquired (information acquired in step S2401), and outputs the information variation point thus detected, to the behavior variation point detecting section 2501. The process then proceeds to step S3001.

Subsequently in step S3001, the behavior variation point detecting section 2501 searches for a behavior variation point at and after a time point after elapse of a predetermined reaction time from the information variation point received from the information variation point detecting section 109. If the behavior variation point detecting section 2501 determines that no behavior variation point is detected in the search by the behavior variation point detecting section 2501, the behavior variation point detecting section 2501 searches for a behavior variation point detected until the time point after elapse of the predetermined reaction time from the information variation point. The behavior variation point detecting section 2501 outputs the behavior variation point thus detected by the behavior variation point detecting section 2501, to the feedback rule generating section 111. The process then proceeds to step S2405.

Subsequently in step S2405, the feedback rule generating section 111 indicates, with an approximate curve, information at and after the behavior variation point received from the behavior variation point detecting section 2501, and generates a feedback rule to output the feedback rule to the motion generating section 3102, and then the process proceeds to step S3401.

Subsequently in step 3401, the actual reaction time information detecting section 3101 obtains a difference between the time point of the behavior variation point and the time point of the information variation point, to detect actual reaction time information. The actual reaction time information detecting section 3101 outputs, to the motion generating section 3102, the actual reaction time information detected by the actual reaction time information detecting section 3101, and then this flow ends.

If the information variation point detecting section 109 determines in step S2406 that an information variation point is detected, the process proceeds to step S3402. If the information variation point detecting section 109 determines that no information variation point is detected, the process proceeds to step S2408.

In step S3402, the motion generating section 3102 urges a person to select, using the input/output IF 115, whether or not a motion related to actual reaction time information is deleted upon application of a feedback rule. The process proceeds to step 3403 if the motion related to actual reaction time information is deleted. The process proceeds to step S3404 if the motion related to actual reaction time information is not deleted.

In step S3403, the motion generating section 3102 generates motion information from the motion information received from the motion information acquiring section 106, by deleting the motion related to actual reaction time information and applying the feedback rule thereto, and then the process proceeds to step S2408.

In step S3404, the motion generating section 3102 generates motion information from the motion information received from the motion information acquiring section 106, by not deleting the motion related to actual reaction time information and applying the feedback rule thereto, and then the process proceeds to step S2408.

In step S2408, the controller 114 controls the robot arm 102 on the basis of the motion information generated by the motion generating section 3102, and then this flow ends.

According to the third embodiment, the motion generating section 3102 is capable of urging a person to select, using the input/output IF 115, whether or not a motion related to actual reaction time information is deleted. A person thus inputs, to the motion generating section 3102, information on selection made using the input/output IF 115 so as to select whether or not to delete the motion related to actual reaction time information. Accordingly, the controller 114 is capable of applying a feedback rule corresponding to a target task on the basis of motion information from the motion generating section 3102. It is also possible to delete an unstable motion of a working person to be generated during a reaction time, so that a motion as intended by the person can be replayed.

(Fourth Embodiment)

Figure 35:
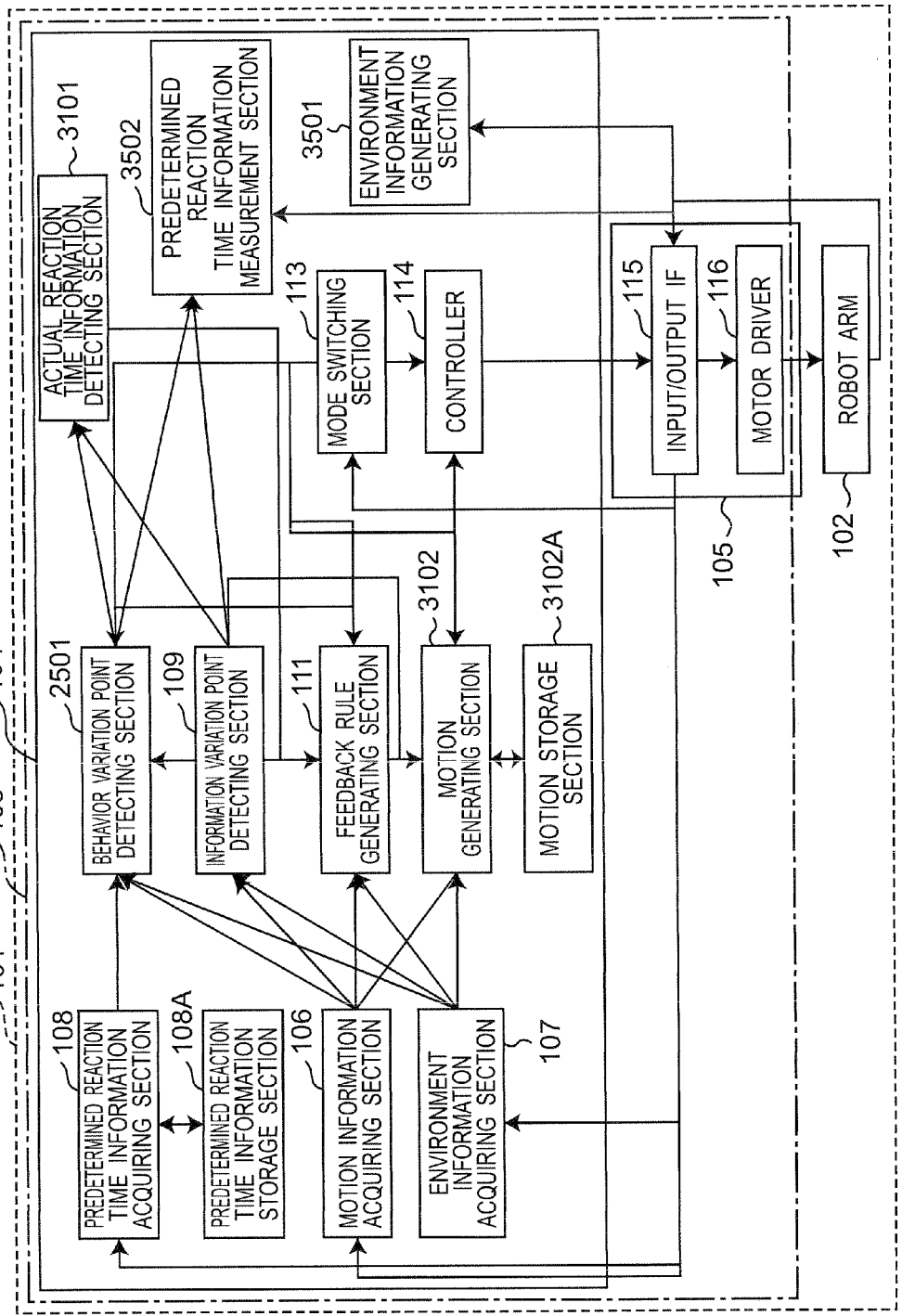
FIG. 35 is a block diagram of a robot arm in a robot according to a fourth embodiment of the present disclosure.

FIG. 35 is a block diagram of a robot 101 according to the fourth embodiment of the present disclosure. In the robot 101 according to the fourth embodiment of the present disclosure, the robot arm 102, the peripheral device 105, as well as the motion information acquiring section 106, the environment information acquiring section 107, the predetermined reaction time information acquiring section 108, the information variation point detecting section 109, the behavior variation point detecting section 2501, the feedback rule generating section 111, the motion generating section 3102, the mode switching section 113, the actual reaction time information detecting section 3101, and the controller 114 in the control apparatus 103 are configured similarly to those of the third embodiment. These common elements are denoted by the same reference signs and are not described repeatedly, and only differences are to be detailed below.

In the fourth embodiment, reaction time information corresponding to an operator or a target task is preliminarily decided as predetermined reaction time information, and the teach mode and the replay mode are controlled on the basis of the information.

The control apparatus 103 additionally includes an environment information generating section 3501 that generates environment information used upon measuring predetermined reaction time information, and outputs the environment information thus generated to the input/output IF 115. Environment information includes at least one of force information, sound volume information, and target object positional information.

The control apparatus 103 additionally includes a predetermined reaction time information measurement section 3502 that obtains, as predetermined reaction time information, a difference between a time point of a behavior variation point and a time point of an information variation point, when acquiring environment information generated by the environment information generating section 3501, on the basis of (i) the information variation point and time information corresponding to the information variation point, which are received from the information variation point detecting section 109, and (ii) the behavior variation point and time information corresponding to the behavior variation point, which are received from the behavior variation point detecting section 2501, so as to output the predetermined reaction time information thus obtained, to the input/output IF 115.

Described below is a preliminary experiment of measuring predetermined reaction time information. A preliminary experiment in which force information is adopted as environment information is described with reference to FIGS. 36A to 36D. The preliminary experiment is executed in the order of FIGS. 36A, 36B, 36C, and 36D. The preliminary experiment is executed when mode information of the mode switching section 113 indicates the "teach mode". The mode switching section 113 selects the "teach mode" in this case. A person presses the start button of the IF 115 in the time point shown in FIG. 36A, and the person presses the end button of the IF 115 in the time point shown in FIG. 36D.

Figure 36A:
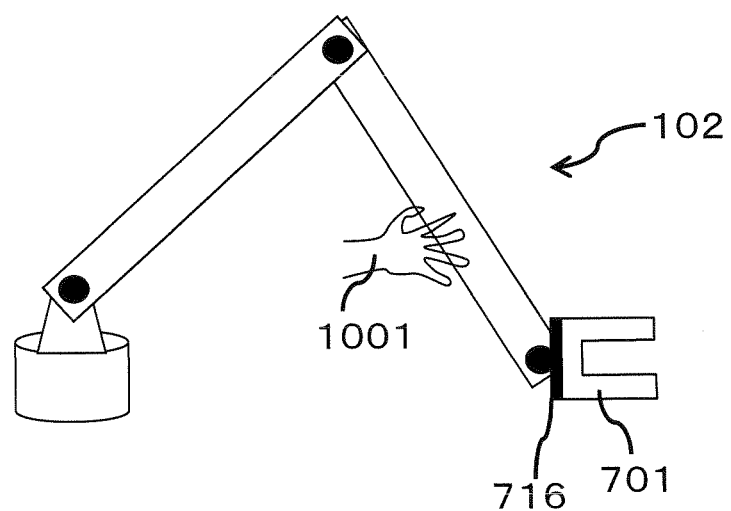
FIG. 36A is an explanatory view of a preliminary experiment on the robot arm in the robot according to the fourth embodiment of the present disclosure.

FIG. 36A illustrates a state where the person's hand 1001 grips the robot arm 102 and stays still.

Figure 36B:
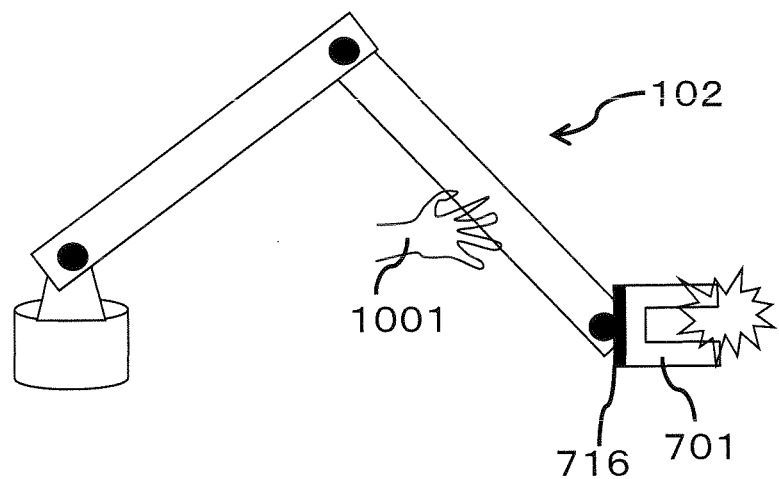
FIG. 36B is an explanatory view of the preliminary experiment on the robot arm in the robot according to the fourth embodiment of the present disclosure.

FIG. 36B illustrates a state where the environment information generating section 3501 generates force information. More specifically, the environment information generating section 3501 generates force information by controlling a position and presenting force. Alternatively, the hand 701 of the robot arm 102 is made to actually collide against a target object.

At this stage, the force sensor 716 indicates a varied value, while the person's hand 1001 has not yet received any force information.

Figure 36C:
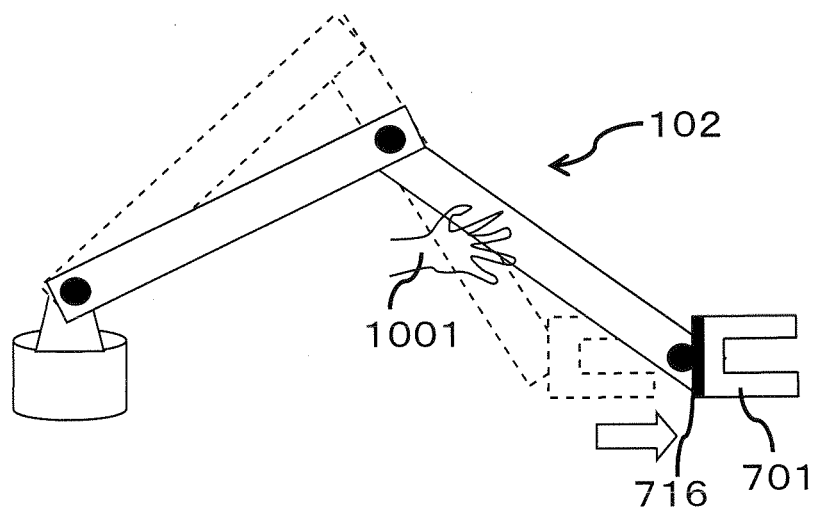
FIG. 36C is an explanatory view of the preliminary experiment on the robot arm in the robot according to the fourth embodiment of the present disclosure.

FIG. 36C illustrates a state where the person's hand 1001 receives force information and shifts the robot arm 102 at a time point after elapse of a reaction time from the time point where the environment information generating section 3501 generates the force information. The predetermined reaction time information measurement section 3502 measures the time from the time point of FIG. 36B to the time point of FIG. 36C as predetermined reaction time information.

Figure 36D:
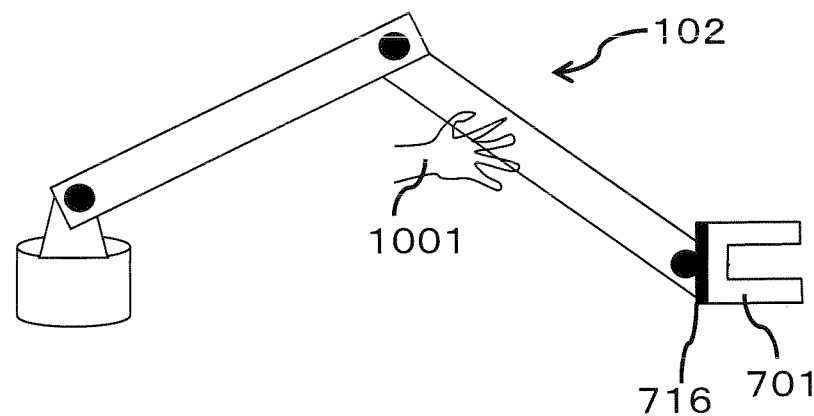
FIG. 36D is an explanatory view of the preliminary experiment on the robot arm in the robot according to the fourth embodiment of the present disclosure.

FIG. 36D illustrates a state where the person's hand 1001 grips the robot arm 102 and stays still after the completion of the preliminary experiment.

FIG. 37 indicates positional information on the robot arm 102 and the measurement value of the force sensor 716, which are obtained during the preliminary experiment illustrated in FIGS. 36A to 36D. A solid line 400 in the graph of FIG. 37 indicates the value detected by the force sensor 716. A solid line 401 in the graph indicates the position of the robot arm 102. The transverse axis of FIG. 37 denotes preliminary experiment time from start of the preliminary experiment (0 ms) to end of the preliminary experiment. The left ordinate axis in FIG. 37 denotes the position (mm) of the robot arm 102. The right ordinate axis in FIG. 37 denotes the value (N) detected by the force sensor 716. Noted under the graph in FIG. 37 are which states of FIGS. 36A to 36D apply. FIG. 37 indicates an information variation point A and a behavior variation point B. FIG. 37 also indicates predetermined reaction time information C.

According to FIG. 37, the force information has a large displacement and the information variation point detecting section 109 detects the information variation point in the state illustrated in FIG. 36B. Furthermore, the positional information has a large displacement and the behavior variation point detecting section 2501 detects the behavior variation point in the state illustrated in FIG. 36C. The predetermined reaction time information acquiring section 108 acquires, as predetermined reaction time information, a time C (see FIG. 37) from the time point of the information variation point to the time point of the behavior variation point. In this manner, the predetermined reaction time information acquiring section 108 is capable of acquiring predetermined reaction time information corresponding to a difference in reaction time due to an operator, a target task, environment information, or the like. The predetermined reaction time information storage section 108A stores the predetermined reaction time information thus acquired, and the predetermined reaction time information acquiring section 108 outputs the predetermined reaction time information to the behavior variation point detecting section 2501. The preliminary experiment is executed as a preparatory task for an actual task and differs depending on an operator or a target task. The result of the preliminary experiment is stored as information indicated in FIG. 38.

Figure 39:
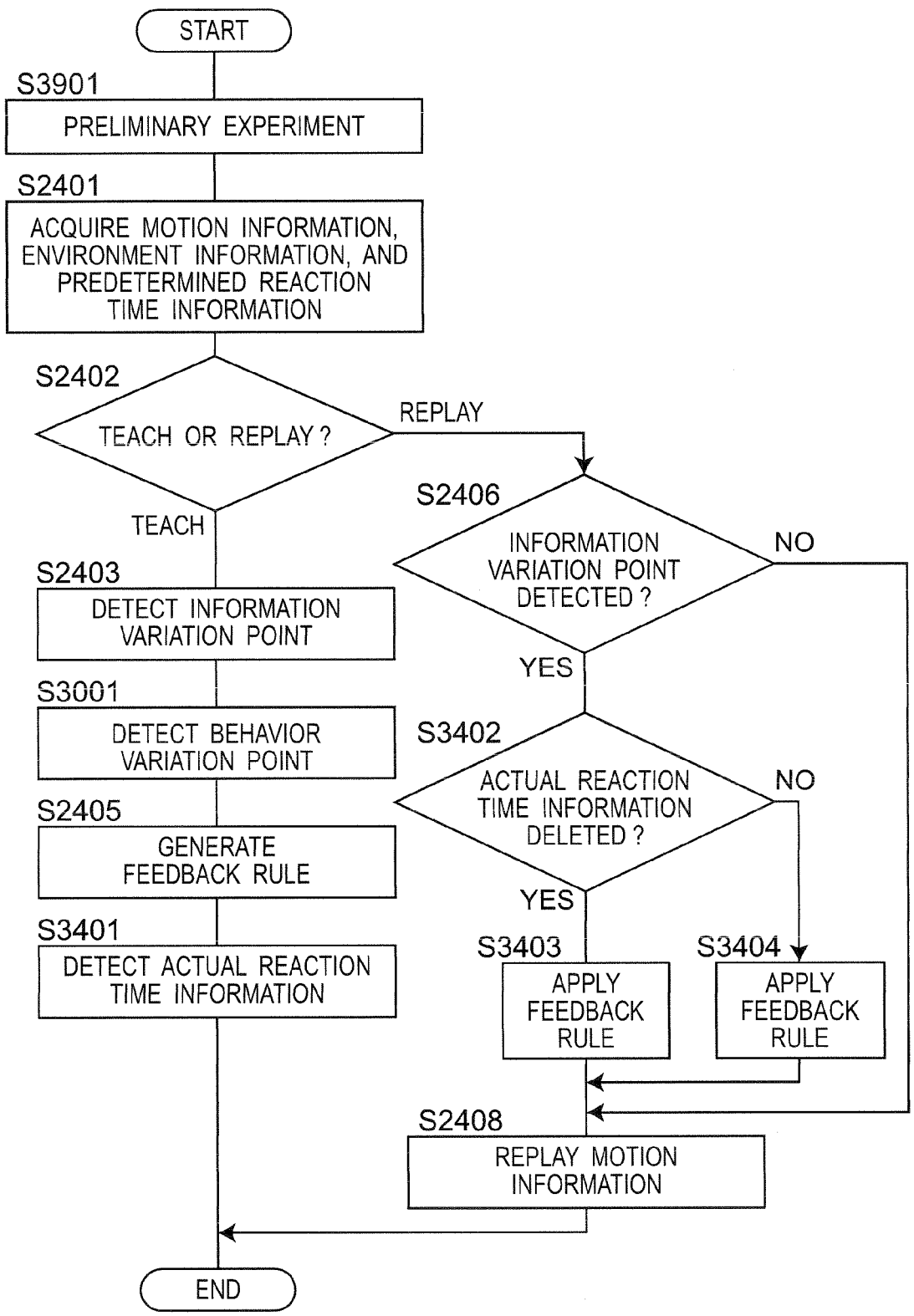
FIG. 39 is a flowchart of the robot according to the fourth embodiment of the present disclosure.

The manipulation process of the control apparatus 103 for the robot arm 102 according to the fourth embodiment is described below with reference to the flowchart in FIG. 39.

In step S3901, the preliminary experiment is executed. The predetermined reaction time information measurement section 3502 measures predetermined reaction time information and outputs the predetermined reaction time information thus measured to the input/output IF 115. The process then proceeds to step S2401.

Subsequently in step S2401, the motion information acquiring section 106 acquires motion information, the environment information acquiring section 107 acquires environment information, the predetermined reaction time information acquiring section 108 acquires predetermined reaction time information, and then the process proceeds to step S2402.

Subsequently in step S2402, the mode switching section 113 outputs mode information (either the "teach mode" or the "replay mode") to the controller 114. If the "teach mode" is outputted, the process proceeds to step S2403. If the "replay mode" is outputted, the process proceeds to step S2406.

In step S2403, the information variation point detecting section 109 detects an information variation point from taught data thus acquired (information acquired in step S2401), and outputs the information variation point thus detected to the behavior variation point detecting section 2501. The process then proceeds to step S3001.

Subsequently in step S3001, the behavior variation point detecting section 2501 searches for a behavior variation point at and after a time point after elapse of a predetermined reaction time from the information variation point received from the time point at the information variation point detecting section 109. If the behavior variation point detecting section 2501 determines that no behavior variation point is detected in the search by the behavior variation point detecting section 2501, the behavior variation point detecting section 2501 searches for a behavior variation point detected until the time point after elapse of the predetermined reaction time from the information variation point. The behavior variation point detecting section 2501 outputs the behavior variation point thus detected by the behavior variation point detecting section 2501, to the feedback rule generating section 111. The process then proceeds to step S2405.

Subsequently in step S2405, the feedback rule generating section 111 indicates, with an approximate curve, information at and after the behavior variation point received from the behavior variation point detecting section 2501, and generates a feedback rule to output the feedback rule to the motion generating section 3102, and then the process proceeds to step S3401.

Subsequently in step 3401, the actual reaction time information detecting section 3101 obtains a difference between the time point of the behavior variation point and the time point of the information variation point, to detect actual reaction time information. The actual reaction time information detecting section 3101 outputs, to the motion generating section 3102, the actual reaction time information thus detected, and then this flow ends.

If the information variation point detecting section 109 determines in step S2406 that an information variation point is detected, the process proceeds to step S3402. If the information variation point detecting section 109 determines that no information variation point is detected, the process proceeds to step S2408.

In step S3402, the motion generating section 3102 urges a person to select, using the input/output IF 115, whether or not a motion related to actual reaction time information is deleted upon application of a feedback rule. The process proceeds to step 3403 if the motion related to actual reaction time information is deleted. The process proceeds to step S3404 if the motion related to actual reaction time information is not deleted.

In step S3403, the motion generating section 3102 generates motion information from the motion information received from the motion information acquiring section 106, by deleting the motion related to actual reaction time information and applying the feedback rule thereto, and then the process proceeds to step S2408.

In step S3404, the motion generating section 3102 generates motion information from the motion information received from the motion information acquiring section 106, by not deleting the motion related to actual reaction time information and applying the feedback rule thereto, and then the process proceeds to step S2408.

In step S2408, the controller 114 controls the robot arm 102 on the basis of the motion information generated by the motion generating section 3102, and then this flow ends.

According to the fourth embodiment, the preliminary experiment is executed and the predetermined reaction time information measurement section 3502 measures predetermined reaction time information. It is thus possible to deal with a difference in reaction time due to a person, a target task, environment information, or the like. The behavior variation point detecting section 2501 is thus capable of accurately detecting a behavior variation point, thereby achieving accuracy in performing a task regardless of change in person, target task, environment information, or the like.

(Fifth Embodiment)

Figure 40:
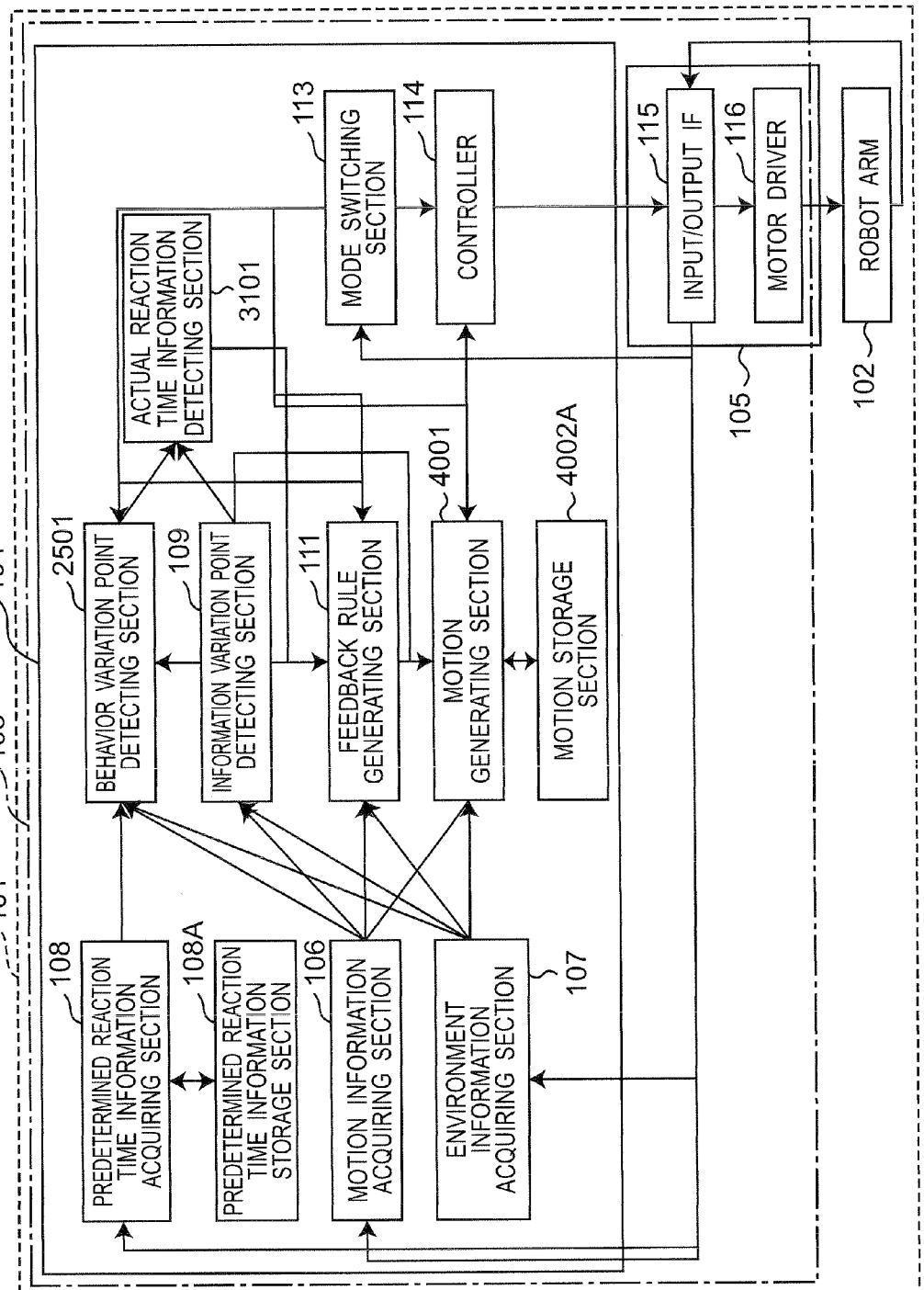
FIG. 40 is a block diagram of a robot arm in a robot according to a fifth embodiment of the present disclosure.

FIG. 40 is a block diagram of a robot 101 according to the fifth embodiment of the present disclosure. In the robot 101 according to the fifth embodiment of the present disclosure, the robot arm 102, the peripheral device 105, as well as the motion information acquiring section 106, the environment information acquiring section 107, the predetermined reaction time information acquiring section 108, the information variation point detecting section 109, the behavior variation point detecting section 2501, the feedback rule generating section 111, the mode switching section 113, the actual reaction time information detecting section 3101, and the controller 114 in the control apparatus 103 are configured similarly to those of the third embodiment. These common elements are denoted by the same reference signs and are not described repeatedly, and only differences are to be detailed below.

The control apparatus 103 includes a motion generating section 4001 in place of the motion generating section 112, and the motion generating section 4001 generates motion information on the basis of (i) time information and motion information including at least one of positional information, orientation information, and velocity information, which are received from the motion information acquiring section 106, (ii) environment information and time information received from the environment information acquiring section 107, (iii) an information variation point and time information corresponding to the information variation point, which are received from the information variation point detecting section 109, and (iv) actual reaction time information and time information received from the actual reaction time information detecting section 3101. The motion generating section 4001 outputs the motion information thus generated and time information to the controller 114. The motion generating section 4001 stores the motion information thus generated, a feedback rule, and time information in a motion storage section 4002A.

Described below is a method of generating motion information by the motion generating section 4001. The motion generating section 4001 generates motion information from the motion information received from the motion information acquiring section 106. Upon receipt of an information variation point from the information variation point detecting section 109 while the robot arm 102 is in motion, the motion generating section 4001 generates a motion applied to the feedback rule. A motion applied to the feedback rule corresponds to varying motion information so as to be along a received approximate curve. In a case where an information variation point is detected and a feedback rule is applied, the motion generating section 4001 urges a person to select, using the input/output IF 115, whether a motion related to actual reaction time information is replayed or deleted. A person is thus capable of inputting, to the motion generating section 4001, information on selection made using the input/output IF 115 so as to select either replaying or deleting the motion related to actual reaction time information. If the motion related to actual reaction time information is replayed, the motion can be replayed similarly to a motion according to taught data. As selection criteria, a motion related to actual reaction time information is replayed if a motion similar to a teaching motion is performed, and a motion related to actual reaction time information is deleted if a motion is replayed efficiently and quickly. In the case of deleting a motion related to actual reaction time information, a motion during a reaction time of a person can be deleted and an unstable motion can be thus deleted.

If there are plural pieces of taught data, the motion generating section 4001 compares respective pieces of actual reaction time information that are included in these pieces of taught data and transmitted from the actual reaction time information detecting section 3101 to the motion generating section 4001. The motion generating section 4001 generates motion information by using the taught data that includes the shortest actual reaction time information. Cases where there are plural pieces of taught data includes a case where a same operator teaches a same task for a plurality of times, and a case where a plurality of operators each teaches a same task.

Figure 41A:
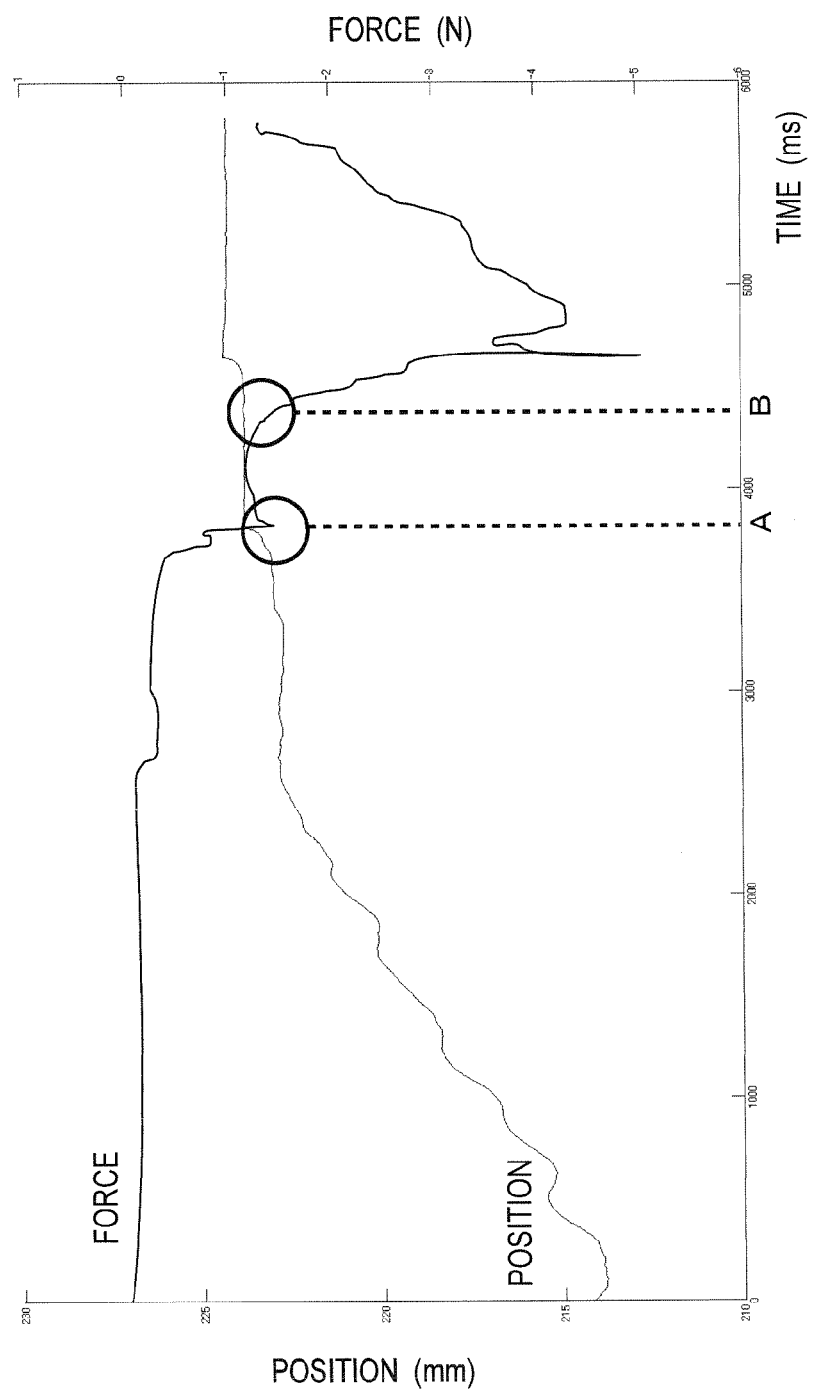
FIG. 41A is a graph of force information and positional information during the motion of teaching the task of inserting a flexible board, of the robot arm in the robot according to the fifth embodiment of the present disclosure.
Figure 41B:
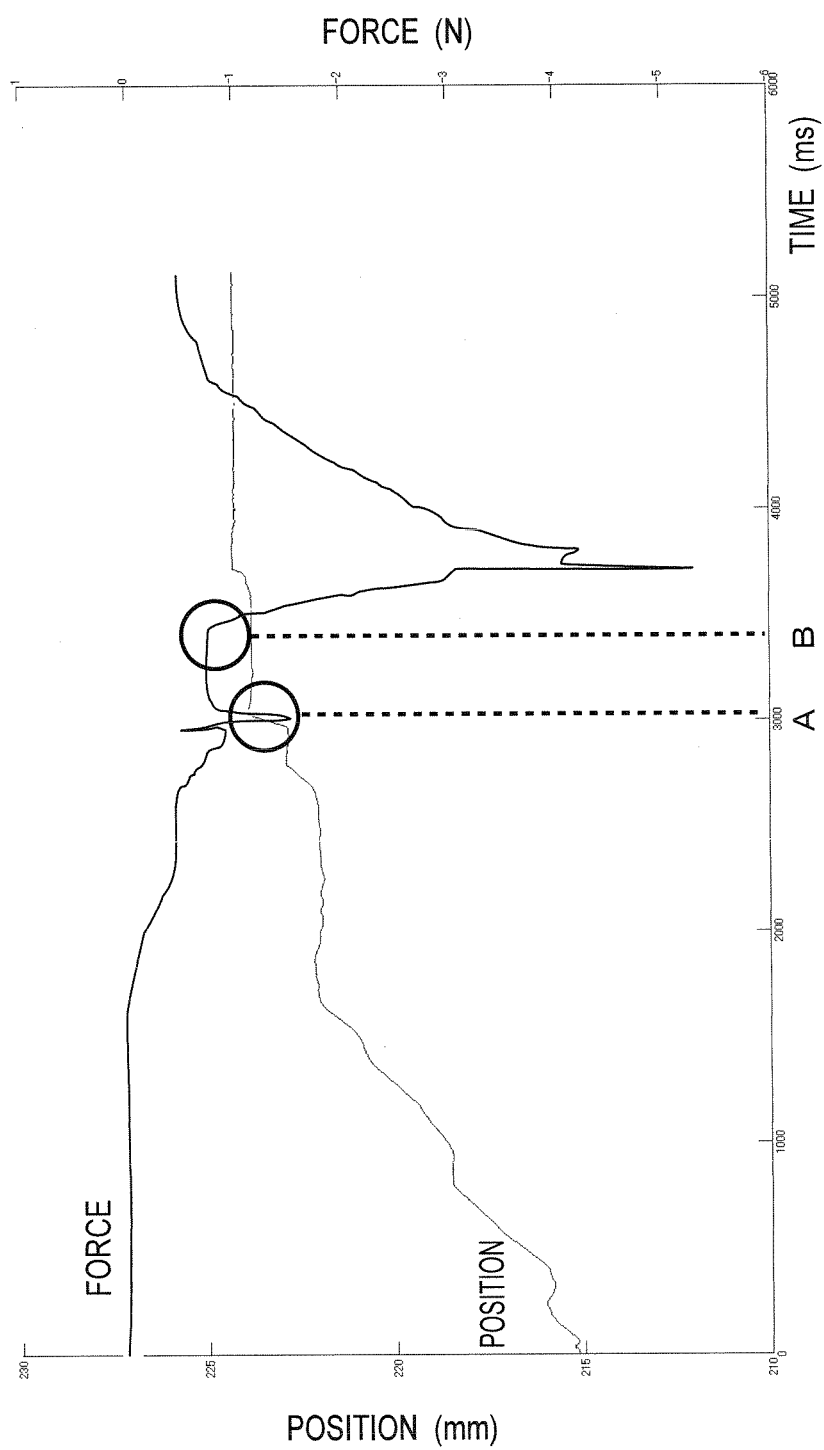
FIG. 41B is a graph of force information and positional information during the motion of teaching the task of inserting a flexible board, of the robot arm in the robot according to the fifth embodiment of the present disclosure.
Figure 41C:
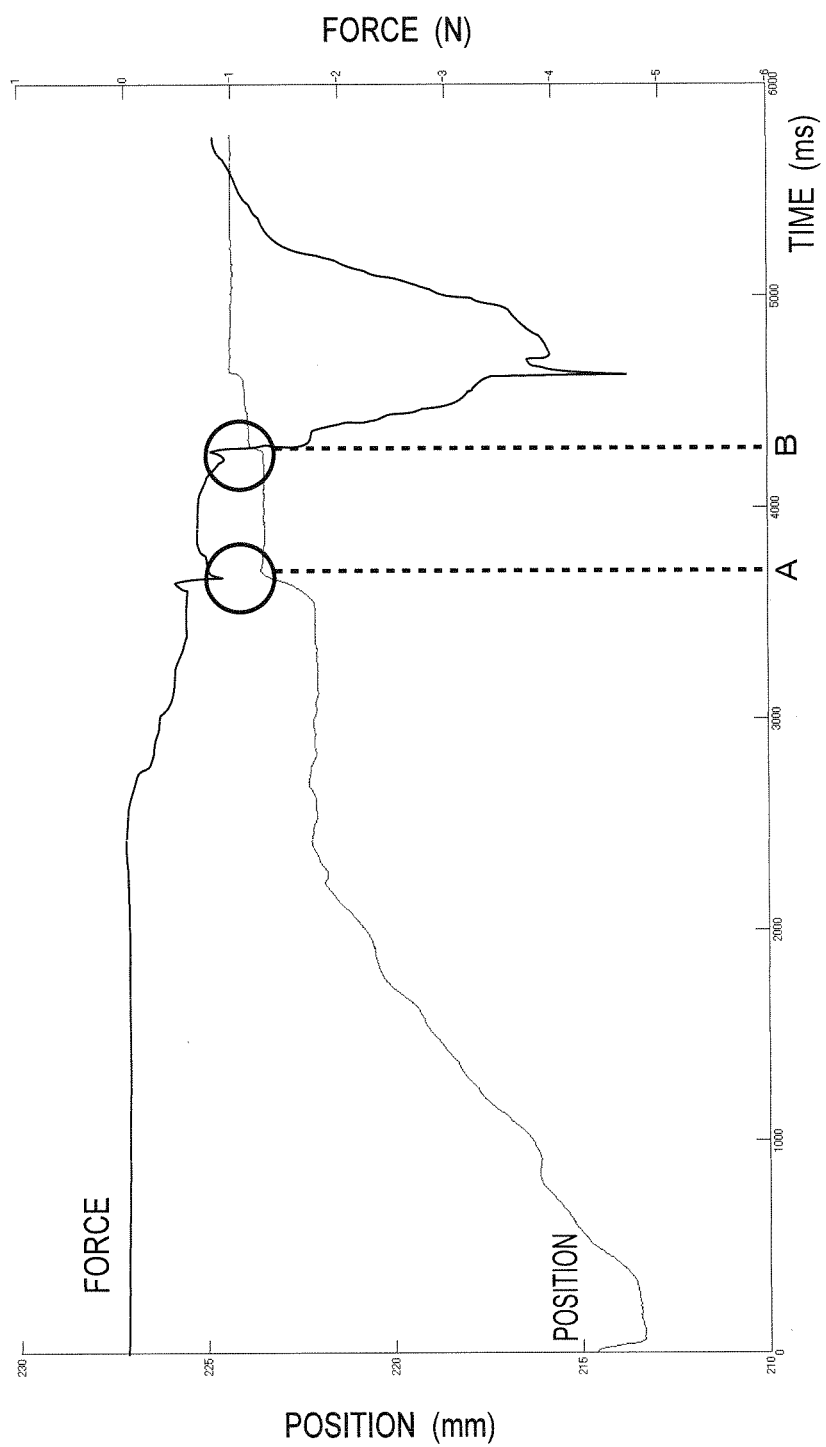
FIG. 41C is a graph of force information and positional information during the motion of teaching the task of inserting a flexible board, of the robot arm in the robot according to the fifth embodiment of the present disclosure.

When there are three pieces of taught data indicated in FIGS. 41A to 41C, the motion generating section 4001 compares the respective pieces of actual reaction time information (B-A in FIGS. 41A to 41C). These pieces of actual reaction time information have 524 ms in FIG. 41A, 416 ms in FIG. 41B, and 594 ms in FIG. 41C, respectively. In this case, the actual reaction time information in FIG. 41B has the shortest value, so that the motion generating section 4001 generates motion information by using the taught data indicated in FIG. 41B.

Taught data can be chronological data as indicated in FIG. 42.

Figure 43:
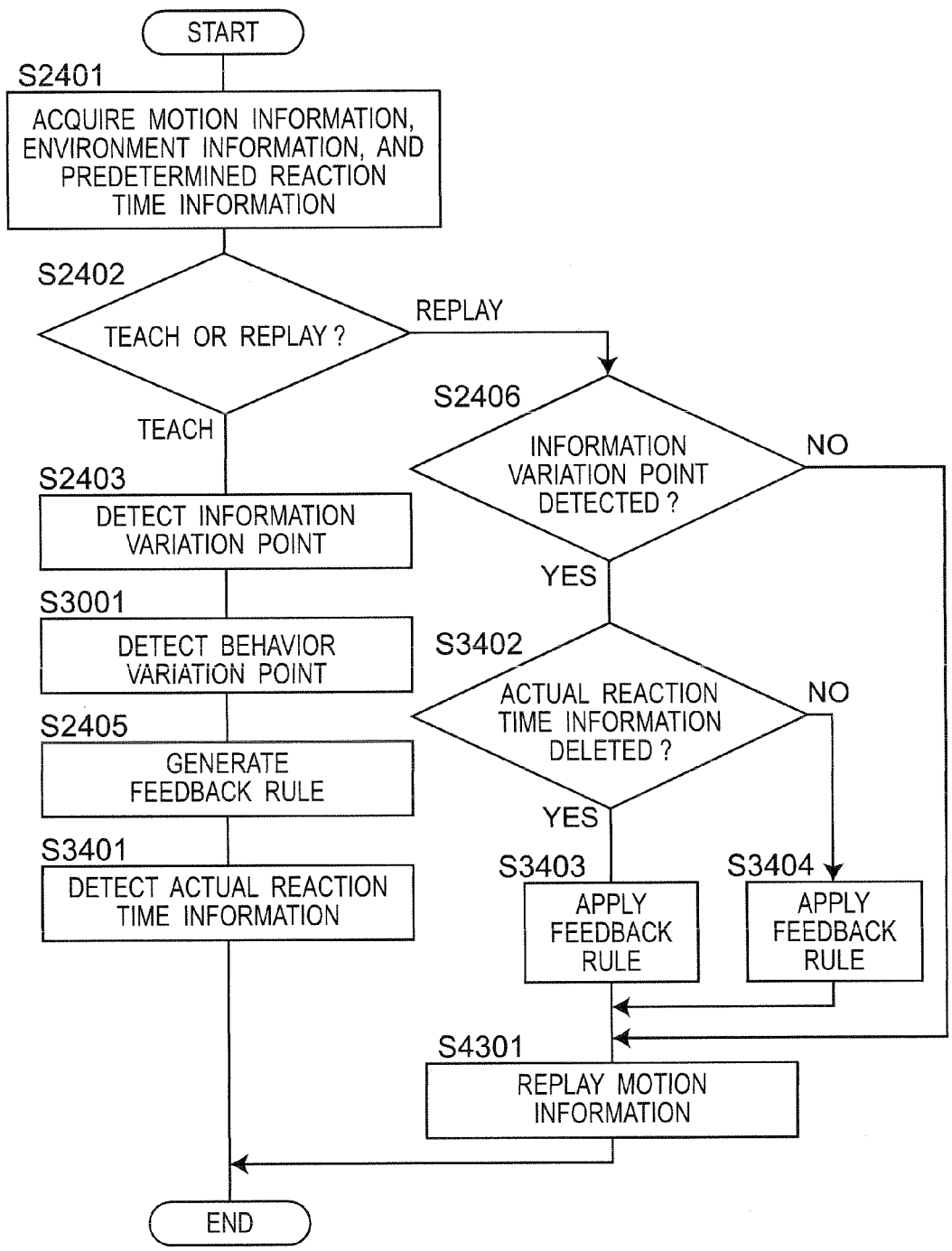
FIG. 43 is a flowchart of the robot according to the fifth embodiment of the present disclosure.

The manipulation process of the control apparatus 103 for the robot arm 102 according to the fifth embodiment is described below with reference to the flowchart in FIG. 43.

In step S2401, the motion information acquiring section 106 acquires motion information, the environment information acquiring section 107 acquires environment information, the predetermined reaction time information acquiring section 108 acquires predetermined reaction time information, and then the process proceeds to step S2402.

Subsequently in step S2402, the mode switching section 113 outputs mode information (either the "teach mode" or the "replay mode") to the controller 114. If the "teach mode" is outputted, the process proceeds to step S2403. If the "replay mode" is outputted, the process proceeds to step S2406.

In step S2403, the information variation point detecting section 109 detects an information variation point from taught data thus acquired (information acquired in step S2401), and outputs the information variation point thus detected, to the behavior variation point detecting section 2501. The process then proceeds to step S3001.

Subsequently in step S3001, the behavior variation point detecting section 2501 searches for a behavior variation point at and after a time point after elapse of a predetermined reaction time from the time point at the information variation point received from the information variation point detecting section 109. If the behavior variation point detecting section 2501 determines that no behavior variation point is detected in the search by the behavior variation point detecting section 2501, the behavior variation point detecting section 2501 searches for a behavior variation point detected until the time point after elapse of the predetermined reaction time from the time point at the information variation point. The behavior variation point detecting section 2501 outputs the behavior variation point thus detected by the behavior variation point detecting section 2501 to the feedback rule generating section 111. The process then proceeds to step S2405.

Subsequently in step S2405, the feedback rule generating section 111 indicates, with an approximate curve, information at and after the behavior variation point received from the behavior variation point detecting section 2501, and generates a feedback rule to output the feedback rule to the motion generating section 4001, and then the process proceeds to step S3401.

Subsequently in step 3401, the actual reaction time information detecting section 3101 obtains a difference between the time point of the behavior variation point and the time point of the information variation point, to detect actual reaction time information. The actual reaction time information detecting section 3101 outputs, to the motion generating section 4001, the actual reaction time information detected by the actual reaction time information detecting section 3101, and then this flow ends.

If the information variation point detecting section 109 determines in step S2406 that an information variation point is detected, the process proceeds to step S3402. If the information variation point detecting section 109 determines that no information variation point is detected, the process proceeds to step S4301.

In step S3402, the motion generating section 4001 urges a person to select, using the input/output IF 115, whether or not a motion related to actual reaction time information is deleted upon application of a feedback rule. The process proceeds to step 3403 if the motion related to actual reaction time information is deleted. The process proceeds to step S3404 if the motion related to actual reaction time information is not deleted.

In step S3403, the motion generating section 4001 generates motion information from the motion information received from the motion information acquiring section 106, by deleting the motion related to actual reaction time information and applying the feedback rule thereto, and then the process proceeds to step S4301.

In step S3404, the motion generating section 4001 generates motion information from the motion information received from the motion information acquiring section 106, by not deleting the motion related to actual reaction time information and applying the feedback rule thereto, and then the process proceeds to step S4301.

In step S4301, the controller 114 controls the robot arm 102 on the basis of the motion information generated by the motion generating section 4001, and then this flow ends. If there are plural pieces of taught data, the robot arm 102 is controlled on the basis of the taught data that has the shortest actual reaction time information and generated as motion information by the motion generating section 4001.

According to the fifth embodiment, even when there are plural pieces of taught data, the motion generating section 4001 is capable of selecting the best taught data to be replayed, thereby achieving an efficient task.

(Sixth Embodiment)

Figure 44:
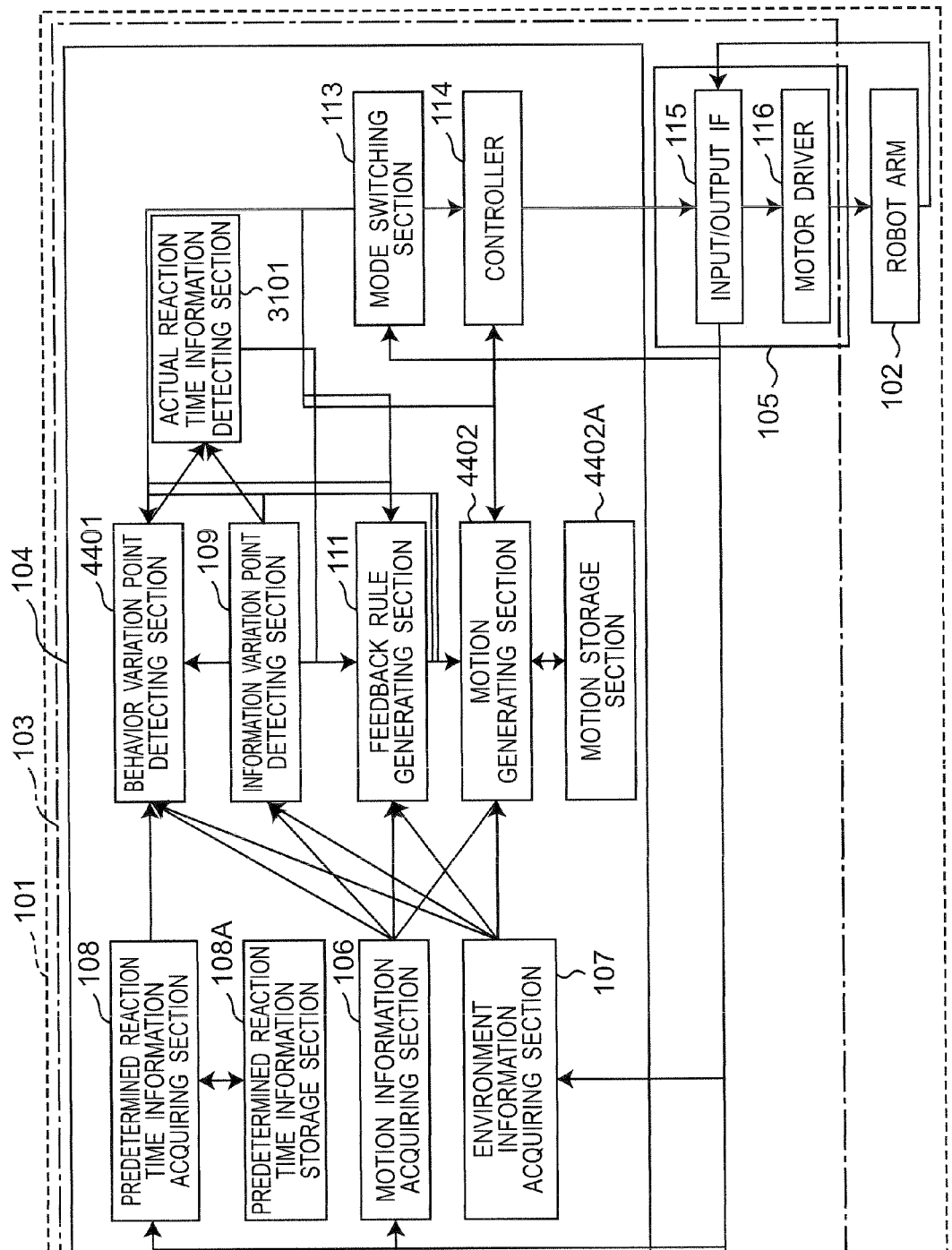
FIG. 44 is a block diagram of a robot arm in a robot according to a sixth embodiment present disclosure.

FIG. 44 is a block diagram of a robot 101 according to the sixth embodiment of the present disclosure. In the robot 101 according to the sixth embodiment of the present disclosure, the robot arm 102, the peripheral device 105, as well as the motion information acquiring section 106, the environment information acquiring section 107, the predetermined reaction time information acquiring section 108, the information variation point detecting section 109, the feedback rule generating section 111, the mode switching section 113, the actual reaction time information detecting section 3101, and the controller 114 in the control apparatus 103 are configured similarly to those of the third embodiment. These common elements are denoted by the same reference signs and are not described repeatedly, and only differences are to be detailed below.

The control apparatus 103 includes a behavior variation point detecting section 4401 in place of the behavior variation point detecting section 2501. In addition to the function of the behavior variation point detecting section 2501 according to the third embodiment, the behavior variation point detecting section 4401 detects preliminary motion information and detects a behavior variation point in the time from a time point where the preliminary motion information is detected if the preliminary motion information is detected. The behavior variation point detecting section 4401 outputs the preliminary motion information thus detected, to a motion generating section 4402. Preliminary motion information relates to a preliminary motion performed before a person changes behavior, and is detected in motion information. More specifically, preliminary motion information includes a motion unconsciously performed by a person, such as, in a task of inserting the flexible board 1002, a motion of slightly pulling once before pressing the flexible board 1002 into the connector 1003.

A specific method of detecting preliminary motion information by the behavior variation point detecting section 4401 is described with reference to taught data indicated in FIG. 45.

Figure 45:
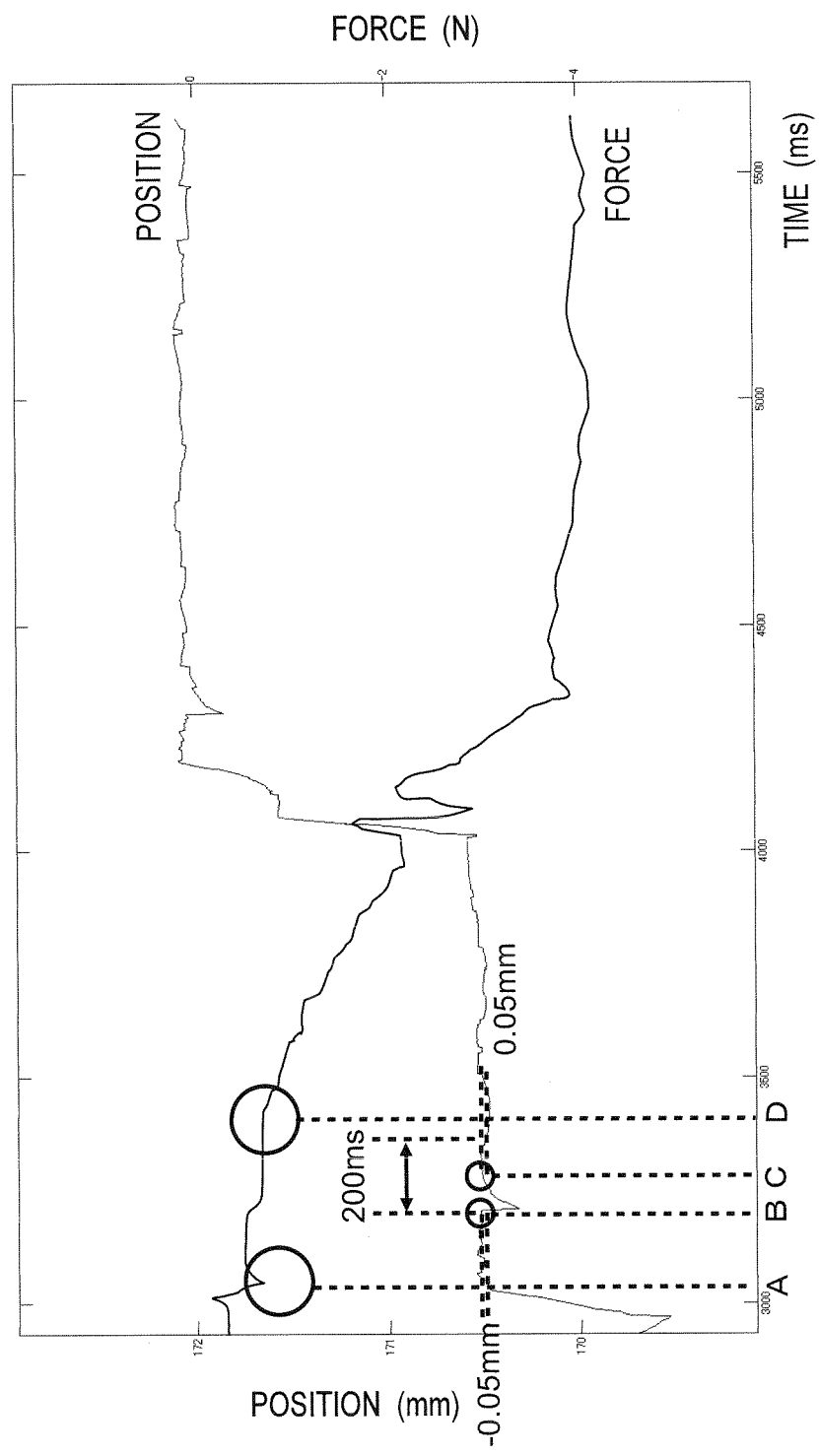
FIG. 45 is a view of force information and positional information during the motion of teaching the task of inserting a flexible board, of the robot arm in the robot according to the sixth embodiment of the present disclosure.

The information variation point detecting section 109 detects an information variation point (time point A in FIG. 45). Subsequently, the behavior variation point detecting section 4401 detects, as a behavior variation point, a time point (time point B in FIG. 45) where a displacement in positional information is larger than the second threshold (e.g. −0.05 mm). The behavior variation point detecting section 4401 then detects positional information (time point C in FIG. 45) where a displacement in positional information is larger than the second threshold (e.g. 0.05 mm) and which has a value same as that of the detected behavior variation point, between the behavior variation point and a third threshold (e.g. 200 ms). In this case, the behavior variation point detecting section 4401 sets, as preliminary motion information, positional information from the time point B to the time point C in FIG. 45. The behavior variation point detecting section 4401 then searches for a behavior variation point at and after the time point C in FIG. 45, to detect a behavior variation point (time point D in FIG. 45) from force information. In this manner, the behavior variation point detecting section 4401 detects the preliminary motion information (B to C in FIG. 45) and the behavior variation point (D in FIG. 45) to be outputted to the motion generating section 4402. The third threshold is used for preliminary motion detection, and is a temporal threshold for detecting a motion performed in a short period of time, because it is known that a person unconsciously performs a preliminary motion within such a short period of time.

The motion generating section 4402 replaces the motion generating section 3102 in the control apparatus 103. In addition to the function of the motion generating section 3102 according to the third embodiment, the motion generating section 4402 urges a person to select, using the input/output IF 115, whether or not motion information is corrected on the basis of preliminary motion information received from the behavior variation point detecting section 4401. A person is thus capable of inputting, to the motion generating section 4402, information on selection made using the input/output IF 115 so as to select whether or not to correct motion information. If motion information is corrected, the motion information in the time corresponding to preliminary motion information (time points B to C in FIG. 45) is corrected so as to have a uniform and identical value. If motion information is not corrected, motion information is generated so as to be similar to taught data. As selection criteria, preliminary motion information is not corrected if a motion similar to a teaching motion is performed, and preliminary motion information is corrected if an unnecessary motion unintended by a person is to be deleted. The motion generating section 4402 stores the motion information thus generated, a feedback rule, and time information in a motion storage section 4402A.

Figure 46A:
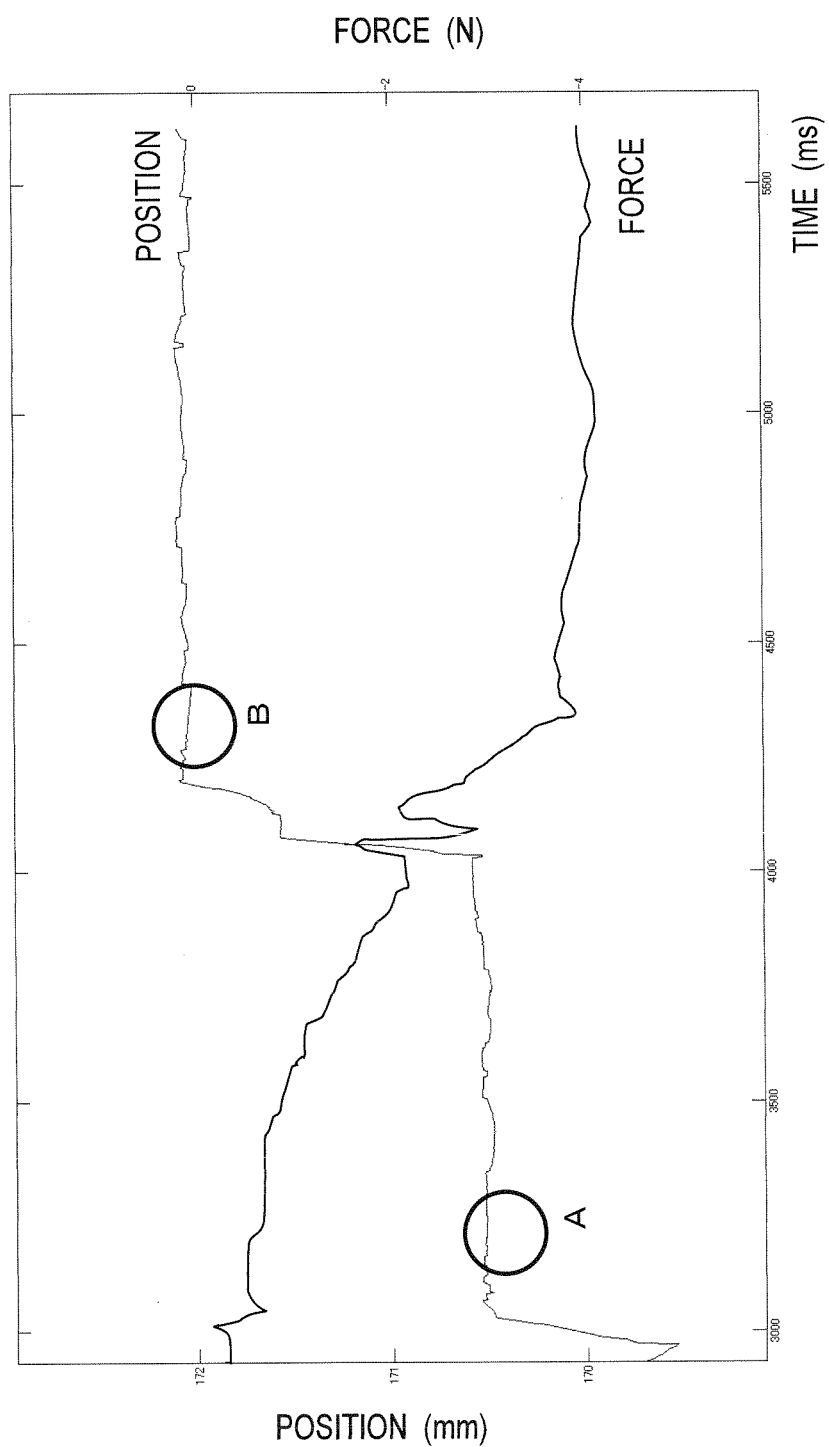
Figure 46B:
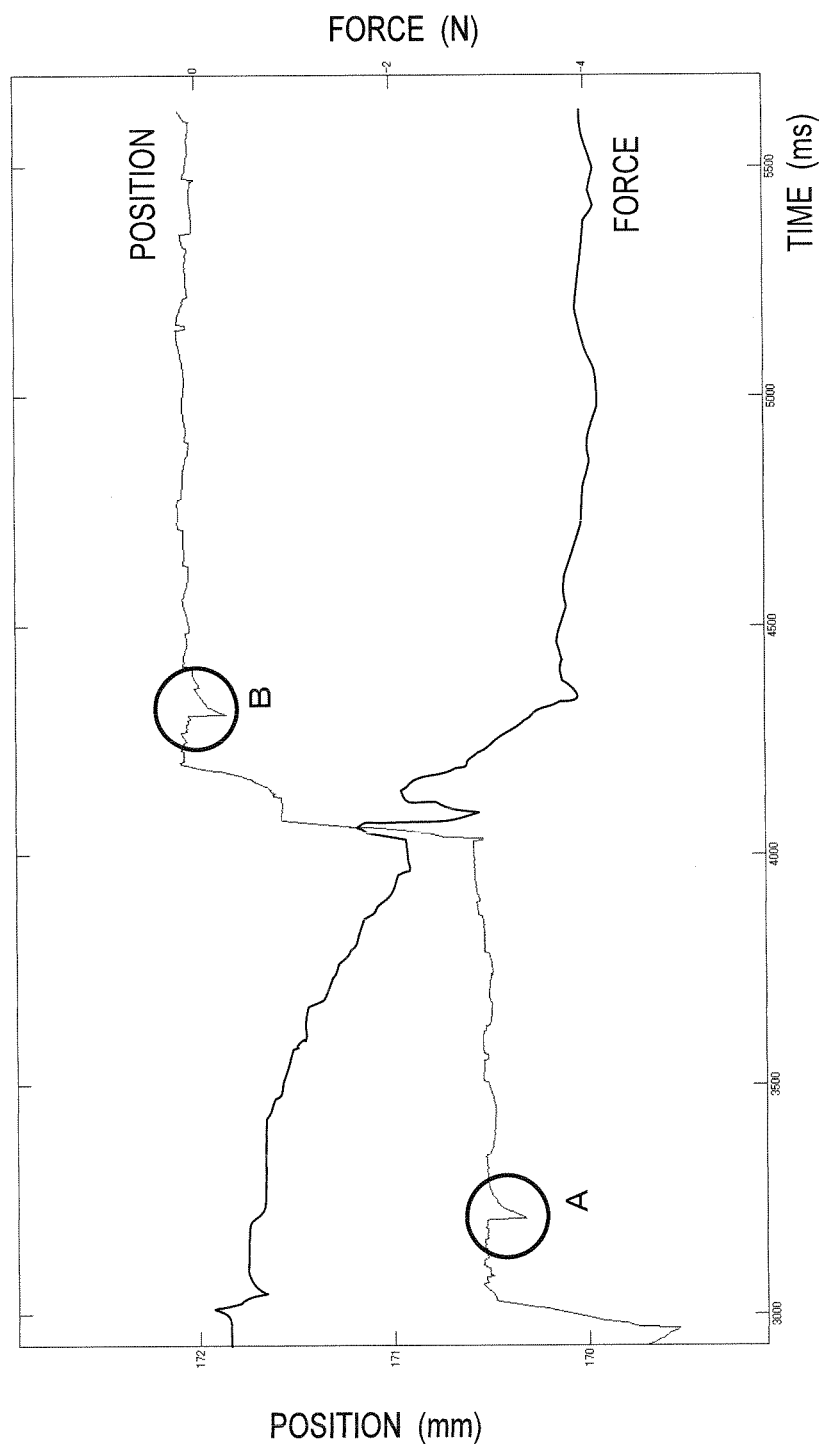

FIGS. 46A and 46B indicate a replay result in the case of correcting preliminary motion information and a replay result in the case of not correcting preliminary motion information, respectively. When portions A and B in FIGS. 46A and 46B are compared with each other, it is found that different pieces of motion information are replayed depending on whether or not correction is made to preliminary motion information.

Figure 47:
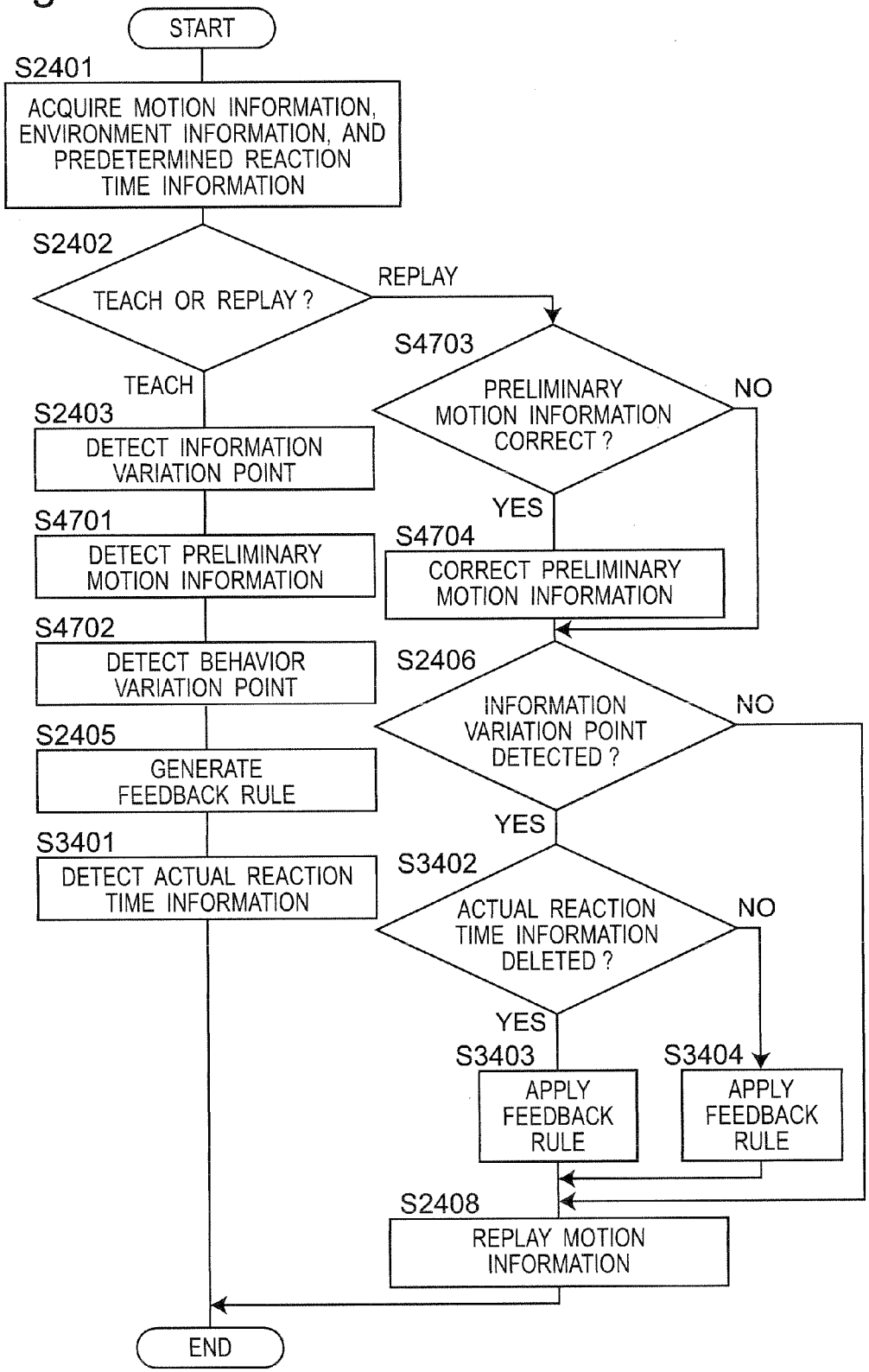

The manipulation process of the control apparatus 103 for the robot arm 102 according to the sixth embodiment is described below with reference to the flowchart in FIG. 47.

In step S2401, the motion information acquiring section 106 acquires motion information, the environment information acquiring section 107 acquires environment information, the predetermined reaction time information acquiring section 108 acquires predetermined reaction time information, and then the process proceeds to step S2402.

Subsequently in step S2402, the mode switching section 113 outputs mode information (either the "teach mode" or the "replay mode") to the controller 114. If the "teach mode" is outputted, the process proceeds to step S2403. If the "replay mode" is outputted, the process proceeds to step S2406.

In step S2403, the information variation point detecting section 109 detects an information variation point from taught data thus acquired (information acquired in step S2401), and outputs the information variation point thus detected, to the behavior variation point detecting section 4401. The process then proceeds to step S4701.

Subsequently in step S4701, the behavior variation point detecting section 4401 detects preliminary motion information and outputs the preliminary motion information thus detected, to the motion generating section 4402, and then the process proceeds to step S4702.

In step S4702, the behavior variation point detecting section 4401 searches for a behavior variation point at and after a time point where the preliminary motion information is detected. The behavior variation point detecting section 4401 outputs the behavior variation point thus detected, to the feedback rule generating section 111, and then the process proceeds to step S2405.

Subsequently in step S2405, the feedback rule generating section 111 indicates, with an approximate curve, information at and after the behavior variation point received from the behavior variation point detecting section 4401, and generates a feedback rule to output the feedback rule to the motion generating section 4402, and then the process proceeds to step S3401.

Subsequently in step 3401, the actual reaction time information detecting section 3101 obtains a difference between the time point of the behavior variation point and the time point of the information variation point, to detect actual reaction time information. The actual reaction time information detecting section 3101 outputs, to the motion generating section 4402, the actual reaction time information thus detected, and then this flow ends.

In step S4703, upon receipt of preliminary motion information from the behavior variation point detecting section 4401, the motion generating section 4402 urges a person to select, using the input/output IF 115, whether or not the preliminary motion information is corrected. A person thus inputs, to the motion generating section 4402, information on selection made using the input/output IF 115 so as to select whether or not the preliminary motion information is corrected. The process proceeds to step 4704 if the preliminary motion information is corrected. The process proceeds to step 2406 if the preliminary motion information is not corrected.

In step S4704, the motion generating section 4402 corrects the preliminary motion information, and then the process proceeds to step S2406.

If the information variation point detecting section 109 determines in step S2406 that an information variation point is detected, the process proceeds to step S3402. If the information variation point detecting section 109 determines that no information variation point is detected, the process proceeds to step S2408.

In step S3402, the motion generating section 4402 urges a person to select, using the input/output IF 115, whether or not a motion related to actual reaction time information is deleted upon application of a feedback rule. A person inputs, to the motion generating section 4402, information on selection made using the input/output IF 115 so as to select whether or not a motion related to actual reaction time information is deleted. The process proceeds to step 3403 if the motion related to actual reaction time information is deleted. The process proceeds to step S3404 if the motion related to actual reaction time information is not deleted.

In step S3403, the motion generating section 4402 generates motion information from the motion information received from the motion information acquiring section 106, by deleting the motion related to actual reaction time information and applying the feedback rule thereto, and then the process proceeds to step S2408.

In step S3404, the motion generating section 4402 generates motion information from the motion information received from the motion information acquiring section 106, by not deleting the motion related to actual reaction time information and applying the feedback rule thereto, and then the process proceeds to step S2408.

In step S2408, the controller 114 controls the robot arm 102 on the basis of the motion information generated by the motion generating section 4402, and then this flow ends.

According to the sixth embodiment, the behavior variation point detecting section 4401 detects and corrects preliminary motion information, so as to correct taught data unintended by a person. It is thus possible to generate accurate motion information, thereby achieving an accurate task even with remarkable variation in environment. If a preliminary motion replayed without correction, the robot arm rapidly shifts. This may lead to damage to a target object, for example. In this case, such damage to the target object can be prevented by deleting preliminary motion information using the motion generating section 4402 in accordance with a selection by a person.

(Seventh Embodiment)

Figure 48:
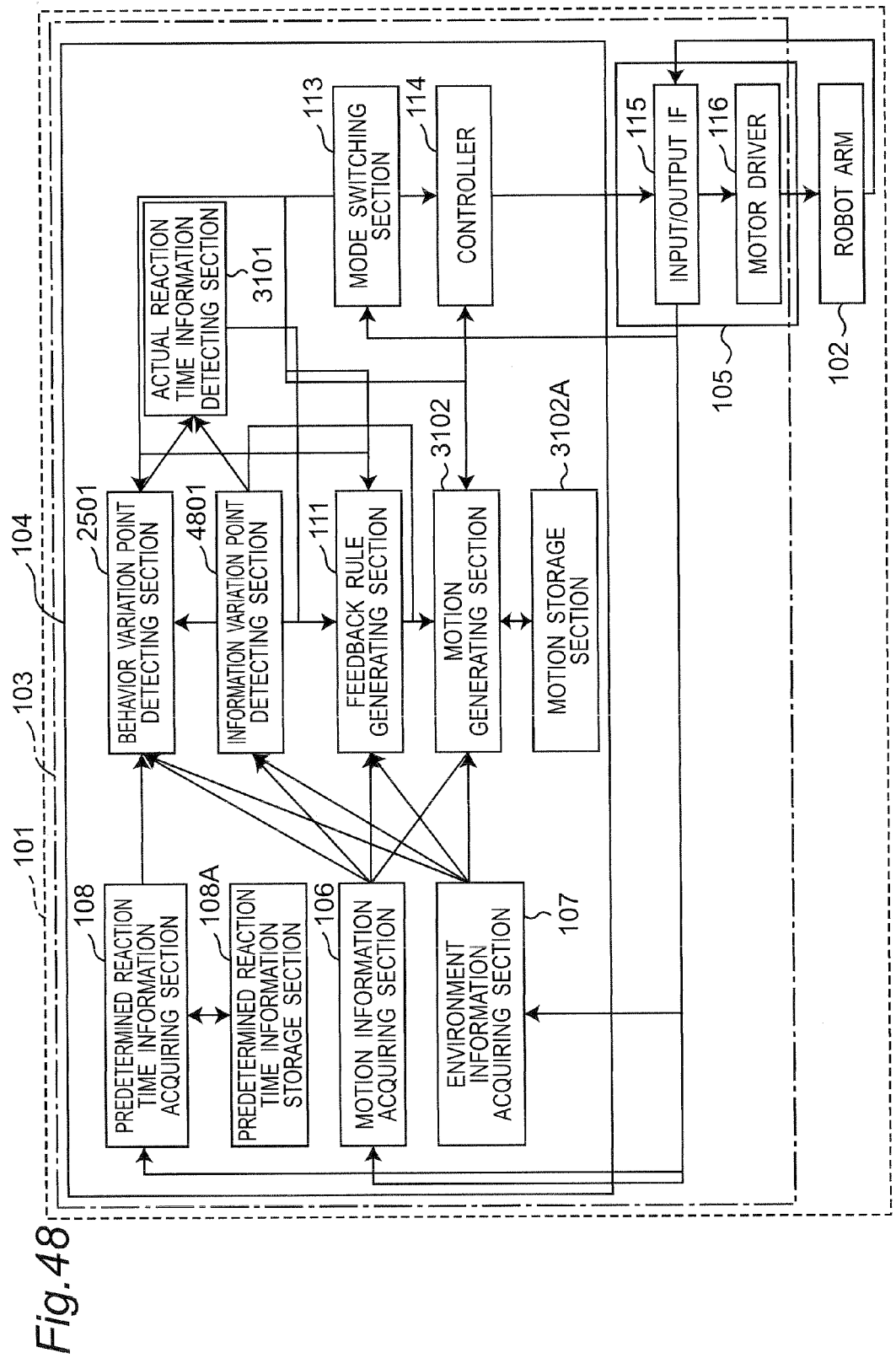

FIG. 48 is a block diagram of a robot 101 according to the seventh embodiment of the present disclosure. In the robot 101 according to the seventh embodiment of the present disclosure, the robot arm 102, the peripheral device 105, as well as the motion information acquiring section 106, the environment information acquiring section 107, the predetermined reaction time information acquiring section 108, the behavior variation point detecting section 2501, the feedback rule generating section 111, the motion generating section 3102, the mode switching section 113, the actual reaction time information detecting section 3101, and the controller 114 in the control apparatus 103 are configured similarly to those of the third embodiment. These common elements are denoted by the same reference signs and are not described repeatedly, and only differences are to be detailed below.

The control apparatus 103 includes an information variation point detecting section 4801 in place of the information variation point detecting section 109. In addition to the function of the information variation point detecting section 109 according to the third embodiment, the information variation point detecting section 4801 has a function of selecting only one information variation point related to one piece of force information, sound volume information, and target object positional information in accordance with priority ranking of force information, sound volume information, and target object positional information, when plural pieces of environment information are detected as information variation points at an identical time point. More specifically, if the information variation point detecting section 4801 detects force information, sound volume information, and target object positional information, as information variation points, the information variation point detecting section 4801 adopts the force information as the information variation point. If the information variation point detecting section 4801 detects force information and sound volume information as information variation points, the information variation point detecting section 4801 adopts the force information as the information variation point. If the information variation point detecting section 4801 detects sound volume information and target object positional information as information variation points, the information variation point detecting section 4801 adopts the sound volume information as the information variation point. This priority ranking is based on the fact that a person reacts quicker to force sense information, auditory information, and visual information, in this order.

Figure 49:
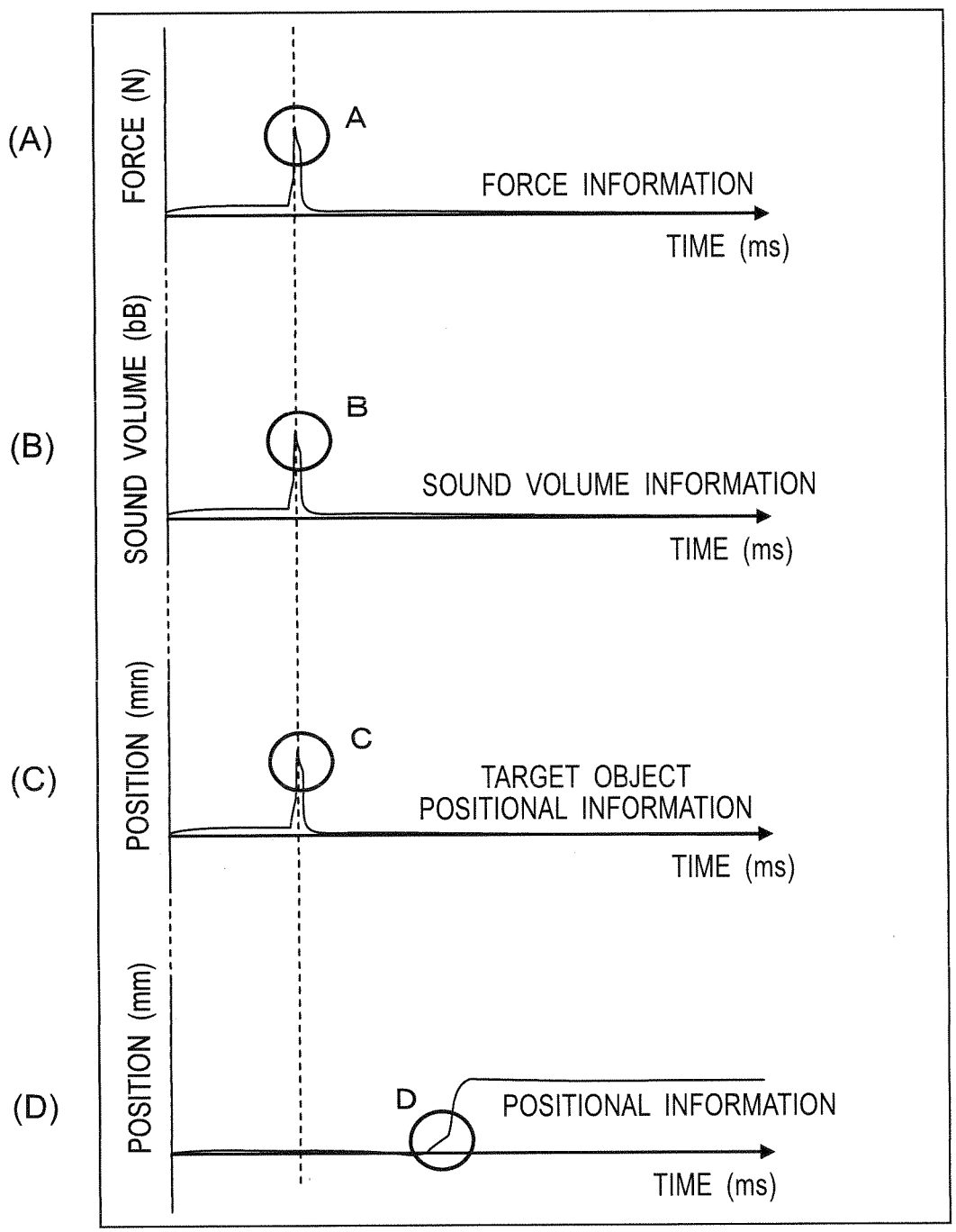

(A) to (D) of FIG. 49 indicate taught data, and indicate force information, sound volume information, target object positional information, and positional information, respectively.

(A) to (D) of FIG. 49 indicate time points A, B, and C, respectively, which are larger than the first threshold. In this case, plural pieces of environment information are candidates for an information variation point, so that the information variation point detecting section 4801 detects the force information (time point A in FIG. 49(A)) as the information variation point in accordance with the priority ranking. The behavior variation point detecting section 2501 detects a time point D in FIG. 49(D) as a behavior variation point.

Figure 50:
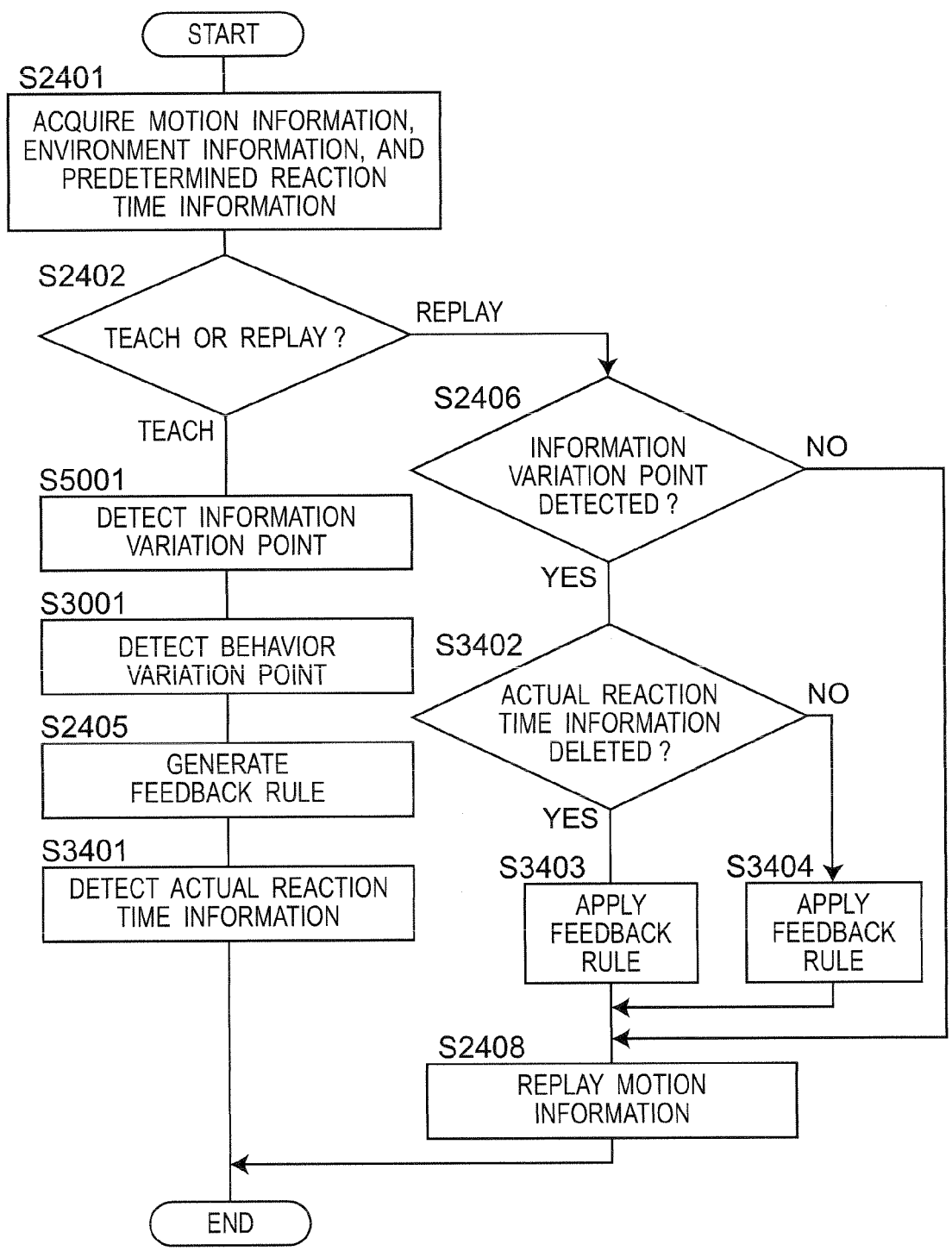

The manipulation process of the control apparatus 103 for the robot arm 102 according to the seventh embodiment is described below with reference to the flowchart in FIG. 50.

In step S2401, the motion information acquiring section 106 acquires motion information, the environment information acquiring section 107 acquires environment information, the predetermined reaction time information acquiring section 108 acquires predetermined reaction time information, and then the process proceeds to step S2402.

Subsequently in step S2402, the mode switching section 113 outputs mode information (either the "teach mode" or the "replay mode") to the controller 114. The process proceeds to step S5001 if the "teach mode" is outputted. The process proceeds to step S2406 if the "replay mode" is outputted.

In step S5001, the information variation point detecting section 4801 detects an information variation point from taught data thus acquired (information acquired in step S2401), and outputs the information variation point thus detected, to the behavior variation point detecting section 2501. The process then proceeds to step S3001. If the information variation point detecting section 4801 detects plural pieces of environment information at an identical time point as information variation points, the information variation point detecting section 4801 detects one of the pieces of environment information as the information variation point in accordance with the priority ranking of force information, sound volume information, and target object positional information.

Subsequently in step S3001, the behavior variation point detecting section 2501 searches for a behavior variation point at and after a time point after elapse of a predetermined reaction time from the information variation point received from the information variation point detecting section 4801. If the behavior variation point detecting section 2501 determines that no behavior variation point is detected in the search by the behavior variation point detecting section 2501, the behavior variation point detecting section 2501 searches for a behavior variation point detected until the time point after elapse of the predetermined reaction time from the information variation point. The behavior variation point detecting section 2501 outputs the behavior variation point thus detected by the behavior variation point detecting section 2501, to the feedback rule generating section 111. The process then proceeds to step S2405.

Subsequently in step S2405, the feedback rule generating section 111 indicates, with an approximate curve, information at and after the behavior variation point received from the behavior variation point detecting section 2501, and generates a feedback rule to output the feedback rule to the motion generating section 3102, and then the process proceeds to step S3401.

Subsequently in step 3401, the actual reaction time information detecting section 3101 obtains a difference between the time point of the behavior variation point and the time point of the information variation point, to detect actual reaction time information. The actual reaction time information detecting section 3101 outputs, to the motion generating section 3102, the actual reaction time information detected by the actual reaction time information detecting section 3101, and then this flow ends.

If the information variation point detecting section 4801 determines in step S2406 that an information variation point is detected, the process proceeds to step S3402. If the information variation point detecting section 4801 determines that no information variation point is detected, the process proceeds to step S2408.

In step S3402, the motion generating section 3102 urges a person to select, using the input/output IF 115, whether or not a motion related to actual reaction time information is deleted upon application of a feedback rule. A person inputs, to the motion generating section 3102, information on selection made using the input/output IF 115 so as to select whether or not to delete the motion related to actual reaction time information. The process proceeds to step 3403 if the motion related to actual reaction time information is deleted. The process proceeds to step S3404 if the motion related to actual reaction time information is not deleted.

In step S3403, the motion generating section 3102 generates motion information from the motion information received from the motion information acquiring section 106, by deleting the motion related to actual reaction time information and applying the feedback rule thereto, and then the process proceeds to step S2408.

In step S3404, the motion generating section 3102 generates motion information from the motion information received from the motion information acquiring section 106, by not deleting the motion related to actual reaction time information and applying the feedback rule thereto, and then the process proceeds to step S2408.

In step S2408, the controller 114 controls the robot arm 102 on the basis of the motion information generated by the motion generating section 3102, and then this flow ends.

According to the seventh embodiment, even in a case where there are plural pieces of environment information as information variation points, the information variation point detecting section 4801 is capable of selecting the environment information determined by a person to detect the environment information as the information variation point. Skills of the person can be thus extracted accurately, and the robot is capable of performing an accurate task.

(Eighth Embodiment)

Figure 51A:
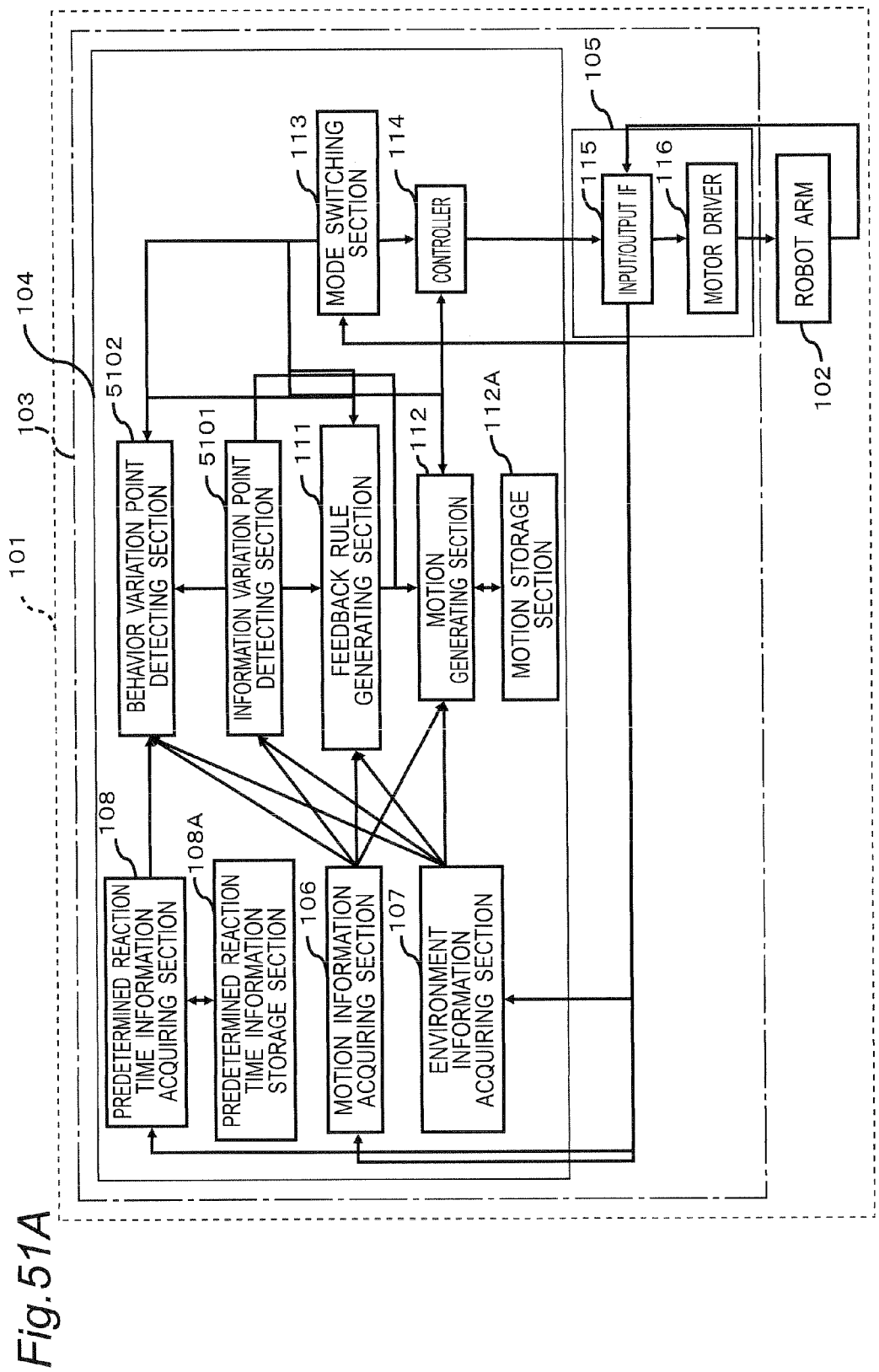

FIG. 51A is a block diagram of a robot 101 according to the eighth embodiment of the present disclosure. In the robot 101 according to the eighth embodiment of the present disclosure, the robot arm 102, the peripheral device 105, as well as the motion information acquiring section 106, the environment information acquiring section 107, the predetermined reaction time information acquiring section 108, the feedback rule generating section 111, the motion generating section 112, the mode switching section 113, and the controller 114 in the control apparatus 103 are configured similarly to those of the third embodiment. These common elements are denoted by the same reference signs and are not described repeatedly, and only differences are to be detailed below.

An information variation point detecting section 5101 and a behavior variation point detecting section 5102 have functions same as those of the information variation point detecting section 109 and the behavior variation point detecting section 2501 according to the second embodiment, respectively, but detect variation points in different methods. In the first to seventh embodiments, a variation point is detected on the basis of a displacement in motion information or environment information.

According to the eighth embodiment, the information variation point detecting section 5101 or the behavior variation point detecting section 5102 compares acquired motion information or environment information with motion information or environment information that is smoothed using a smoothing filter, and the information variation point detecting section 5101 or the behavior variation point detecting section 5102 detects, as a variation point, a portion having a large difference. Examples of the smoothing filter include a Gaussian filter. By detecting a variation point in this manner, the information variation point detecting section 5101 or the behavior variation point detecting section 5102 does not detect noise as a variation point but is capable of detecting a variation point accurately.

Figure 51B:
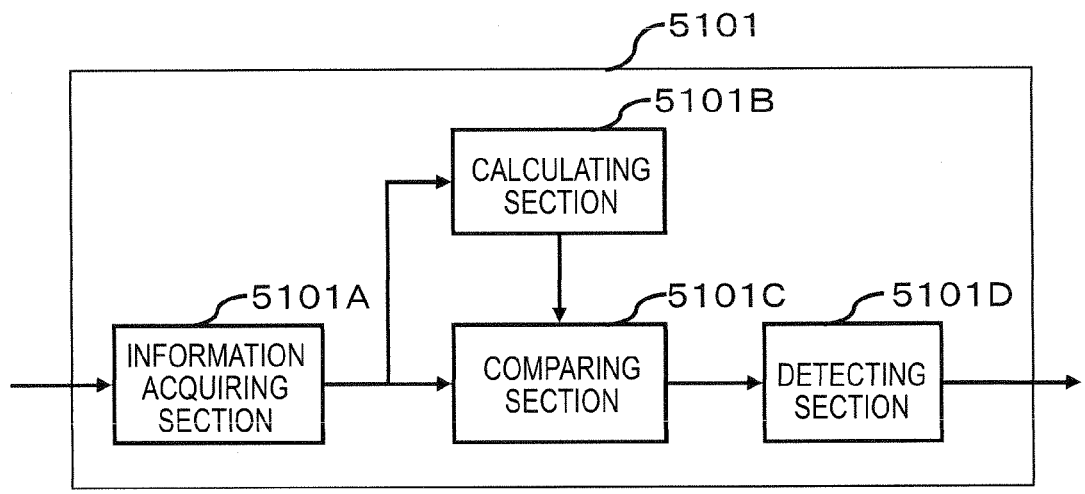

FIG. 51B is a view showing details in the information variation point detecting section 5101. The information variation point detecting section 5101 includes an information acquiring section 5101A, a calculating section 5101B, a comparing section 5101C, and a detecting section 5101D.

The information acquiring section 5101A acquires information inputted from a different element to the information variation point detecting section 5101, and outputs the inputted information to each of the calculating section 5101B and the comparing section 5101C.

The calculating section 5101B smoothes, using the smoothing filter, motion information or environment information received from the information acquiring section 5101A, and outputs motion information or environment information thus smoothed, to the comparing section 5101C.

The comparing section 5101C compares the motion information or the environment information received from the information acquiring section 5101A with the smoothed motion information or the smoothed environment information that is received from the calculating section 5101B (obtains a difference therebetween). The comparing section 5101C outputs comparison information thus obtained, to the detecting section 5101D.

The detecting section 5101D detects a portion having a large difference as an information variation point on the basis of the comparison information received from the comparing section 5101C. In other words, a portion that exceeds a detection threshold is detected as an information variation point.

Figure 51C:
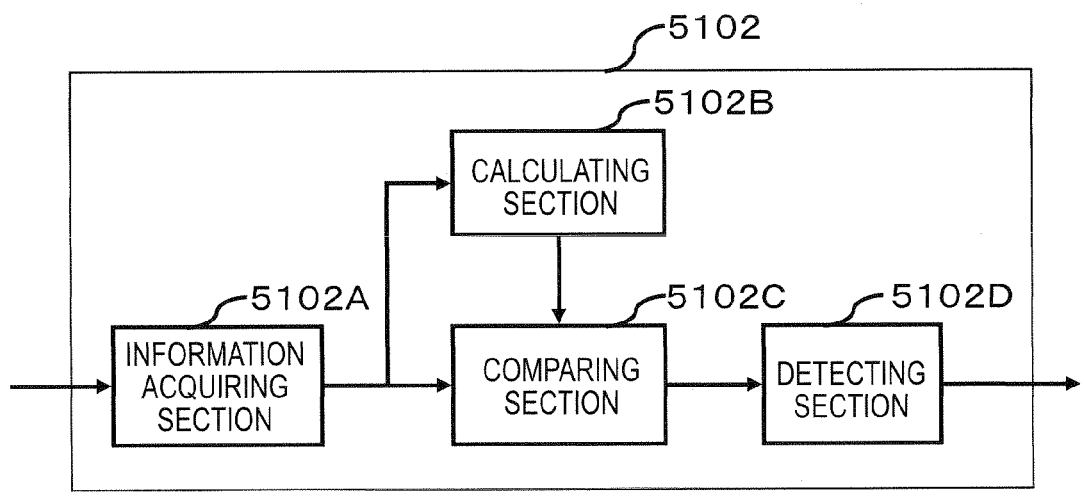

FIG. 51C is a view showing details in the behavior variation point detecting section 5102, in which a variation point is obtained similarly to the above case of detecting an information variation point by the information variation point detecting section 5101. More specifically, the behavior variation point detecting section 5102 includes an information acquiring section 5102A, a calculating section 5102B, a comparing section 5102C, and a detecting section 5102D.

The information acquiring section 5102A acquires information inputted from a different element to the behavior variation point detecting section 5102, and outputs the inputted information to each of the calculating section 5102B and the comparing section 5102C.

The calculating section 5102B smoothes, using the smoothing filter, motion information or environment information received from the information acquiring section 5102A, and outputs motion information or environment information thus smoothed, to the comparing section 5102C.

The comparing section 5102C compares the motion information or the environment information received from the information acquiring section 5102A with the smoothed motion information or the smoothed environment information that is received from the calculating section 5102B (obtains a difference therebetween). The comparing section 5102C outputs comparison information thus obtained, to the detecting section 5102D.

The detecting section 5102D detects a portion having a large difference as a behavior variation point on the basis of the comparison information received from the comparing section 5102C. In other words, a portion that exceeds a detection threshold is detected as a behavior variation point.

Figure 52:
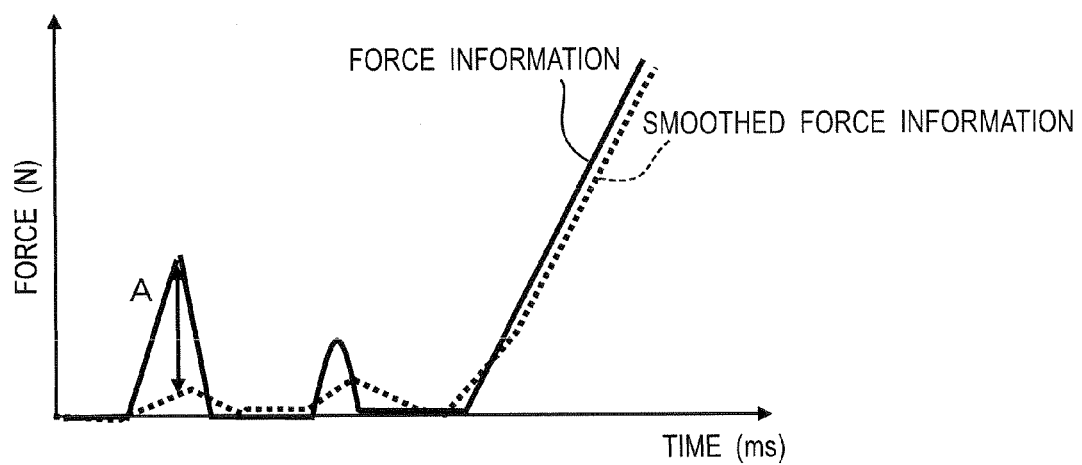

A method of obtaining a variation point in force information is described with reference to FIG. 52. In FIG. 52, the solid line indicates force information acquired by the environment information acquiring section, whereas the broken line indicates force information obtained by smoothing the acquired force information using a Gaussian filter. These two pieces of information are compared with each other, and a time point where the difference is larger than a fourth threshold (variation point detection threshold) (e.g. 1 N) is detected as a variation point (time point A in FIG. 52).

Figure 53:
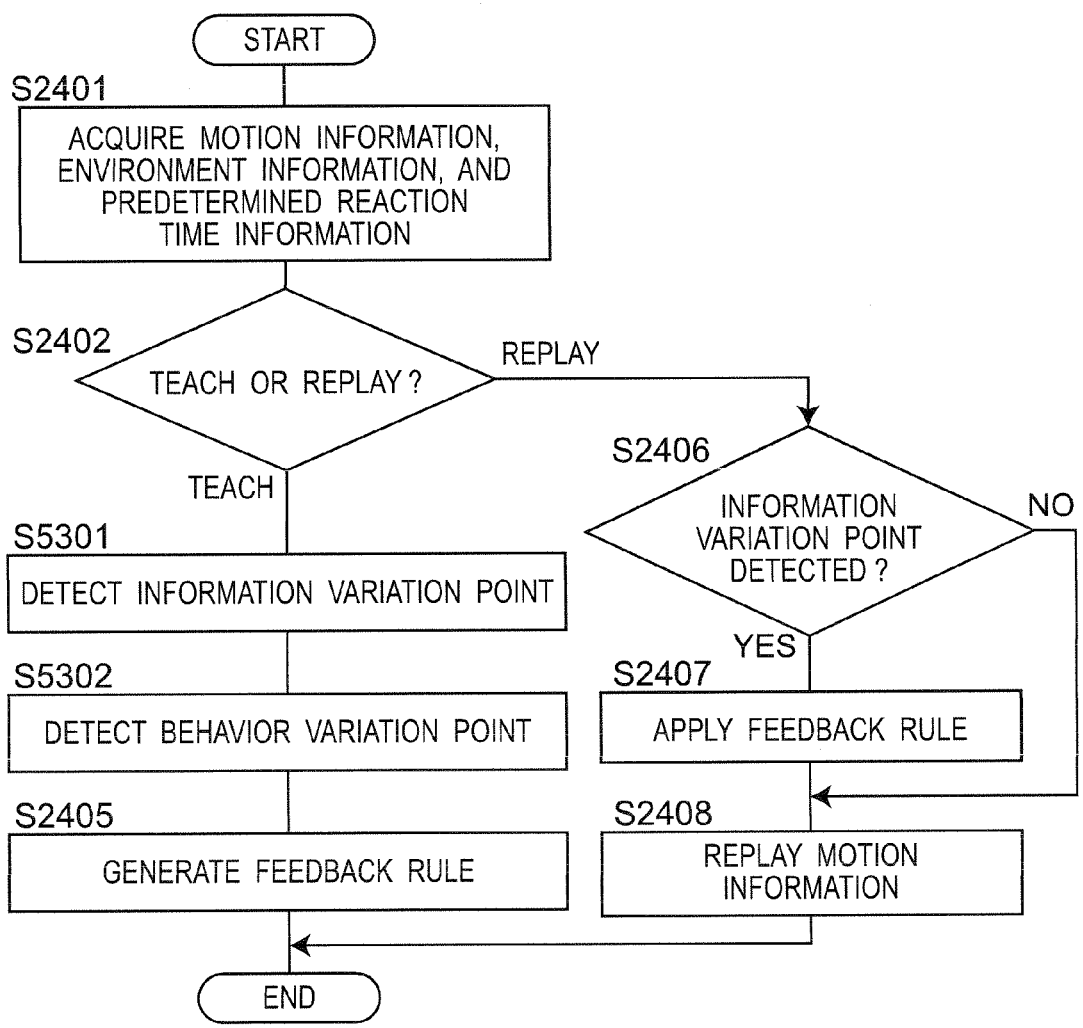

The manipulation process of the control apparatus 103 for the robot arm 102 according to the eighth embodiment is described below with reference to the flowchart in FIG. 53.

In step S2401, the motion information acquiring section 106 acquires motion information, the environment information acquiring section 107 acquires environment information, the predetermined reaction time information acquiring section 108 acquires predetermined reaction time information, and then the process proceeds to step S2402.

Subsequently in step S2402, the mode switching section 113 outputs mode information (either the "teach mode" or the "replay mode") to the controller 114. The process proceeds to step S5301 if the "teach mode" is outputted. The process proceeds to step S2406 if the "replay mode" is outputted.

In step S5301, the information variation point detecting section 5101 detects an information variation point from taught data thus acquired (information acquired in step S2401), and outputs the information variation point thus detected, to the behavior variation point detecting section 5102. The process then proceeds to step S5302.

Subsequently in step S5302, the behavior variation point detecting section 5102 searches for a behavior variation point at and after a time point after elapse of a predetermined reaction time from the time point at the information variation point received from the information variation point detecting section 5101. If the behavior variation point detecting section 5102 determines that no behavior variation point is detected in the search by the behavior variation point detecting section 5102, the behavior variation point detecting section 5102 searches for a behavior variation point detected until the time point after elapse of the predetermined reaction time from the time point at the information variation point. The behavior variation point detecting section 5102 outputs the behavior variation point thus detected by the behavior variation point detecting section 5102 to the feedback rule generating section 111. The process then proceeds to step S2405.

Subsequently in step S2405, the feedback rule generating section 111 indicates, with an approximate curve, information at and after the behavior variation point received from the behavior variation point detecting section 5102, and generates a feedback rule to output the feedback rule to the motion generating section 112, and then this flow ends.

If the information variation point detecting section 5101 determines in step S2406 that an information variation point is detected, the process proceeds to step S2407. If the information variation point detecting section 5101 determines that no information variation point is detected, the process proceeds to step S2408.

In step S2407, the motion generating section 112 generates motion information by applying the feedback rule to the motion information received from the motion information acquiring section 106, and then the process proceeds to step S2408.

In step S2408, the controller 114 controls the robot arm 102 on the basis of the motion information generated by the motion generating section 112, and then this flow ends.

According to the eighth embodiment, the information variation point detecting section 5101 or the behavior variation point detecting section 5102 detects an information variation point or a behavior variation point using smoothed information. This leads to reduction in influence of noise and accurate detection of the variation point. Skills of a person can be thus extracted accurately, and the robot is capable of performing an accurate task.

Though the present disclosure has been described above based on the above first to eighth embodiments, the present invention should not be limited to the above-described first to eighth embodiments. For example, the present invention also includes the following cases.

A part or whole of the above-described control apparatuses is actually a computer system that includes, for example, a microprocessor, ROM, RAM, hard disk unit, display unit, keyboard, and mouse. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

Each component can be implemented as a result that a program executing part such as a CPU reads and executes software programs recorded in a recording medium such as a hard disk or semiconductor memory. In other words, a software that implements some or all of the structural elements which configure the respective control apparatuses according to each of the embodiments or modifications may be a following program. That is to say, such a program is a control program for controlling a motion of a robot arm, the control program for causing a computer to execute steps of:

acquiring, by a motion information acquiring section, motion information including at least one of a position, orientation, and velocity of the robot arm in motion;

acquiring, by an environment information acquiring section, environment information including at least one of force information, sound volume information, and positional information related to peripheral environment and generated by the robot arm in motion;

acquiring, by a predetermined reaction time information acquiring section, predetermined reaction time information as information of a predetermined time from receipt of the environment information by a person in manipulation of the robot arm by the person to carrying out the manipulation of the robot arm by the person;

detecting as an information variation point, by an information variation point detecting section, a time point where at least one of the motion information acquired by the motion information acquiring section and the environment information acquired by the environment information acquiring section varies;

searching, by a behavior variation point detecting section, in a time from a time point after elapse of the predetermined reaction time from the information variation point, for a time point where at least one of the motion information acquired by the motion information acquiring section and the environment information acquired by the environment information acquiring section varies, to detect an initially detected time point as a behavior variation point;

generating as a feedback rule, by a feedback rule generating section, at least one of the motion information acquired by the motion information acquiring section and the environment information acquired by the environment information acquiring section in a time from the behavior variation point;

generating, by a motion generating section, a motion of the robot arm based on the motion information, the information variation point, the behavior variation point, and the feedback rule; and controlling, by a controller, the motion of the robot arm in accordance with the motion of the robot arm generated by the motion generating section.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment (s) or modification(s) of the aforementioned various embodiments and modifications, the effects possessed by the embodiment(s) or modification(s) can be produced.

The entire disclosure of Japanese Patent Application No. 2011-182906 filed on Aug. 24, 2011, including specification, claims, drawings, and summary are incorporated herein by reference in its entirety.

With the control apparatus and the control method for the robot arm, the robot, the control program for the robot arm, and the integrated electronic circuit according to the present disclosure, the feedback rule is generated on the basis of relationship between a time point of generation of a stimulus and variation in behavior after elapse of a reaction time, intention of a person is reproduced accurately, and a highly safe motion can be generated, thereby useful in a control apparatus and a control method for a robot arm, a robot, a control program for a robot arm, and an integrated electronic circuit in a movable mechanism in an industrial robot, a production plant, or the like. Furthermore, the control apparatus and the control method for the robot arm, the robot, the control program for the robot arm, and the integrated electronic circuit according to the present disclosure is possibly applicable to a robot arm of a domestic robot, a control apparatus and a control method for a robot arm, a robot, a control program for a robot arm, and an integrated electronic circuit, in addition to such an industrial robot.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus for controlling a motion of a robot arm, the control apparatus comprising:
    a motion information acquiring section that acquires motion information including at least one of a position, orientation, and velocity of the robot arm in motion;
    an environment information acquiring section that acquires environment information including at least one of force information, sound volume information, and positional information related to peripheral environment and generated by the robot arm in motion;
    a predetermined reaction time information acquiring section that acquires information of predetermined reaction time as predetermined time information from receipt of the environment information by a person to manipulation of the robot arm by the person;
    an information variation point detecting section that detects, as an information variation point, a time point where at least one of the motion information acquired by the motion information acquiring section and the environment information acquired by the environment information acquiring section varies;
    a behavior variation point detecting section that searches time from a time point after elapse of the predetermined reaction time from the information variation point, for the time point where at least one of the motion information acquired by the motion information acquiring section and the environment information acquired by the environment information acquiring section varies, to detect an initially detected time point as a behavior variation point;
    a feedback rule generating section that generates, as a feedback rule, at least one of the motion information acquired by the motion information acquiring section and the environment information acquired by the environment information acquiring section in time from the behavior variation point;
    a motion generating section that generates a motion of the robot arm based on the motion information, the information variation point, the behavior variation point, and the feedback rule; and
    a controller that controls the motion of the robot arm in accordance with the motion generating section.

2. The control apparatus for a robot arm according to claim 1, wherein, when the behavior variation point detecting section determines that the behavior variation point is not detected in the time from the time point after elapse of the predetermined reaction time from the information variation point, the behavior variation point detecting section searches in a time until the information variation point in a time until the time point after elapse of the predetermined reaction time and detects an initially detected time point as the behavior variation point.

3. The control apparatus for a robot arm according to claim 2, further comprising:
    an actual reaction time information detecting section that detects, as actual reaction time information, a time difference between the information variation point detected by the information variation point detecting section and the behavior variation point detected by the behavior variation point detecting section;
    wherein the motion generating section corrects the motion information acquired by the motion information acquiring section while the person manipulates the robot arm in accordance with the feedback rule generated by the feedback rule generating section, when the information variation point detecting section detects an information variation point upon controlling a motion of the robot arm.

4. The control apparatus for a robot arm according to claim 3, further comprising:
a predetermined reaction time information measurement section that measures the predetermined reaction time information;
wherein the motion of the robot arm controlled by the control apparatus for the robot arm is an assembling task,
the robot arm preliminarily performs the assembling task as an experiment, the predetermined reaction time information measurement section measures the predetermined reaction time information as information of a predetermined time from receipt of the environment information by the person in manipulation of the robot arm by the person to carrying out the manipulation of the robot arm by the person, and the predetermined reaction time information is used for teaching the assembling task.

5. The control apparatus for a robot arm according to claim 3, wherein the motion generating section generates a motion of the robot arm based on the motion information, the information variation point, the behavior variation point, and the feedback rule, the motion having shortest actual reaction time information.

6. The control apparatus for a robot arm according to claim 3, wherein
when the behavior variation point detecting section detects the motion information as the behavior variation point, if there are two time points, inclusive of the behavior variation point, where the motion information varies during elapse of a time of a preliminary motion detection threshold from the behavior variation point and the motion information has same values at the two time points, the behavior variation point detecting section searches in a time from a second time point for the behavior variation point, and
the motion generating section corrects the motion information in a time between a first time point and the second time point so as to have values same as those of the motion information at the two time points.

7. The control apparatus for a robot arm according to claim 3, wherein, when the environment information includes plural pieces of information as the information variation point at a same time point with respect to a single behavior variation point, the information variation point detecting section uses, as the information variation point, the force information if any, uses the sound volume information if there is not the force information, and uses the positional information if there is not the sound volume information.

8. The control apparatus for a robot arm according to claim 2, wherein
the information variation point detecting section detects, as an information variation point, a time point where a displacement in at least one of the motion information acquired by the motion information acquiring section and the environment information acquired by the environment information acquiring section is larger than an information variation point detection threshold, and
the behavior variation point detecting section detects, as a behavior variation point, a time point where a displacement in at least one of the motion information acquired by the motion information acquiring section and the environment information acquired by the environment information acquiring section is larger than a behavior variation point detection threshold.

9. The control apparatus for a robot arm according to claim 2, wherein the information variation point detecting section or the behavior variation point detecting section smoothes at least one of the motion information and the environment information, obtains a difference between smoothed information and unsmoothed original information, and detects as a variation point, a time point where the difference is larger than a variation point detection threshold.

10. The control apparatus for a robot arm according to claim 3, wherein
the motion generating section corrects by deleting a motion of the robot arm in a time detected as the actual reaction time information.

11. The control apparatus for a robot arm according to claim 3, wherein
the motion generating section corrects by interpolating a motion of the robot arm in a time detected as the actual reaction time information, based on a motion at the information variation point and a motion at the behavior variation point.

12. The control apparatus for a robot arm according to claim 10, wherein
the motion generating section corrects, the motion of the robot arm in the time detected as the actual reaction time information,
by interpolating the motion of the robot arm when an absolute value of a difference between information at the information variation point and information at the behavior variation point is equal to or more than a motion correction switching threshold, and by deleting the motion of the robot arm when the absolute value is less than the motion correction switching threshold.

13. A robot comprising:
a robot arm; and
the control apparatus according to claim 1, for controlling the robot arm.

14. A control method for controlling a motion of a robot arm, the control method comprising:
acquiring, by a motion information acquiring section, motion information including at least one of a position, orientation, and velocity of the robot arm in motion;
acquiring, by an environment information acquiring section, environment information including at least one of force information, sound volume information, and positional information related to peripheral environment and generated by the robot arm in motion;
acquiring, by a predetermined reaction time information acquiring section, predetermined reaction time information as information of a predetermined time from receipt of the environment information by a person in manipulation of the robot arm by the person to carrying out the manipulation of the robot arm by the person;
detecting as an information variation point, by an information variation point detecting section, a time point where at least one of the motion information acquired by the motion information acquiring section and the environment information acquired by the environment information acquiring section varies;
searching, by a behavior variation point detecting section, in a time from a time point after elapse of the predetermined reaction time from the information variation point, for a time point where a displacement in at least one of the motion information acquired by the motion information acquiring section and the environment information acquired by the environment information acquiring section varies, to detect an initially detected time point as a behavior variation point;

generating as a feedback rule, by a feedback rule generating section, at least one of the motion information acquired by the motion information acquiring section and the environment information acquired by the environment information acquiring section in a time from the behavior variation point;

generating, by a motion generating section, a motion of the robot arm based on the motion information, the information variation point, the behavior variation point, and the feedback rule; and controlling, by a controller, the motion of the robot arm in accordance with the motion of the robot arm generated by the motion generating section.

15. A control program for controlling a motion of a robot arm, the control program for causing a computer to execute steps of:

acquiring, by a motion information acquiring section, motion information including at least one of a position, orientation, and velocity of the robot arm in motion;

acquiring, by an environment information acquiring section, environment information including at least one of force information, sound volume information, and positional information related to peripheral environment and generated by the robot arm in motion;

acquiring, by a predetermined reaction time information acquiring section, predetermined reaction time information as information of a predetermined time from receipt of the environment information by a person in manipulation of the robot arm by the person to carrying out the manipulation of the robot arm by the person;

detecting as an information variation point, by an information variation point detecting section, a time point where at least one of the motion information acquired by the motion information acquiring section and the environment information acquired by the environment information acquiring section varies;

searching, by a behavior variation point detecting section, in a time from a time point after elapse of the predetermined reaction time from the information variation point, for a time point where at least one of the motion information acquired by the motion information acquiring section and the environment information acquired by the environment information acquiring section varies, to detect an initially detected time point as a behavior variation point;

generating as a feedback rule, by a feedback rule generating section, at least one of the motion information acquired by the motion information acquiring section and the environment information acquired by the environment information acquiring section in a time from the behavior variation point;

generating, by a motion generating section, a motion of the robot arm based on the motion information, the information variation point, the behavior variation point, and the feedback rule; and controlling, by a controller, the motion of the robot arm in accordance with the motion of the robot arm generated by the motion generating section.

16. An integrated electronic circuit for controlling a motion of a robot arm, the integrated electronic circuit for performing:

acquiring, by a motion information acquiring section, motion information including at least one of a position, orientation, and velocity of the robot arm in motion;

acquiring, by an environment information acquiring section, environment information including at least one of force information, sound volume information, and positional information related to peripheral environment and generated by the robot arm in motion;

acquiring, by a predetermined reaction time information acquiring section, predetermined reaction time information as information of a predetermined time from receipt of the environment information by a person in manipulation of the robot arm by the person to carrying out the manipulation of the robot arm by the person;

detecting as an information variation point, by an information variation point detecting section, a time point where at least one of the motion information acquired by the motion information acquiring section and the environment information acquired by the environment information acquiring section varies;

searching, by a behavior variation point detecting section, in a time from a time point after elapse of the predetermined reaction time from the information variation point, for a time point where a displacement in at least one of the motion information acquired by the motion information acquiring section and the environment information acquired by the environment information acquiring section varies, to detect an initially detected time point as a behavior variation point;

generating as a feedback rule, by a feedback rule generating section, at least one of the motion information acquired by the motion information acquiring section and the environment information acquired by the environment information acquiring section in a time from the behavior variation point;

generating, by a motion generating section, a motion of the robot arm based on the motion information, the information variation point, the behavior variation point, and the feedback rule; and controlling, by a controller, the motion of the robot arm in accordance with the motion of the robot arm generated by the motion generating section.

* * * * *